(12) United States Patent
Ishihara et al.

(10) Patent No.: US 12,551,250 B2
(45) Date of Patent: Feb. 17, 2026

(54) SYSTEMS AND PROCESSES FOR DISTRACTION CONTROL

(71) Applicant: Ostiio LLC, Philadelphia, PA (US)

(72) Inventors: Brett Ishihara, Philadelphia, PA (US); Matthew Nowick, Philadelphia, PA (US); Justen England, Philadelphia, PA (US); Kyle Woodard, Philadelphia, PA (US); Henry Mayne, Philadelphia, PA (US); Oivind Brockmeier, Philadelphia, PA (US)

(73) Assignee: Ostiio LLC, Philadelphia, PA (US)

( * ) Notice: Subject to any disclaimer, the term of this patent is extended or adjusted under 35 U.S.C. 154(b) by 423 days.

(21) Appl. No.: 18/149,846

(22) Filed: Jan. 4, 2023

(65) Prior Publication Data
US 2023/0210566 A1 Jul. 6, 2023

Related U.S. Application Data

(60) Provisional application No. 63/296,277, filed on Jan. 4, 2022.

(51) Int. Cl.
*A61B 34/10* (2016.01)
*A61B 17/02* (2006.01)
(Continued)

(52) U.S. Cl.
CPC .......... *A61B 17/8004* (2013.01); *A61B 34/10* (2016.02); *A61B 34/25* (2016.02);
(Continued)

(58) Field of Classification Search
CPC ............... A61B 34/10; A61B 34/25; A61B 2017/00212; A61B 2017/00221;
(Continued)

(56) References Cited

U.S. PATENT DOCUMENTS

| 3,458,695 A | 7/1969 | Tait |
|---|---|---|
| 2008/0097496 A1 | 4/2008 | Chang et al. |

(Continued)

FOREIGN PATENT DOCUMENTS

| WO | 2020167940 A1 | 8/2020 |
|---|---|---|
| WO | 2021115418 A1 | 6/2021 |

OTHER PUBLICATIONS

International Search Report and Written Opinion for International Application No. PCT/US2023/060119, mailed Apr. 14, 2023, 12 Pages.

*Primary Examiner* — Samuel S Hanna
(74) *Attorney, Agent, or Firm* — Bradley Arant Boult Cummings LLP; Daniel E. Sineway, Esq.

(57) ABSTRACT

A distraction system can include a distraction implant comprising a magnetic element and a distraction mechanism configured to expand the distraction implant in response to rotation of the magnetic element. The distraction system can include an external device comprising a motor configured to rotate a driver magnet while in a powered state, the driver magnet configured to rotate the magnetic element, a computing device configured. The computing device can be configured to measure an electrical current drawn by the motor during rotation of the driver magnet. The computing device can be configured to maintain the motor in the powered state in response to a mean value of the electrical current being greater than or equal to a mean value threshold, and a standard deviation value of the electrical current being less than or equal to a standard deviation threshold.

15 Claims, 40 Drawing Sheets

(51) Int. Cl.
  *A61B 17/80* (2006.01)
  *A61B 34/00* (2016.01)
  *A61B 90/98* (2016.01)
  *A61B 17/00* (2006.01)

(52) U.S. Cl.
  CPC .... *A61B 90/98* (2016.02); *A61B 2017/00039* (2013.01); *A61B 2017/00075* (2013.01); *A61B 2017/00123* (2013.01); *A61B 2017/00212* (2013.01); *A61B 2017/00411* (2013.01); *A61B 2017/00876* (2013.01); *A61B 2034/105* (2016.02); *A61B 2034/107* (2016.02)

(58) Field of Classification Search
  CPC ........... A61B 2017/00398; A61B 2017/00411; A61B 2017/00123; A61B 2017/00075; A61B 2017/00039; A61B 2017/00876; A61B 90/98; A61B 17/8004
  See application file for complete search history.

(56) References Cited

U.S. PATENT DOCUMENTS

2009/0112263 A1* 4/2009 Pool ................... A61B 17/707
                                                    600/587
2019/0321089 A1   10/2019 Walker et al.

* cited by examiner

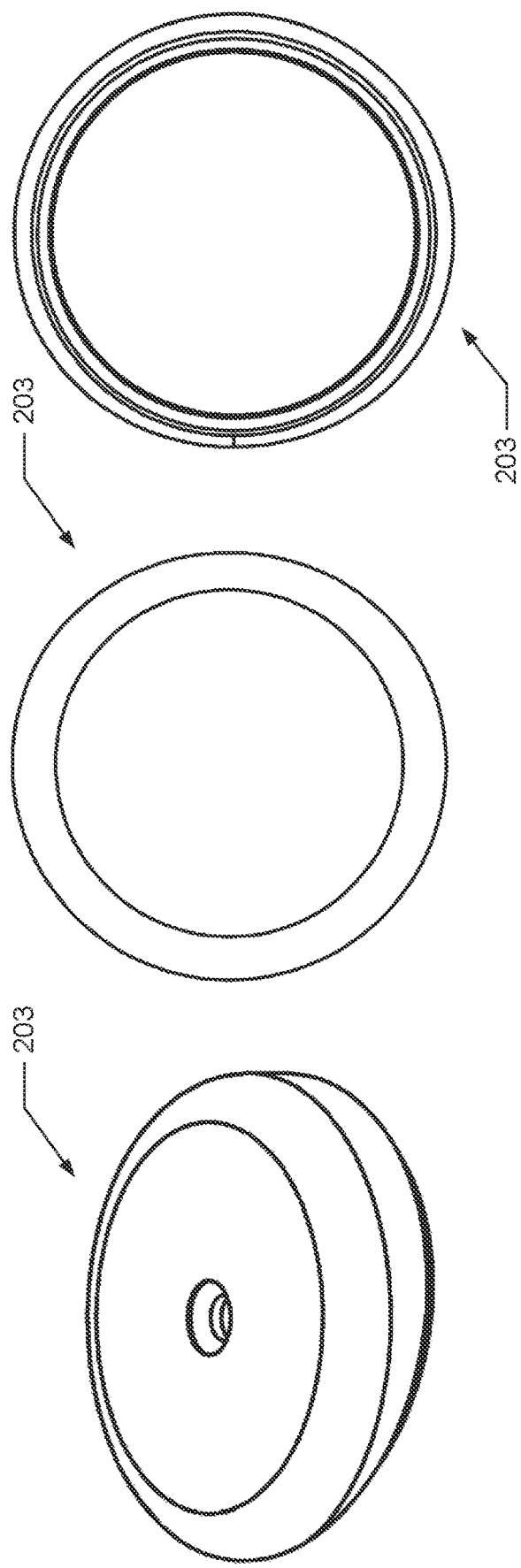
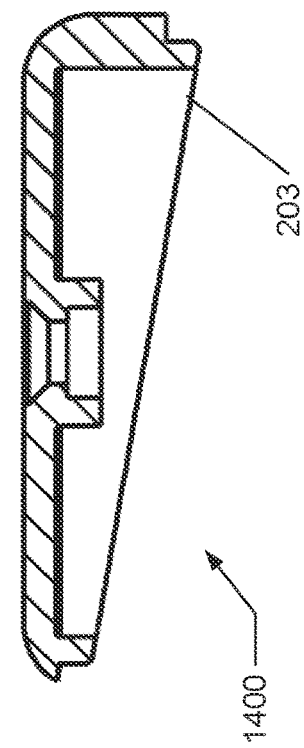
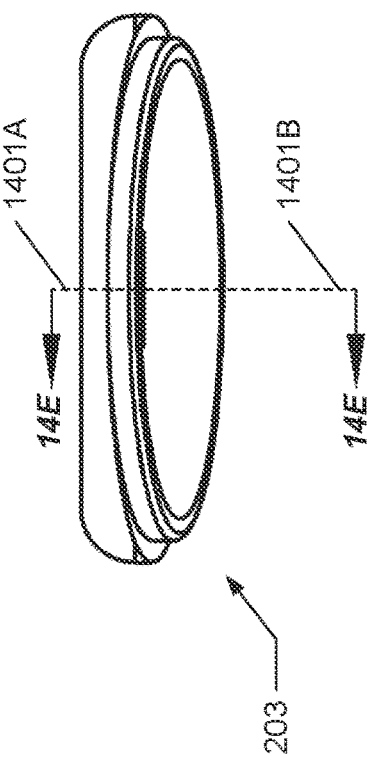
FIG. 14A  FIG. 14B  FIG. 14C
FIG. 14D  FIG. 14E

405

405

405

405

SYSTEMS AND PROCESSES FOR DISTRACTION CONTROL

CROSS REFERENCE TO RELATED APPLICATIONS

This application claims the benefit of and priority to U.S. Application No. 63/296,277, filed Jan. 4, 2022, entitled "SYSTEMS AND PROCESSES FOR DISTRACTION CONTROL VIA TORQUE SENSING," the disclosure of which is incorporated herein by reference in its entirety.

GOVERNMENT LICENSE RIGHTS—35 U.S.C. § 202(C)(6)

The inventions shown and described herein were made with government support under 2103436 awarded by the National Science Foundation. The government has certain rights in the inventions.

BACKGROUND

Distraction osteogenesis is a technique of bone lengthening which uses the bone's natural healing process. Certain techniques generate new bone at the site of a surgical boney cut by slowly separating plates attached to two opposing bony portions, thereby correcting growth restriction of the skull and mandible.

Cranio-maxillo-facial distraction can utilize a semi-buried component that protrudes through the skin to allow for manual engagement of the distractor over the course of multiple weeks. Such an external component can predispose the patient to morbidity such as soft-tissue infection, patient and/or parent noncompliance, patient discomfort and/or increased analgesic use throughout the distraction period, as well as unfortunate scarring. In addition to increased morbidity, the manual method by which distractors are engaged can eliminate the possibility of monitoring and recording feedback during the distraction process to detect deviations from the prescribed distraction metrics and diagnose common complications of distraction.

Accordingly, there exists a need for a technique for performing cranio-maxillo-facial distraction that can monitor and record feedback during the distraction process. Additionally, there remains a need for fully implantable distractor that does not protrude through the skin and can be engaged by externals components that are completely outside the patient.

BRIEF SUMMARY OF THE DISCLOSURE

Briefly described, and according to one embodiment, aspects of the present disclosure generally relate to systems and processes for performing and controlling distraction.

Distraction osteogenesis is a technique of using the bone's natural healing process to achieve bone lengthening. Distraction osteogenesis can be used to gradually expand both bone and soft tissues while minimizing bony relapse rates, blood loss, operative time, perioperative morbidity, and the duration of hospital stays when compared with analogous open, single-staged procedures. Previous approaches to distraction utilize implants that include permanent control elements protruding from a subject. Such transdermal control elements can increase a risk of imprecise distraction parameters and/or implant position disruption due to contact of the control elements with the external environment. Previous transdermal approaches place additional burden on caregivers who must manually expand the devices. Further, transdermal approaches may increase a risk of a patient experiencing soft tissue infections and/or scarring.

In various embodiments, the present disclosure provides systems and processes for performing distraction osteogenesis via a fully distraction implant that can be controlled wirelessly (e.g., without the need for control means that protrude transdermally from the distraction implant). A technical challenge of contactless distraction control is monitoring the progress of distraction within the subject (e.g., determining and controlling distraction without direct observation or contact with the implanted distraction implant). For example, it may be desirable for the distraction system to know: a) how much torque is being delivered to the implanted distraction implant (e.g., as a means of determining distraction force and progression), and/or b) the state of magnetic coupling between the implanted distraction implant and an external device for controlling the same. Presented herein are systems and processes for precise and accurate distraction control including, but not limited to, torque-based distraction monitoring and control.

The present distraction systems and processes can be utilized to correct various skeletal conditions or skeletal traumas associated with growth restriction or deformity. For example, the distraction system can be implanted to perform cranio-maxillo-facial distraction, extremity distraction, or spinal distraction. The distraction system can operate subcutaneously and wirelessly via a distraction implant and an external device configured to control and engage the distraction implant with precision and accuracy. In various embodiments, the distraction system includes a magnetically driven drive train (e.g., provided as a subcutaneous implant) that couples to a handheld, external device that provides a rotating magnetic field. In one or more embodiments, when the rotating magnetic field engages with the distraction implant, the distraction implant gradually separates, thereby providing distraction. In at least one embodiment, the external device can detect proper coupling of the magnetic fields to ensure an accurate distraction distance. In one or more embodiments, the distraction implant can generate and/or store distraction data and transmit distraction data to the external device. For example, the distraction implant can store a device identifier and can transmit the device identifier to the external device (e.g., or be configured such that the external device can read the device identifier from the distraction implant). As another example, the distraction implant can generate and transmit distraction data including measurements of distraction distance, magnet rotation count, distraction force, and/or torque applied by a rotating magnetic element to a distraction mechanism (e.g., a worm and worm gear). In one or more embodiments, the external device can monitor a state of magnetic coupling between a magnet of the external device and a magnet of the distraction implant. For example, the external device can include a near field communication (NFC) antenna and the distraction implant can include an NFC device. In this example, the external device can interface with the NFC device via the NFC antenna such that the external device can measure a state of alignment between the magnet of the external implant and the magnet of the distraction implant.

In at least one embodiment, the distraction system includes a computing device configured to transmit distraction commands to the external device. In one or more embodiments, the computing device is configured to receive distraction data from the external device, such as, for example, distraction distance, distraction force, and operating statuses of the distraction implant and the external device. In one example, the computing device is a user's computing device (e.g., tablet, smartphone, etc.) that includes an application configured to control the amount of distraction provided by the external device and implant during each distraction session. In various embodiments, the external device can transmit distraction data to a remote computing environment for storage and remote treatment monitoring. In one or more embodiments, the distraction system includes a remote computing environment configured to perform various functions including, but not limited to, distraction data recordation and storage, user authentication, device authentication, user setup, device setup, user-computing device pairing, external device-implant pairing, and computing device-external device pairing.

In some embodiments, the distraction system includes a plurality of configurations. In one or more embodiments, a surgical configuration of the distraction system includes one or more distraction implants, information for registering the distraction implants into the distraction system, one or more external devices for controlling the distraction implant, information for registering the external device into the system, accessories for implanting the distraction implant (e.g., insertion tools, positioning tools, target site preparation tools, and/or implant fasteners), a computing device for controlling the external device, and access to a remote computing environment for configuring and monitoring distraction plans. In one or more embodiments, the surgical configuration can be used by a surgeon to test and install the distraction implants, register the unique implant identifiers to the patient, and setup the distraction plan.

In various embodiments, a caregiver configuration of the distraction system includes one or more distraction implants (e.g., having been implanted into a patient), a external device for controlling the distraction implant, a computing device for controlling the external device, and, in some embodiments, an ability to transmit and receive distraction-related data to and from a remote computing environment. In one or more embodiments, a setup configuration of the distraction system includes a computing device for controlling an external device and access to a remote computing environment for initially configure distraction plans and monitoring for treatment compliance. In at least one embodiment, a data upload-download configuration of the distraction system includes a computing device an ability to transmit and receive distraction-related data to and from a remote computing environment on a queued basis (e.g., for scenarios in which the computing device temporarily lacks a network connection).

In one or more embodiments, a functional architecture of the distraction system includes, but is not limited to, creating or retrieving a patient-type user account, installing one or more distraction implants into a patient, configuring a distraction plan for controlling the distraction implant, executing the distraction plan, receiving and storing distraction data, reviewing the distraction data to evaluate progress and compliance, potentially updating or modifying the distraction plan, and removing the distraction implant upon conclusion or termination of the distraction plan.

According to a first aspect, a distraction system, including: A) a distraction implant, including: 1) a distraction mechanism configured to expand the distraction implant in response to engagement by a magnetic element; 2) a magnetic element configured to engage the distraction mechanism in response to rotation of a driver magnet; and 3) a first near-field communication (NFC) device configured to store an implant identifier; and B) an external device including: 1) a second NFC device; 2) the driver magnet; 3) a motor in mechanical communication with the driver magnet and configured to rotate the driver magnet when operating in a powered state; and 4) a computing device configured to: i) read the implant identifier from the first NFC device via the second NFC device; ii) transition the motor to the powered state in response to a first reading of the implant identifier; iii) measure an electrical current drawn by the motor in the powered state; iv) determine a mean value of the electrical current; v) determine a standard deviation value of the electrical current; and vi) maintain the motor in the powered state in response to: a) at least one second reading of the implant identifier; b) the mean value of the electrical current being greater than a first predetermined threshold; and c) the standard deviation value of the electrical current being less than a second predetermined threshold.

According to a further aspect, the distraction system of the first aspect or any other aspect, wherein: A) the external device further includes an encoder configured to measure rotation of the motor in the powered state; and B) the computing device is further configured to: 1) determine a rotation count via the encoder; and 2) transition the motor from a powered state to a depowered state in response to the rotation count meeting a third predetermined threshold.

According to a further aspect, the distraction system of the first aspect or any other aspect, wherein the computing device is further configured to: A) determine a communication failure of the at least one second reading of the implant identifier; and B) transition the motor from the powered state to a depowered state in response to the failure.

According to a further aspect, the distraction system of the first aspect or any other aspect, wherein the computing device is further configured to: A) determine that a subsequent mean value of the electrical current is less than the first predetermined threshold; and B) in response to determining that the subsequent mean value of the electrical current is less than the first predetermined threshold, transition the motor from the powered state to a depowered state.

According to a further aspect, the distraction system of the first aspect or any other aspect, wherein the computing device is further configured to: A) determine that a subsequent mean value of the electrical current is greater than or equal to a third predetermined threshold; and B) in response to determining that the subsequent mean value of the electrical current is greater than or equal to the third predetermined threshold, transition the motor from the powered state to a depowered state.

According to a further aspect, the distraction system of the first aspect or any other aspect, wherein the computing device is further configured to: A) determine that a subsequent standard deviation value of the electrical current is greater than the second predetermined threshold; and B) in response to determining that the subsequent standard deviation value of the electrical current is greater than the second predetermined threshold, transition the motor from the powered state to a depowered state.

According to a further aspect, the distraction system of the first aspect or any other aspect, wherein the computing device is further configured to: A) determine that a value of the first reading of the implant identifier fails to match a reference value; and B) in response to determining that the value of the first reading of the implant identifier fails to match the reference value, prevent the motor from transitioning to the powered state.

According to a further aspect, the distraction system of the first aspect or any other aspect, further including a second computing device configured to transmit the reference value to the computing device of the external device.

According to a further aspect, the distraction system of the first aspect or any other aspect, further wherein the second computing device includes a display and is configured to: A) obtain a target site of the distraction implant based at least in part on the reference value; B) generate a graphical user interface (GUI) including an anatomical simulation, wherein the anatomical simulation includes an indication of the target site; and C) render the GUI on the display.

According to a further aspect, the distraction system of the first aspect or any other aspect, wherein the computing device is further configured to: A) determine that a value of the at least one second reading of the implant identifier fails to match the reference value; and B) in response to determining that the value of the at least one second reading of the implant identifier fails to match the reference value, transition the motor from the powered state to a depowered state.

According to a further aspect, the distraction system of the first aspect or any other aspect, wherein the computing device is further configured to: A) determine a current distraction distance via the first reading of the implant identifier; B) detect each rotation of the motor via the encoder in the powered state; C) determine an updated value of the current distraction distance based on each detection of the rotation of the motor and an initial distraction distance; and D) in response to detecting each rotation of the motor, write, via the second NFC device, the updated value of the current distraction distance to the first NFC device.

According to a second aspect, a method, including: A) reading, via a first wireless communication device, an implant identifier from a second wireless communication device of a distraction implant; B) determining, via a computing device, that the implant identifier matches a reference value; C) transitioning, via the computing device, a motor to a powered state to rotate a driver magnet; D) rotating, via the driver magnet, a magnetic element of the distraction implant, wherein rotation of the magnetic element expands the distraction implant; E) measuring, via the computing device, an electrical current drawn by the motor in the powered state; and F) transitioning, via the computing device, the motor to a depowered state in response to a standard deviation value of the electrical current being greater than a predetermined threshold.

According to a further aspect, the method of the second aspect or any other aspect, wherein the computing device is a first computing device and the method further includes, in response to the transitioning the motor to the depowered state, transmitting, via the first computing device, an alert to a second computing device.

According to a further aspect, the method of the second aspect or any other aspect, further including determining, via the second computing device, a current distraction distance of the distraction implant in response to the alert.

According to a further aspect, the method of the second aspect or any other aspect, further including: A) determining, via the computing device, the standard deviation value of the current is less than or equal to the predetermined threshold; and B) transitioning, via the computing device, the motor to a depowered state in response to a failure of a subsequent attempt to read the implant identifier from the second wireless communication device via the first wireless communication device.

According to a third aspect, a distraction system, including: A) a distraction implant including a magnetic element and a distraction mechanism configured to expand the distraction implant in response to rotation of the magnetic element; and B) an external device including: 1) a motor configured to rotate a driver magnet while in a powered state; 2) the driver magnet configured to rotate the magnetic element; and 3) a computing device configured to: i) measure an electrical current drawn by the motor during rotation of the driver magnet; and ii) maintain the motor in the powered state in response to: a) a mean value of the electrical current being greater than or equal to a mean value threshold; and b) a standard deviation value of the electrical current being less than or equal to a standard deviation threshold.

According to a further aspect, the distraction system of the third aspect or any other aspect, wherein the computing device is configured to transition the motor to a depowered state in response to the mean value of the electrical current being less than the mean value threshold or the standard deviation value of the electrical current exceeding the standard deviation threshold.

According to a further aspect, the distraction system of the third aspect or any other aspect, wherein the computing device is a first computing device and the distraction system further includes a second computing device configured to transmit a command to the first computing device, wherein the first computing device is configured to transition the motor to the powered state in response to the command.

According to a further aspect, the distraction system of the third aspect or any other aspect, wherein the second computing device is configured to transmit the command in response to determining that a predetermined latency period has elapsed.

According to a further aspect, the distraction system of the third aspect or any other aspect, wherein the second computing device is further configured to: A) receive at least one credential via an input device; B) authenticate a user account based on the at least one credential; C) retrieve a reference value based on the user account; D) receive an implant identifier from the first computing device; and E) transmit the command in response to the implant identifier matching the reference value.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 14A shows a perspective view of an exemplary cap of the distraction implant, according to one embodiment of the present disclosure;

FIG. 14B shows a top view of the exemplary cap of the distraction implant, according to one embodiment of the present disclosure;

FIG. 14C shows a bottom view of the exemplary cap of the distraction implant, according to one embodiment of the present disclosure;

FIG. 14D shows a side view of the exemplary cap of the distraction implant, according to one embodiment of the present disclosure;

FIG. 14E shows a cross section of the exemplary cap of the distraction implant, according to one embodiment of the present disclosure;

DETAILED DESCRIPTION

Figure 1:
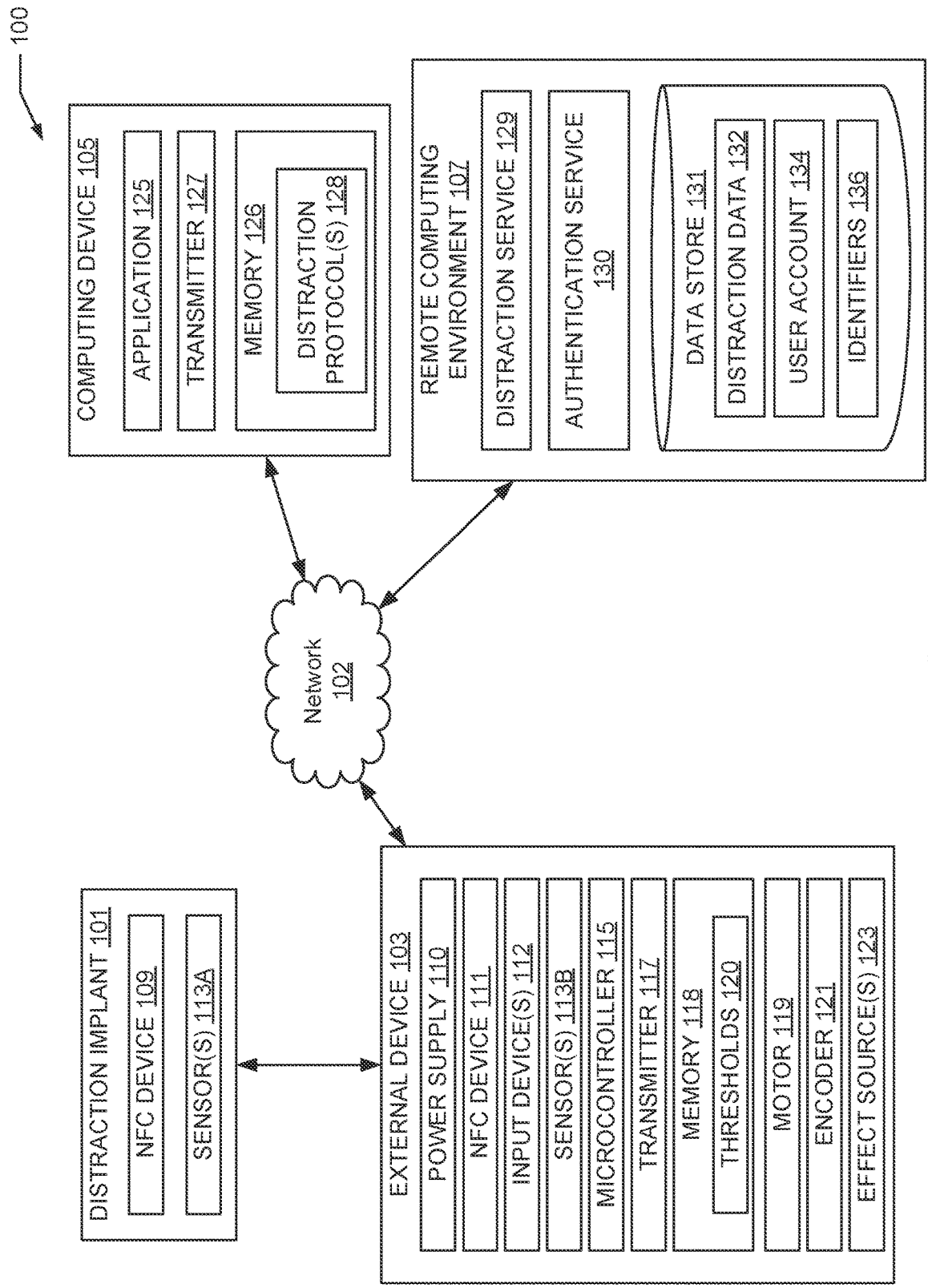
FIG. 1 shows an exemplary distraction system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "distraction event" generally refers to the locomotion (e.g., expansion or contraction) of a distraction implant via an external device. For example, a distraction event includes the external device applying a torque to the distraction implant such that a first footplate of the distraction implant translates relative to second footplate of the distraction implant, thereby causing corresponding translation of a first bony portion relative to a second bony portion (e.g., each footplate being secured a different one of the two bony portions). The distraction event can include a single expansion or contraction of the distraction implant with an external device that receives distraction commands via a user's computing device. A distractions event, or plurality thereof, can be part of a distraction plan followed by a caregiver or physician. A distraction event can include manual distraction events (e.g., custom manipulation of bony portions via dynamic control of a distraction implant secured thereto), test distraction events (e.g., diagnostic initiation of distraction to ensure or evaluate distraction performance and/or implant function), and protocol distraction events (e.g., distraction performed by the distraction system according to a distraction plan, as described herein).

As used herein, a "distraction plan" generally refers to a physician- or technician-prescribed plan that describes distraction protocols including, but not limited to, how many distraction events may occur, the distance of each distraction event, and the timing of each distraction event. The distraction plan can include therapeutic distraction events intended to initiate and promote osteogenesis between two or more bony portions. The distraction plan can include manually initiated distractions (e.g., such as test or corrective distractions that are executed by a physician). As used herein, "distraction mode" generally refers to types of distraction events including, but not limited to, manual mode, (e.g., associated with distraction events of custom protocol), test mode (e.g., associated with test or other diagnostic distraction events), and protocol distraction events (e.g., associated with a distraction plan, as described herein). In some embodiments, the distraction system can restrict access to one or more distraction modes to an administrator or particular user, such as a surgeon. For example, the distraction system restricts access to manual mode and/or test mode to a physician.

In various embodiments, the manual mode includes using the external device to expand or contract the distraction implant a custom amount (e.g., a custom distraction or contraction length). In one or more embodiments, the test mode includes using the external device to expand or contract the distraction implant prior to its implantation to ensure functionality and/or diagnose potential complications or malfunctions. In at least one embodiment, the protocol mode includes using the external device to expand the distraction implant (e.g., following implantation) according to distraction protocols defined by a distraction plan. In at least one embodiment, the distraction system restricts manipulation of the distraction implant and external device to authenticated users and authenticated computing devices.

In at least one embodiment, "successful distraction" includes a distraction event in which the distraction implant completes the full expansion or contraction to the extent specified by the user, distraction protocol(s), and/or distraction plan. In one or more embodiments, "missed distraction" includes a distraction event that was not initiated in a time frame prescribed by a distraction protocol or distraction plan. In various embodiments, "interrupted distraction" includes a distraction event that is prematurely suspended due to loss of magnetic coupling between the external device and the distraction implant (e.g., such as may be caused by movement of the external device and/or a subject during the distraction event). In at least one embodiment, a "failed distraction" includes a distraction event that is prematurely suspended due to an internal fault or error condition in the distraction implant, the external device, or in interactions therebetween (e.g., alignment, magnetic coupling, etc.). As used herein, "nominal operation" refers to operation of the distraction system with no known or unknown errors or faults.

Overview

In various embodiments, a distraction system includes, but is not limited to, a distraction implant, an external device configured to control the distraction implant, a computing device configured to control the external device, and a remote computing environment configured to communicate with the computing device. In some embodiments, the external device includes one or more sensors for determining accurate alignment of the external device (e.g., the driver magnet thereof) and the distraction implant. In various embodiments, the distraction implant and the external device can each include one or more near field communication (NFC) components configured to communicate with each other when brought within a predetermined proximity. In one or more embodiments, the external device processes signals corresponding to the NFC component communication and, based thereon, determines whether the external device is properly aligned over the implanted distraction implant such that magnetic coupling therebetween may occur. As used herein, a "proper alignment" of the external device can refer to a positioning of the external device over the implanted distraction implant such that the driver magnet of the external device can magnetically couple to the distraction implant and rotate to precisely and accurately apply magnetic torque to the magnetic element of the distraction implant.

Additional examples of distraction systems that may be used in accordance with aspects of the present disclosure may include one or more embodiments shown or described in International Application No. PCT/US2018/021269, filed Mar. 7, 2018, entitled "SYSTEMS AND METHODS FOR CONTACTLESS CRANIO-MAXILLO-FACIAL DISTRACTION," or International Application No. PCT/US2020/017918, filed Feb. 12, 2020, entitled "SYSTEMS AND METHODS FOR A SMART, IMPLANTABLE CRANIO-MAXILLO-FACIAL DISTRACTOR," the disclosures of which are incorporated herein by reference in their entireties.

The external device can receive and analyze various signals to determine one or more statuses of the distraction implant, such as, for example, the state of coupling between the external device and the distraction implant, the amount of torque being transferred from the external device to the distraction implant, or the level of distraction being applied to the target site by the distraction implant. Non-limiting examples of signals or other sensor data received or generated by the external device include motor current, motor speed, and driver magnet-distraction implant magnet positional data (e.g., which may include NFC readings). In at least one embodiment, due to their reasonably proportional relationship, the distraction system can utilize driver current measurements as an input to estimating torque at the distraction implant, which may be indicative of error conditions, such as external device-distraction implant misalignment or distraction implant stalling. In one or more embodiments, the distraction system can determine that the external device is properly alignment over the distraction implant by successfully reading an NFC tag value from the distraction implant (e.g., and determining that the NFC tag value matches an expected value, such as an expected implant identifier). In at least one embodiment, the external device includes an encoder configured for measuring the rotation count and/or rotation rate of the motor.

In one or more embodiments, the distraction system utilizes torque estimations, current frequency analyses, NFC phase angle estimations, and/or motor speed, to determine various statuses of the external device and/or the distraction implant and perform one or more actions based thereon. For example, based on an estimate of torque generated by the motor (e.g., or magnetic coupling between the external device and distraction implant magnets) the distraction system determines that one or more error conditions are present. In one example, an error condition includes insufficient torque (e.g., insufficient torque is being translated to the magnetic element of the distraction implant by the external device). In one or more embodiments, based on the insufficient torque delivery, the distraction system determines that one or more error states are present. In one example, the error state includes the external device and distraction implant being misaligned (e.g., such that magnetic coupling fails to occur entirely or at sufficient levels for supporting adequate torque transfer). In another example, the error state includes locking or stalling of the magnetic element of the distraction implant or the driver magnet of the external device. In another example, the error state includes a complication of the external device, such as insufficient power, stuttering motor, or other motor malfunction.

In at least one embodiment, the distraction system automatically performs one or more actions based one or more statuses that are determined to be present (e.g., or determined to have occurred during activation of the distraction implant). The distraction system can automatically suspend the current distraction process, for example, in response to determining that a) the external device and distraction implant are misaligned, b) the distraction implant has delivered the maximum amount of torque that can be safely applied at the target site (e.g., or that the distraction implant exceeded the maximum amount of torque delivery), c) the driver of the of the external device is in an error state, and/or d) the magnetic impeller of the distraction implant has locked or stalled. The distraction system can generate and transmit an alert based on status determinations. For example, the distraction system determines that the distraction implant is receiving insufficient torque delivery and, in response, the distraction system generates and transmits an electronic mail, SMS text, audio alert, or other notification to a device of the subject and/or a medical practitioner associated therewith.

In various embodiments, a process for torque sensing-based distraction control includes (e.g., though not necessarily in the order of introduction) receiving, at the external device, NFC signal values corresponding to NFC communication between the external device and implanted distraction implant. In some embodiments, a computing device receives the NFC signals values. In one or more embodiments, the process includes the external device, or computing device, processing and analyzing the NFC signal values to determine that the driver of the external device is in proper alignment with the distraction implant. In at least one embodiment, in response to presence of proper alignment, the process includes engaging distraction by rotating the driver magnet via the motor, which translates torque to the distraction implant via magnetic coupling between the driver magnet and the magnetic element of the distraction element. In one or more embodiments, during the distraction event, the process includes the external device measuring and processing sensor data, such as current drawn by the motor, NFC phase angle data, and/or motor speed. In various embodiments, the external device analyses the processed sensor data to estimate a magnitude of torque being applied to the distraction implant, to evaluate changes in the motor current frequency that may be indicative of external device and distraction implant misalignment and/or locking of the driver, and/or to evaluate changes in NFC phase angle data that may be indicative of driver stalling and/or misalignment.

In one or more embodiments, based on the estimated torque and/or other analysis outputs, the external device, computing device, or remote computing environment generates one or more determinations. In at least one embodiment, the external device determines whether a maximum amount of torque that can be safely applied to the distraction implant has been reached. In one or more embodiments, the external device determines whether a maximum amount of distraction force that can be safely applied by the distraction implant to a target site has been reached. In various embodiments, the external device determines whether the distraction implant (e.g., the magnetic element, worm gear, or telescoping rod thereof) has locked or stalled. In at least one embodiment, the external device determines whether the external device or distraction implant is experiencing a fault condition (e.g., stalled rotation, stalled linear displacement, coupling slippage, etc.). In one or more embodiments, the external device determines whether the external device and the distraction implant are still in proper alignment (e.g., the distraction process being potentially suspended or terminated in response to misalignment). In various embodiments, the external device determines whether the one or more predetermined distraction protocols are satisfied, such as whether the distraction implant has expanded or contracted to a predefined distraction distance. In various embodiments, the external device and/or computing device in communication therewith can perform appropriate actions to safely control the distraction event. For example, the external device can suspend the distraction event in response to determining one or more error conditions are present. As another example, the external device can adjust one or more motor properties (e.g., rotation speed, rotation power, etc.) to ensure a prescribed distraction distance is achieved and/or to avoid an error condition. In at least embodiment, in response to detecting an error condition, the external device can transmit an alert to the user's computing device and perform other appropriate actions, such as deactivating the motor.

In one or more embodiments, the distraction system can estimate a level of torque at the distraction implant based on current being drawn from the motor of the external device. In various embodiments, the driver includes a brushed or self-commutating direct current (DC motor) with an adjustable linear power supply. In at least one embodiment, the driver includes a three-phase brushless DC motor and a digital motor controller. In various embodiments, the motor of the external device can be configured for open loop or closed loop control. In various embodiments, the torque-sensing processes of the distraction system are adapted to the particular control schema of the motor.

The external device can measure motor current via the motor circuit tail current or the motor winding current. In various embodiments, the external device can process motor current measurements via analog- and/or digital-based signal processing operations. The external device, or a computing device 105 in communication therewith, can estimate torque by comparing the processed current measurements to a calibration curve of motor current versus applied torque. For example, the external device can use a calibration curve to match a recorded current measurement to a predetermined level of torque. In this example, the amount of current drawn from an open loop-configured motor can be linearly correlated to applied torque. In at least one embodiment, the external device applies a predetermined current-torque relation to the current measurement and generates a torque estimate as an output of the relation. For example, the external device includes a calibration algorithm derived from a current-torque calibration curve, and the external device estimates magnetic torque by applying the calibration algorithm to the recorded current.

In various embodiments, magnetic torque increases as the level of distraction at the distraction implant increases. In one or more embodiments, the distraction system uses level of magnetic torque to estimate conditions including, but not limited to, distraction progression, distraction implant stalling or locking, motor burnout, and other fault conditions. In some embodiments, distraction progression refers to whether the maximum amount of torque that can be safely delivered from the distraction implant to the target site has been achieved. Alternatively, or in addition, distraction progression refers to a length by which a telescoping arm (e.g., or other distraction rod of the distraction implant) has extended. In some embodiments, the extension length is referred to as "distraction distance."

In one or more embodiments, the external device can measure analog current drawn by the motor, process the analog current into a digital current via one or more filters, and estimate a level of torque based on the digital current value. The external device can determine whether the distraction implant is over-torqued by comparing the level of torque to one or more predetermined thresholds. The external device can record a time-series set of torque values and perform one or more frequency analyses of the time-series set. In some embodiments, in addition or as an alternative to NFC-based processes, the external device can apply one or more pattern recognition techniques to computed torque values to estimate the state of coupling between the external device and the distraction implant.

Exemplary System Architecture

Referring now to the figures, for the purposes of example and explanation of the fundamental processes and components of the disclosed systems and processes, reference is made to FIG. 1, which shows an exemplary distraction system 100. As will be understood and appreciated, the distraction system 100 shown in FIG. 1 represents merely one approach or embodiment of the present system, and other aspects are used according to various embodiments of the present system. In one or more embodiments, a distraction system 100 includes one or more distraction implants 101, one or more external devices 103 configured to communicate with and control the distraction implant 101, one or more computing devices 103, and a remote computing environment 107. In various embodiments, the distraction implant 101, external device 103, computing device 105, and/or remote computing environment 107 perform processes and workflows shown and described herein, such as, for example, the distraction process 3000 (e.g., shown in FIG. 30), distraction control process 3100 (e.g., shown in FIG. 31), distraction configuration workflow 3201A (e.g., shown in FIG. 32), distraction test workflow 3201B (e.g., shown in FIG. 32), distraction event workflow 3300 (e.g., shown in FIG. 33), and control loop 3600 (e.g., shown in FIG. 36).

In at least one embodiment, the external device 103, computing device 105, and remote computing environment 107 are in communication over one or more networks 102. In one or more embodiments, the external device 103 includes a transmitter 117 and the computing device 105 includes a transmitter 127 such that the external device 103 and computing device 105 can communicate via the respective transmitters 117, 127. For example, the transmitters 117, 127 are Bluetooth devices, near field communication (NFC) devices, wireless fidelity (WiF) devices, radiofrequency identification devices, or cellular devices that enable data transmission between the external device 103 and computing device 105.

The network 102 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. For example, the computing device 105 can communicate with the external device 103 over a first network 102 and communicate with the remote computing environment 107 over a second network 102.

In various embodiments, the distraction implant 101 includes mechanical elements shown and described herein (e.g., such as those shown in FIGS. 2-18). In various embodiments, the distraction implant 101 can be implanted into and removed from a patient. In at least one embodiment, a surgeon can insert the distraction implant 101 to a target site of a patient. The target site can include two or more bony portions, also referred to herein as bony portions. Non-limiting examples of target sites include cranio-maxillofacial bones, vertebrae, and extremity bones (e.g., tibia, fibula, femur, humerus, phalanges, metatarsals, etc.). In one or more embodiments, the distraction implant 101 includes a first portion including a first footplate and a second portion including a second footplate. In at least one embodiment, implanting the distraction implant 101 includes securing the first footplate to a first bony portion and securing the second footplate to a second bony portion. In various embodiments, to perform distraction, the external device 103 causes locomotion of the distraction implant 101 such that a distraction force is applied between the first footplate and the second footplate, thereby causing translation of the second footplate and second bony portion relative to the first footplate and the first bony portion, or vice versa. In one or more embodiments, a surgeon can remove the distraction implant 101 via surgery. In at least one embodiment, all or a portion of the distraction implant 101 is resorbable.

In one or more embodiments, the distraction implant 101 includes two or more footplates attached to each other via a distraction mechanism, such as a telescoping screw system. In various embodiments, the distraction mechanism translates and reverse translates the footplates relative to each other. In at least one embodiment, a first footplate secures to a first bony portion and a second footplate secures to a second bony portion. In various embodiments, the distraction mechanism applies a distraction force between the footplates, thereby initiating distraction by causing translation of the second bony portion relative to the first bony portion.

In one or more embodiments, the distraction mechanism interacts with a rotatable magnetic element via a worm gear. In various embodiments, the external device induces the magnetic element to rotate. In at least one embodiment, the rotation of the distraction implant magnetic element causes rotation of a worm, thereby rotating a worm gear. In at least one embodiment, the rotation of the worm gear translates into linear motion and displacement of the second footplate relative to the first footplate. In one or more embodiments, as the worm gear rotates, one or more telescoping components between the first footplate and second footplate extend, thereby applying a distraction force between the first footplate (e.g., and first bony portion) and the second footplate (e.g., and second bony portion). In various embodiments, the extension of the distraction implant provides distraction of the bony portions. In at least one embodiment, the distraction implant includes a first configuration and a second, mirrored configuration for providing distraction to opposing sides of a patient (e.g., right and left sides of face, right and left sides of spine, right and left extremities, etc.).

In one or more embodiments, the distraction implant 101 includes a near field communication (NFC) device 109. In various embodiments, the external device 103 includes a NFC device 111 configured to detect and communicate with the NFC device 109 (e.g., for various purposes, such as, for example detecting alignment between the external device 103 and distraction implant 101, and receiving readings from one or more sensors 113A). In various embodiments, Table 1 indicates an exemplary near-field communication (NFC) interface between the distraction implant 101 and external device 103. In some embodiments, the NFC devices 109, 111 can be any suitable wireless communication devices, such as, for example, Bluetooth-, Zigbee-, wireless fidelity (WiFi)-, infrared-, radiofrequency (RF)-, or cellular-based devices.

TABLE 1

Exemplary NFC Interface of Distraction Implant and External Device

| | |
|---|---|
| Exemplary Purpose | The purpose of this interface is to uniquely identify each implant to ensure that the correct implant is being distracted. Additionally, the NFC tag will have R/W capabilities to store distraction information such as the current distraction distance and the maximum distraction distance. |
| Potential User(s) | Surgeon and caregivers |
| Mechanical interface | The interface can function in the presence of a strong rotating magnet field and with the NFC device integrated into the housing of the distraction implant. The communication can occur over a distance of 5-15 mm, for example. |
| Exemplary Distraction Data Exchanged | From distraction implant to external device: Implant identifier Current Distraction Distance From external device to distraction implant Updated Distraction Distance |

In at least one embodiment, the distraction implant 101 includes one or more sensors 113A configured to measure one or more distraction parameters including, but not limited to, rotation of a magnet of the distraction implant 101, rotation of a worm and worm gear (e.g., or other distraction mechanism) of the distraction implant 101, expansion or contraction distance of a telescoping distraction rod (e.g., or elements thereof), torque, and distraction force. Non-limiting examples of the sensors 113A include force sensors, distance or displacement sensors, angular position sensors (e.g., gyroscope, accelerometer, etc.), encoders, and electrical performance sensors (e.g., resistance sensors, voltage sensors, current sensors, etc.). In one or more embodiments, the NFC device 109 receives sensor measurements from the one or more sensors 113A. In at least one embodiment, the external device 103 receives sensor measurements via communication between the NFC device 109 and NFC device 111.

In various embodiments, the NFC device 109 includes memory configured to store an implant identifier 136 that uniquely identifies the distraction implant 101. In one or more embodiments, the external device 103 can receive the implant identifier 136 via communication between the NFC device 109 and NFC device 111. In at least one embodiment, the external device 103 can determine an alignment between the external device 103 and the distraction implant 101 by receiving and processing signals between the NFC device 109 and NFC device 111.

In various embodiments, the external device 103 drives expansion of the distraction implant 101 through the application of a rotating magnetic field. In various embodiments, physical elements of the external device 103 are shown in FIGS. 19-28 and further described in the corresponding portions of the foregoing description. In one or more embodiments, as shown in the cross section 2800 of FIG. 28, the external device 103 includes, a motor and a driver magnet. In at least one embodiment, the external device 103 powers and activates the motor to rotate the driver magnet and, thereby, apply a torque to the magnet of the distraction implant. In various embodiments, the torque causes the magnet of the distraction implant 101 to rotate, thereby causing expansion of the distraction implant 101 via translation of the rotational motion to linear displacement.

In various embodiments, the external device 103 controls the expansion and contraction of the distraction implant 101 by applying a torque to the distraction mechanism via magnetic coupling. In some embodiments, the external device 103 is referred to as a "hand-held driver" (HHD). In one example, the distraction implant 101 includes a telescoping distraction rod coupled to a worm gear such that rotation of the worm gear (e.g., in response to rotation of a rotating magnetic element and worm) causes extension or contraction of the distraction rod (e.g., depending on the rotation direction). Continuing the example, the external device 103 can include sensing means for detecting magnetic coupling between the external device 103 and the distraction implant 101, communication and processing means for receiving and executing distraction commands, and one or more motors configured to rotate a magnet of the external device 103 (e.g., the external device magnet being magnetically coupled to and causing the rotation of the magnetic impeller).

In one or more embodiments, the external device 103 includes, but is not limited to, a power supply 110, the NFC device 111, one or more input devices 112, one or more sensors 113B, a microcontroller 115, the transmitter 117, memory 118, a motor 119, an encoder 121, and one or more effect sources 123. In at least one embodiment, the power supply 110 includes any suitable means for powering the external device 103, such as, for example, one or more batteries, one or more wireless power circuits, or one or more wired power circuits. In one or more embodiments, the power supply 110 includes one or more rechargeable batteries (e.g., lithium ion batteries or other suitable batteries). In at least one embodiment, the external device 103 includes a charging input or wireless charging circuit by which the power supply 110 receives charge. In one or more embodiments, during charging, the external device 103 disables the motor 119.

In various embodiments, the NFC device 111 includes one or more NFC reader antennae configured to read the NFC device 109. In one or more embodiments, the one or more input devices 112 are configured to receive input from a user, such as in the form of a user engaging an input device 112. In one example, the input device 112 includes a button configured to receive a user input for initiating a distraction event. As another example, the input device 112 includes a button configured to receive a user input for initiating communication pairing of the external device 103 and the computing device 105. In another example, the input device 112 includes a button configured to receive user input for rendering an indication of alignment between the external device 103 and distraction implant 101. Non-limiting examples of the input device 112 includes buttons, switches, touch interfaces, dials, and sliders. In some embodiments, the external device 103 can initiate a Bluetooth pairing with the computing device 105 via an NFC tap in which Bluetooth pairing data is received from an NFC device of the computing device 105 via the NFC device 111.

In one or more embodiments, the one or more sensors 113B measure various signals or conditions corresponding to the external device 103, the distraction implant 101, an external environment in which the external device 103 operates, or an internal environment in which the distraction implant 101 operates (e.g., a human body). In at least one embodiment, the one or more sensors 113B are configured to measure rotation of the motor 119, rotation of a magnet coupled to the motor 119, power level of the power supply 110, current and/or voltage drawn by the motor 119, internal and/or external environment temperature, and internal and/or external environment moisture level.

Figure 36:
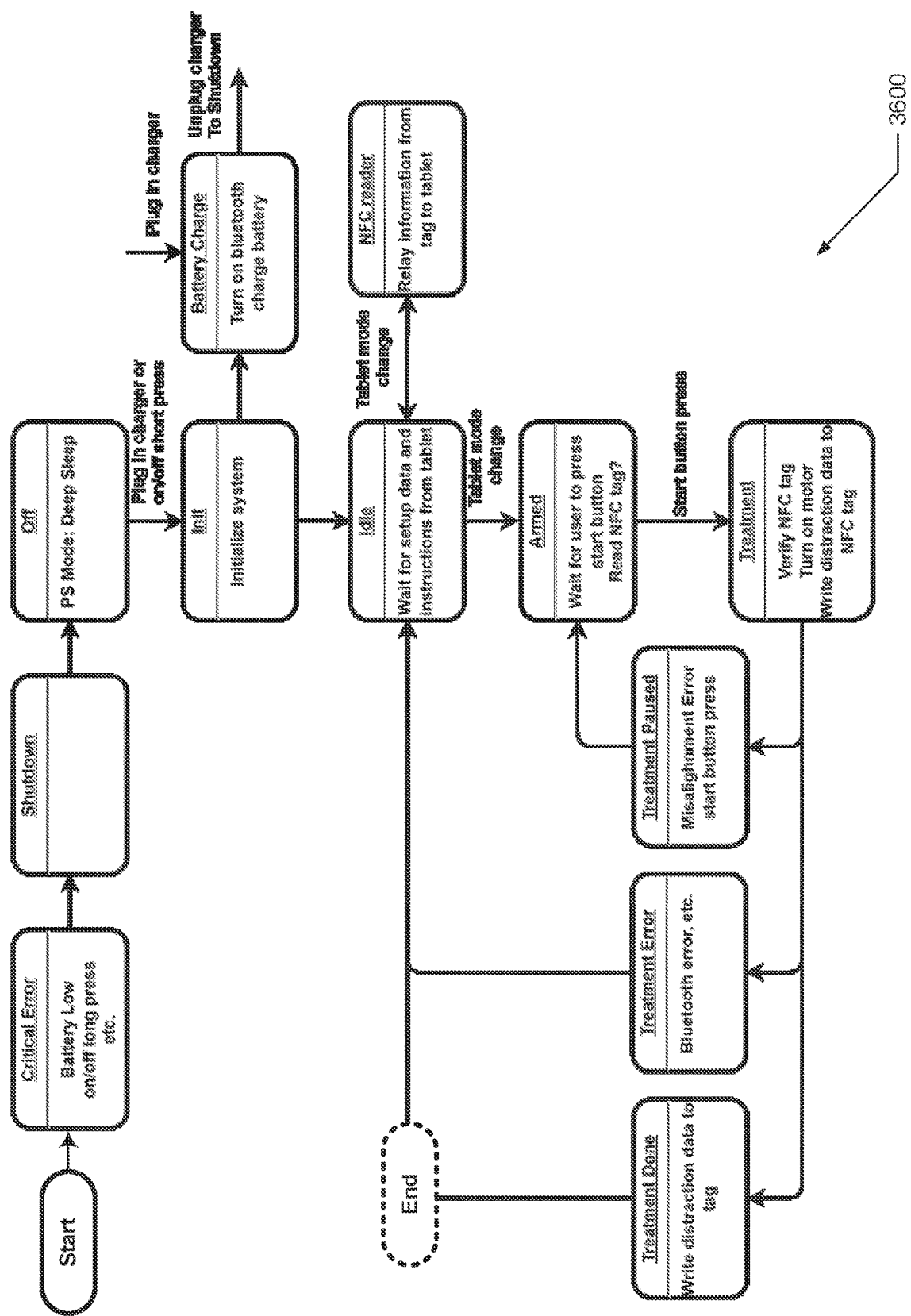
FIG. 36 shows an exemplary control loop, according to one embodiment of the present disclosure.

In various embodiments, the microcontroller 115 is configured to initiate and control various functions and processes of the external device 103 including, but not limited to, alignment detection, magnet rotation, distraction monitoring, and distraction reporting (e.g., communication of distraction-related data to the computing device 105). In at least one embodiment, the microcontroller 115 executes a control loop 3600 as shown in FIG. 36.

In one or more embodiments, the microcontroller 115 can control the various elements of the external device 103, such as the transmitter 117, motor 119, and effect sources 123. In at least one embodiment, the microcontroller 115 receives data from the NFC device 111, the transmitter 117, the sensor 113B, the encoder 121, and potentially other elements. In one or more embodiments, the microcontroller 115 can receive and process data via one or more input devices 112. For example, the microcontroller 115 can receive and process data via a universal serial bus interface (e.g., cable and port).

In various embodiments, the external device 103 includes one or more printed circuit boards (PCBs) that comprise the microcontroller 115 and/or components controlled thereby. In at least one embodiment, the PCB includes one or more universal serial busses (USBs) for transmitting data between the external device 103 and a computing device 105, and/or for transmitting power to the external device 103 (e.g., or a battery thereof). In various embodiments, the PCB includes one or more general purposes input/output pins (GIPOs) for receiving inputs from the one or more input devices. In one or more embodiments, the GPIO includes one or more debouncers configured to modulate the input device 112 to remove unwanted input noise and prevent extra or accidental activations. In at least one embodiment, the PCB includes one or more universal asynchronous receiver-transmitters (UARTSs), which may be the transmitter 117 or a separate transmission device. In one example, the transmitter 117 is a UART configured to communicate with the computing device 105 via Bluetooth.

In various embodiments, the PCB includes one or more, one or more inter-integrated circuit (I2Cs) configured to control one or more effect sources 123, such as a light emitting diode (LED) driver and a plurality of status indicator LEDS. For example, via the I2C, the microcontroller 115 controls three red-green-blue (RGB) LEDS to indicate a charge state of the external device 103, readiness status of the external device 103 and/or distraction implant 101, shutdown of the external device 103, and potentially other statuses. In one or more embodiments, the PCB includes one or more quad decoders configured to receive measurements from the encoder 121 (e.g., the measurements being indicative of the position of the motor 119). In at least one embodiment, the PCB includes a pulse width modulator configured to provide pulse width-modulated power from the power supply 110 to the motor 119. In various embodiments, the PCB includes one or more analog-to-digital converters configured to measure a magnitude of current consumed by the motor 119 and provide the current measurement to the microcontroller 115. In one or more embodiments, the PCB includes one or more serial peripheral interfaces (SPIs) configured to communicate with various elements of the external device 103 including, but not limited to, the NFC device 109 or sensor 113B. In at least one embodiment, the PCB includes one or more quad SPIs configured to communicate with elements of the external device 103 at a higher bandwidth as compared to the single SPI.

In at least one embodiment, the transmitter 117 includes a Bluetooth device. In one or more embodiments, the Bluetooth device demonstrates an output power of 8 decibel-milliwatts (dBm), or another suitable value. In various embodiments, the Bluetooth circuit demonstrates a sensitivity of 94 dBm, or another suitable value.

In one or more embodiments, the external device 103 includes memory 118 configured to store various data related to the operations and functions of the external device 103. In various embodiments, the data includes, but is not limited to, a unique identifier 136 associated with the external device 103, predefined effect patterns for indicating various statuses of the external device 103 and/or distraction implant 101, one or more thresholds 120 for controlling distraction, and historical distraction data 132 (e.g., readings from sensors 113A, 113B, such as current or voltage consumed by the motor, and readings from the encoder 121). In various embodiments, the thresholds 120 include, but are not limited to, predetermined distraction distance threshold(s), predetermined torque threshold(s), predetermined motor current threshold(s), predetermined motor current deviation threshold(s), predetermined distraction force threshold(s), predetermined current threshold(s), distraction duration threshold(s), external device—distraction implant alignment thresholds, and potentially other thresholds. In one or more embodiments, during setup or programming of the external device 103, the external device 103 receives the threshold 120 from the computing device 105 and stores the threshold 120 in memory. In various embodiments, during pairing of the external device 103 with a computing device 105, the microcontroller 115 retrieves the external device identifier 136 from memory 118 and transmits the external device identifier 136 to the computing device 105.

In various embodiments, the motor 119 is attached to a magnetic element of the external device 103 (e.g., also referred to herein as the "driver magnet"). In at least one embodiment, as the motor 119 rotates, the motor 119 rotates the attached driver magnet, thereby applying a torque to a magnetic element of the distraction implant 101 via magnetic coupling. In one or more embodiments, the motor 119 is a brushed, direct current (DC) motor. In at least one embodiment, the motor 119 is configured to operate under 100 Khz pulse width modulation. In various embodiments, the motor 119 includes a 14:1 gear ratio. In one or more embodiments, the microcontroller 115 controls the motor 119 via closed loop speed control. In various embodiments, the microcontroller 115 uses readings from the encoder 121 to maintain a constant motor speed during distraction events. In one or more embodiments, the external device 103 determines distraction distance based on counting a quantity of revolutions of the motor 119. In various embodiments, the microcontroller 115 determines the quantity of rotations based on measurements of the motor 119 from the encoder 121. In at least one embodiment, the microcontroller 115 converts the quantity of revolutions to a quantity of rotations of the driver magnet of the external device 103. In one or more embodiments, the microcontroller 115 converts the quantity of revolutions of the external device magnet to a quantity of rotations of the magnetic element of the distraction implant 101. The microcontroller 115 can convert the quantity of magnet revolutions at a 1:1 ration (e.g., assuming perfect coupling, unless an error is detected) or at another predefined ratio (e.g., 1.1:1, 1.5:1, or any suitable ratio). In various embodiments, the microcontroller 115 can apply one or more algorithms, techniques, and/or models to convert the quantity of distraction implant magnet rotations to a distraction distance. In at least one embodiment, the algorithms, techniques, and/or models convert the rotation quantity to a distance of extension or contraction of the telescoping rod(s) of the distraction implant 101, thereby providing a distraction distance between the footplates of the distraction implant 101. As further shown in the distraction control process 3100 of FIG. 31, the microcontroller 115 can monitor the alignment of the external device 103 and the distraction implant 101 by measuring and evaluating magnitudes of current drawn by the motor 119.

In one or more embodiments, the encoder 121 is coupled to the motor 119. In various embodiments, the encoder 121 generates closed loop feedback signals that measure the speed and/or position of the motor 119. In at least one embodiment, the microcontroller 115 reads or receives the speed and/or position measurements from the encoder 121. In one or more embodiments, the encoder 121 measures position and/or speed on an incremental basis. In other embodiments, the encoder 121 measures position and/or speed on an absolute basis. In at least one embodiment, the encoder 121 is an optical encoder. In some embodiments, the encoder 121 is a magnetic encoder. In one or more embodiments, the encoder 121 is an electromagnetic encoder. In at least one embodiment, the encoder 121 is a capacitive encoder.

In various embodiments, the effect sources 123 include electronic elements configured to indicate various statuses of the external device 103, the distraction implant 101, the computing device 105, or combinations thereof.

In one or more embodiments, the computing device 105 includes any network-capable computing device, such as, for example, a smartphone, tablet, or personal computer. In various embodiments, the computing device 105 includes, but is not limited to, an application 125, a transmitter 127, and memory 126. In at least one embodiment, the computing device 105 includes one or more input devices, such as a touchscreen interface, keyboard, mouse, etc. In at least one embodiment, the computing device 105 includes one or more displays.

In various embodiments, the application 125 includes one or more software programs downloaded to and installed on the computing device 105. In some embodiments, the application 125 is a browser application or a particular website accessible via a browser application. In one or more embodiments, the application 125 performs various functions related to distraction processes and workflows shown and described herein. In at least one embodiment, the application 125 performs functions including, but not limited to, communicating with the remote computing environment 107, communicating with the external device 103, monitoring activities occurring at the external device 103 and/or distraction implant 101, receiving and processing distraction data 132, determining the progress of one or more distraction protocols 128 based on distraction data 132, and generating and rendering user interfaces on one or more displays, processing user inputs. Further description of exemplary functions of the application 125 are provided in the foregoing description of the various processes and workflows of the distraction system 100.

In one or more embodiments, the application 125 receives distraction protocols 128 from the remote computing environment 107. In at least one embodiment, the application 125 processes the distraction protocol 128 to retrieve or generate parameters for performing distraction treatments. In various embodiments, the application 125 transmits the distraction protocol 128 and/or distraction parameters to the external device 103. In one or more embodiments, the application 125 receives and processes distraction data 132 from the external device 103, such as, for example, measurements of distraction distance, measurements of motor current, NFC identifiers 136, measurements of applied magnetic torque. In at least one embodiment, the application 125 communicates with a distraction service 129 of the remote computing environment 107 to perform distraction related processes and workflows shown and described herein. In one or more embodiments, the application 125 communicates with an authentication service 130 of the remote computing environment 107 to perform user account creation, user login, and authentication functions. Table 2 indicates an exemplary data communication interface between the application 125 and the external device 103.

TABLE 2

Exemplary Data Communication Interface of Application and External Device

| | |
|---|---|
| Exemplary Purpose | The interface can actively controls the distraction process and relays distraction data from the external device to a computing device |
| Exemplary Users | Surgeon and caregivers |
| Mechanical | The external device can be in sufficient proximity (e.g., Bluetooth communication range) to the computing device associated with the application |
| Exemplary Communication | Bluetooth v5.0 |
| Exemplary Data Exchange | From the external device to application<br>Implant identification<br>External device battery status<br>External device user interface (e.g., user inputs)<br>Distraction data (e.g., distraction force, distraction torque motor current, distraction distance)<br>Error information<br>From the application to external device<br>Command and/or approval to initiate distraction event<br>Distraction protocol including desired distraction distance and potentially other distraction parameters<br>Command to suspend or terminate distraction event |

In one or more embodiments, the application 125 generates graphical user interfaces for controlling various aspects and functions of the distraction system. Tables 3 and 4 indicate exemplary graphical user interface (GUI) schemas.

TABLE 3

Exemplary GUI Schema for Distraction Implant Setup

| | |
|---|---|
| Exemplary Purpose | Assist in installing distraction implants, setting up distraction plans and reviewing patient compliance with a distraction plan. |
| Exemplary User | Surgeon |
| Input method | User selection and/or data entry |
| Exemplary input data | Distraction plan, patient data, implant placement data |

TABLE 4

Exemplary GUI Schema

| | |
|---|---|
| Exemplary Purpose | Guide a caregiver to executing distraction events |

TABLE 4-continued

Exemplary GUI Schema

| | |
|---|---|
| Exemplary User | Caregiver or patient |
| Input method | User selection and/or data entry |
| Exemplary input data | Input for initiating distraction (e.g., button press, switch flip, etc.), user credentials, patient-type user account identifier |

In various embodiments, the transmitter 127 is configured to receive and transmit data from and to the external device 103 via a network 102, such as a Bluetooth network or other suitable communication means. In one or more embodiments, the transmitter 127 is configured to transmit and receive data to and from the remote computing environment 107 via a network 102, such as via a particular network address associated with the remote computing environment 107.

In at least one embodiment, the memory 126 is configured to store data related to various functions and activities of the distraction system 100. In one or more embodiments, the memory 126 can store distraction data 132 received from the external device 103 or the remote computing environment 107. In various embodiments, the memory 126 can store one or more distraction protocols 128. In at least one embodiment, the distraction protocol 128 includes one or more parameters for performing a distraction event including, but not limited to, distraction distance and distraction event scheduling. In one or more embodiments, the memory 126 stores a distraction plan including a plurality of distraction protocols 128.

In various embodiments, the remote computing environment 107 is a remote server processor configured to perform various distraction-related processes, workflows, functions, and operations shown and described herein. In at least one embodiment, the remote computing environment 107 is a software as a service (SaaS) platform. In one or more embodiments, the remote computing environment 107 includes, but is not limited to, a distraction service 129, an authentication service 130, and one or more data stores 131. Various data are stored in the data store(s) 131 that are accessible to the distraction system 100 (e.g., access to particular data being potentially dependent on a level of privilege associated with a user account 134). The data store 131 can be representative of a plurality of data stores as can be appreciated. The data store 131, or elements thereof, can be server-based or blockchain-based. The data stored in the data store 131, for example, may be associated with the operation of the various applications and/or functional entities described herein. The data store 131 can include, but is not limited to, distraction data 132, one or more user accounts 134, and one or more identifiers 136.

In at least one embodiment, the distraction data 132 includes any data related to planning, performing, monitoring, or evaluating distraction treatments. Non-limiting examples of the distraction data 132 include distraction plans, distraction protocols 128 distraction parameters, implant target sites, and thresholds 120. The distraction data 132 can include data associated with historical distraction plans, distraction protocols 128, and distraction events. Table 6 indicates non-limiting examples of distraction parameters.

TABLE 5

Exemplary Distraction Parameters

| Exemplary Distraction Parameter | Exemplary Source | Format | Exemplary Range + Increments | Exemplary Default Value |
|---|---|---|---|---|
| Implantation Date | User Input | Date Format | Date | N/A |
| Starting position | Based on current position of implant when setting up protocol. | MM | 0-30 mm | N/A |
| Latency Period | User Input | Days | 0-14, integers | N/A |
| Protocol Start Date | Calculated | Date Format | Date | N/A |
| Total distraction Distance (mm) | User Input | mm | 0 to implant limit in 1 mm Increments | 20 mm (e.g., mandible) 30 mm (e.g., crainal) |
| Final Implant Position | Calculated | mm | 0-30 mm | N/A |
| Distraction Distance per Day | User Input | mm | 0.5-3.0 mm- 0.1 mm | 1 mm |
| Distractions Per Day (Interval) | User Input | interger | 1, 2, 3 | 2 |
| Estimated Days of therapy | Calculated | Days | 0 to 60, integers | N/A |
| Distraction Event Distance | Calculated | mm | 0.1667 mm to 3.0 mm | N/A |

In one or more embodiments, the user account 134 can include login credentials associated with a user, such as username, email, and/or password. In various embodiments, the user account 134 can include associations between the user account 134 and one or more identifiers 136 and associations between different identifiers 136. For example, the user account 134 can be associated with a first identifier 136 corresponding to a physician, a second identifier 136 corresponding to a patient, a third identifier 136 corresponding to a computing device 105, a fourth identifier 136 corresponding to an external device 103, and a fifth identifier 136 corresponding to a particular distraction implant 101. In at least one embodiment, the user account 134 includes associations between the user account 134 and distraction data 132. In various embodiments, the user account 134 includes associations between the user account 134 and one or more distraction plans (e.g., or one or more distraction protocols 128 thereof).

In one or more embodiments, the distraction service 129 can determine a distraction plan, or distraction protocol 128 thereof, associated with a user account 134. In various embodiments, the distraction service 129 can transmit the distraction protocol 128 to the computing device 105. In at least one embodiment, the distraction service 129 can receive and process distraction data 132 from the computing device 105. In various embodiments, the distraction service 129 can monitor the progress of distraction plans, distraction protocols 128, and distraction events based on the distraction data 132 associated therewith. In one or more embodiments, the distraction service 129 can approve or disapprove the computing device 105 to initiate or resume a distraction event. In at least one embodiment, the distraction service 129 can command the computing device 105 to suspend or terminate a distraction event. In one or more embodiments, the distraction service 129 can update or modify a distraction plan (e.g., automatically or in response to inputs from a physician-type user account 134). The distraction service 129 can perform additional processes, workflows, and functions shown in the figures and discussed in the proceeding descriptions of the distraction system 100. Table 6 indicates an exemplary communication interface between computing device 105 and remote computing environment 107.

TABLE 6

Exemplary Communication Interface of Computing Device and Remote Computing Environment

| | |
|---|---|
| Exemplary Purpose | Transmit and store distraction data, distraction Plans, and implant data |
| Exemplary User | Surgeon, technician |
| Exemplary communication mode | Secure network address and suitable network communication means |
| Exemplary data exchanged (uni- or bi-directional) | Patient identifier Patient date of birth Patient gender Physician identifier Computing device identifier Implant identifier Distraction Plan Implantation date Latency period Interval (e.g., distraction events per day) Daily distraction distance Total distraction imit Completed distraction events (e.g., date, time, distance, force, torque, error condition(s), etc.) |

In one or more embodiments the authentication service 130 can perform actions including, but not limited to, user account creation, user account login and authentication, computing device authentication, external device authentication, and distraction implant authentication. In various embodiments, the authentication service 130 can receive and transmit identifiers 136 to and from the computing device 105. In at least one embodiment, the authentication service 130 can compare identifiers 136 to determine a match therebetween or co-association with a user account 134.

Exemplary Physical Aspects

Figure 2:
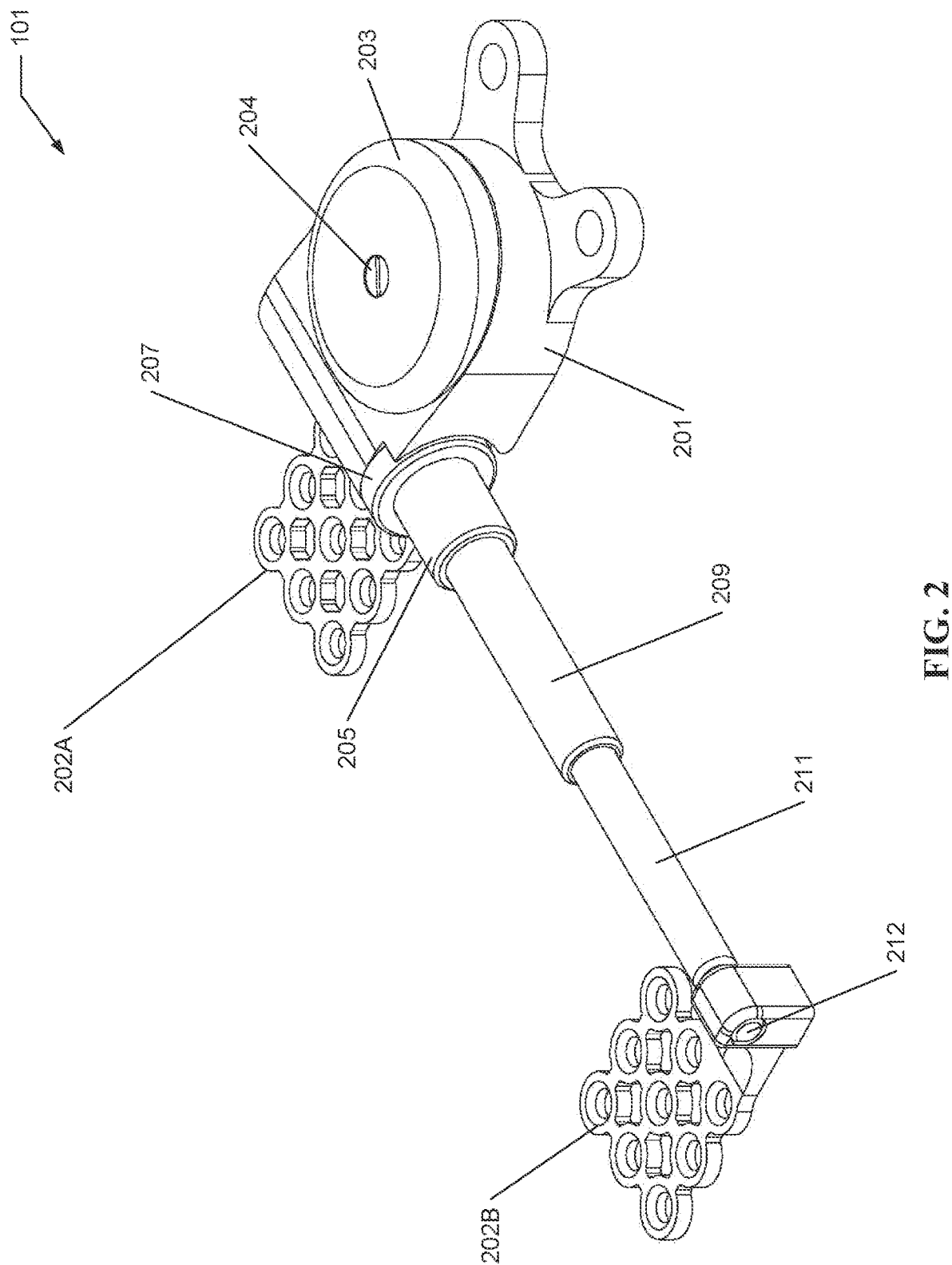
FIG. 2 shows a top perspective view of an exemplary distraction implant, according to one embodiment of the present disclosure.

FIG. 2 shows a top perspective view of an exemplary distraction implant 101. In one or more embodiments, the distraction implant 101 includes, but is not limited to, a housing 201, a first footplate 202A, a second footplate 202B, a cap 203, a retention screw 204, a worm gear 205, a front bearing 207, a central shaft 209, and a distal shaft 211. While not shown in FIG. 2, the distraction implant 101 can include a near-field communication device configured to be read by an external device, a magnetic element configured to rotate in response to torque applied by a driver magnet of the external device, and a worm configured to rotate in response to rotation of the magnetic element, thereby engaging the worm gear 205 to convert the rotational motion into linear displacement of the central shaft 209 and/or distal shaft 211.

In various embodiments, the distraction implant 101 is comprised of one or more biocompatible materials including, but not limited to, titanium, titanium alloys, polyetheretherketone (PEEK), and stainless steel (e.g., nitronic 50, 316 stainless steel, or other suitable steels). In one example, the cap 203 is comprised of PEEK material and the other components of the distraction implant 101 are comprised of stainless steel. In at least one embodiment, components of the distraction implant 101 comprised of metal are case hardened. In one or more embodiments, the metal-comprising components are case hardened via plasma nitriding and/or other suitable case hardening techniques.

In one or more embodiments, the first footplate 202A and the housing 201 can be integrally formed or attached via suitable means (e.g., fasteners, welds, etc.). In at least one embodiment, the first footplate 202A and second footplate 202B are configured to be secured to bony portions via one or more fasteners, such as a bone screw. For example, the first footplate 202A can be inserted and secured to a first portion of a mandible bone and the second footplate 202B can be inserted and secured to a second portion of a mandible bone. In one or more embodiments, the distraction implant 101 can expand or contract to linearly displace the second footplate 202B relative to the first footplate 202A, thereby initiating distraction at the implant target site. In various embodiments, initiating distraction refers to stretching or pulling apart two or more bony portions such that osteogenesis occurs therebetween, thereby resulting in bone expansion (e.g., for purposes of increasing one or more dimensions of the bone(s), such as bone width, bone length, bone depth, or combinations thereof). In at least one embodiment, the housing 201 and each footplate 202A, 202B includes one or more voids configured to receive a fastener for securing the distraction implant 101 to a target site.

In various embodiments, the worm gear 205 is configured to rotate in response to rotation of a worm (e.g., the worm rotating in response to rotation of a magnetic element). In one or more embodiments, the central shaft 209 and the distal shaft 211 are configured to linearly extend or contract in response to rotation of the worm gear 205. The central shaft 209 and the distal shaft 211 can expand telescopically. In some embodiments, the central shaft 209 and the distal shaft 211 are referred to collectively as a telescoping "distraction rod." In at least one embodiment, the second footplate 202B is secured to a distal end 212 of the distal shaft 211 such that the second footplate 202B extends or contracts in concert with extension or contraction of the distal shaft 211. In one or more embodiments, the front bearing 207 (e.g., and/or additional bearings, not shown in FIG. 2), secure the position of the worm gear 205 within the housing 201 such that the worm gear 205 does not translate in response to a component force from the worm (not shown). In at least one embodiment, the cap 203 and retention screw 204 secure an NFC device, a magnetic element, and a worm in place within the housing 201 (e.g., as shown in the exploded view of the distraction implant 101 in FIG. 4).

Figure 3:
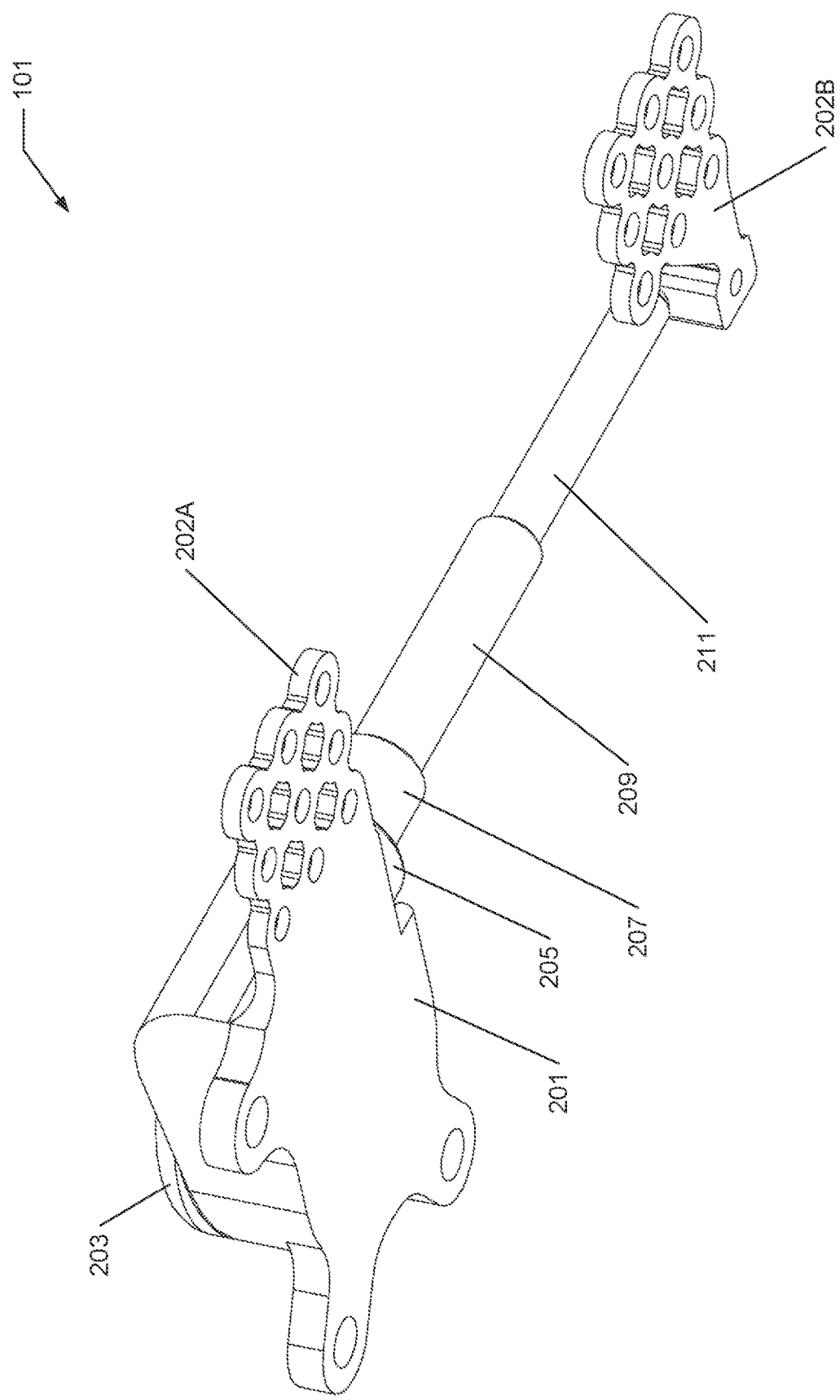
FIG. 3 shows a bottom perspective view of the exemplary distraction implant, according to one embodiment of the present disclosure.

FIG. 3 shows a bottom perspective view of an exemplary distraction implant 101.

Figure 4:
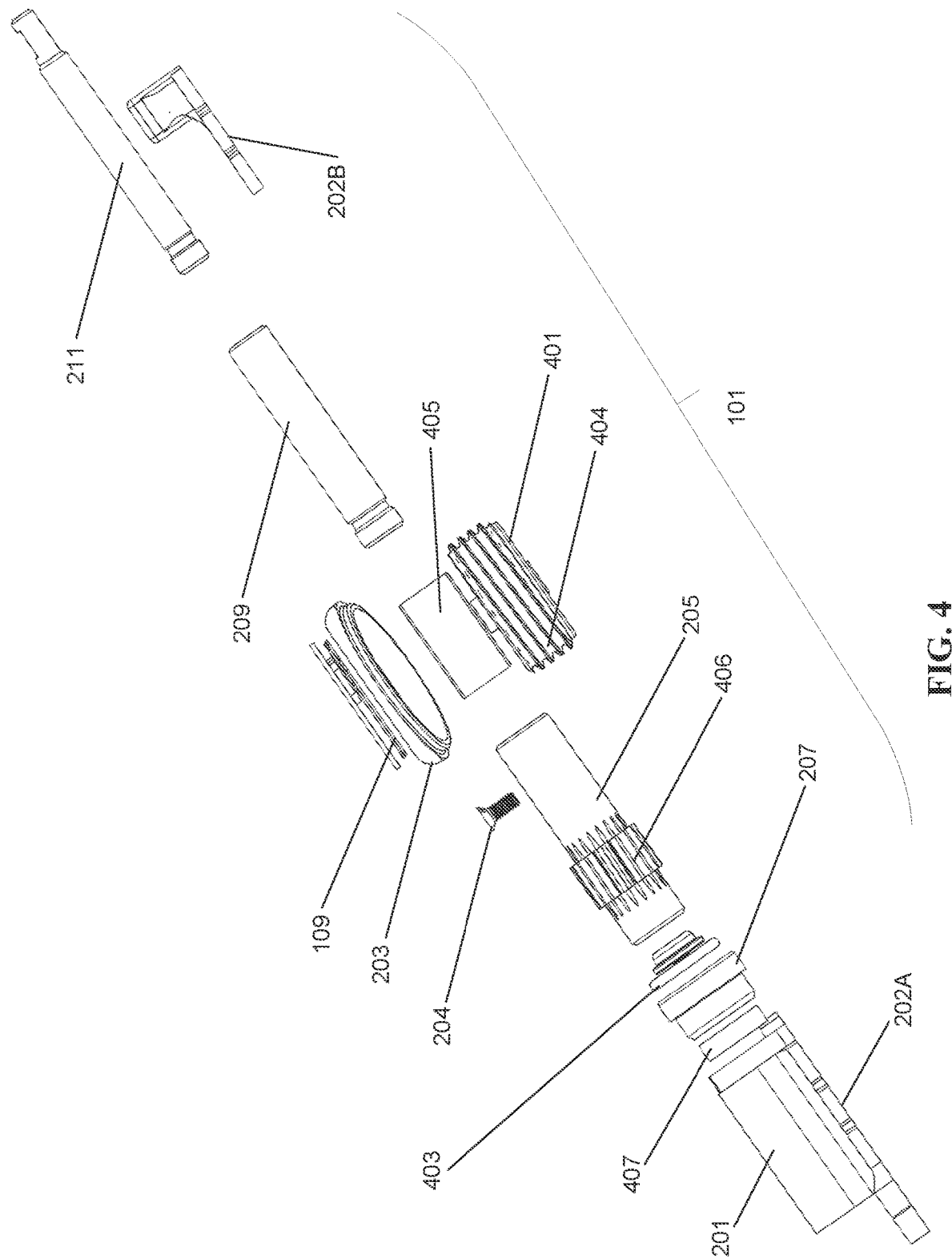
FIG. 4 shows an exploded view of the exemplary distraction implant, according to one embodiment of the present disclosure.

FIG. 4 shows an exploded view of an exemplary distraction implant 101. In various embodiments, the distraction implant 101 further includes a NFC device 109, a worm 401, a rear bearing 403 (e.g., positioned rearward of the front bearing 207 when assembled), and a magnetic element 405. In at least one embodiment, when the distraction implant 101 is assembled, the rear bearing 403 is positioned rearward of the front bearing 207. In one or more embodiments, the rear bearing 403 secures the position of the worm gear 205 within the housing 201 such that the worm gear 205 does not translate in response to a component force from the worm.

In at least one embodiment, the worm 401 includes a threading 404 configured to interface with teeth 406 of the worm gear 205. One or more embodiments, the teeth 406 are a crossed helical gear set that is advantageously insensitive to malpositioning. In one or more embodiments, the worm 401 and the worm gear 205 include a dry film lubricant for ensuring smooth operation. In some embodiments, in addition to or in place of the dry film lubricant, the worm 401 and the worm gear 205 include wet lubrication, such as a biomcompatible grease.

In various embodiments, the distraction implant 101 includes a medial bearing 407 configured to secure the position of the worm gear 205 within the housing 201.

Figure 5:
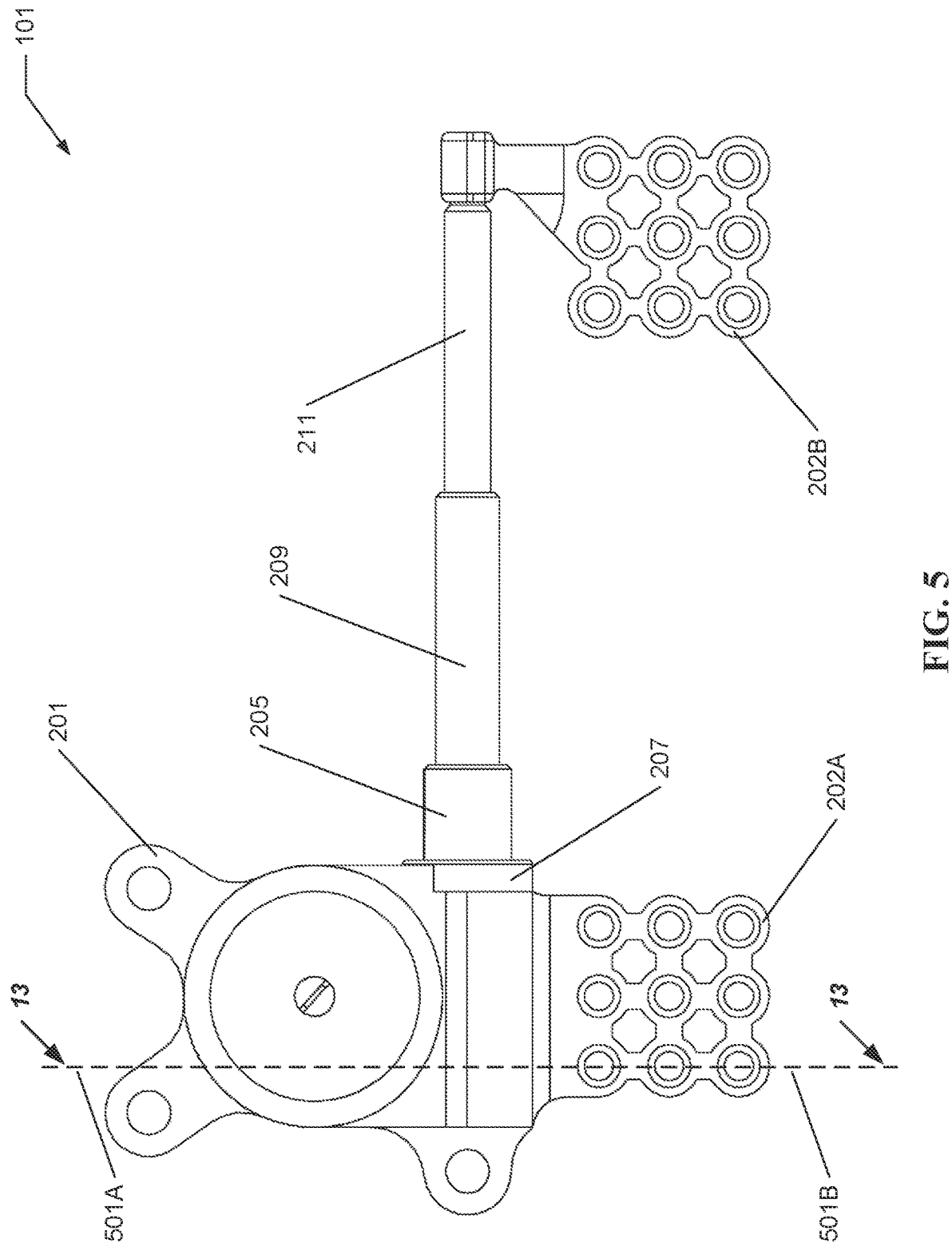
FIG. 5 shows a top view of the exemplary distraction implant, according to one embodiment of the present disclosure.

FIG. 5 shows a top view of an exemplary distraction implant 101. In one or more embodiments, section lines 501A, 501B denote a cross section 1300 shown in FIG. 13.

Figure 6:
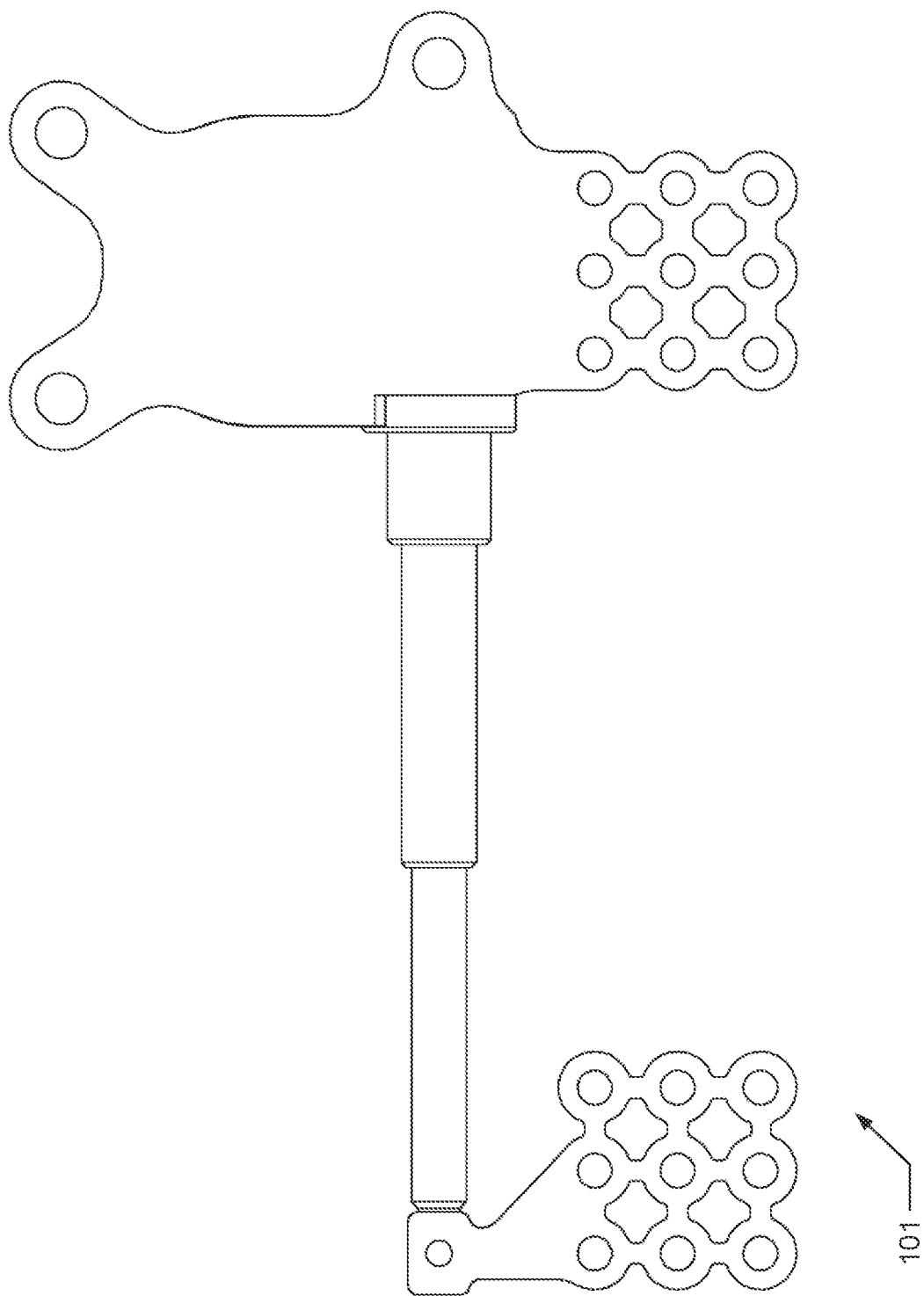
FIG. 6 shows a bottom view of the exemplary distraction implant, according to one embodiment of the present disclosure.

FIG. 6 shows a bottom view of an exemplary distraction implant 101.

Figure 7:
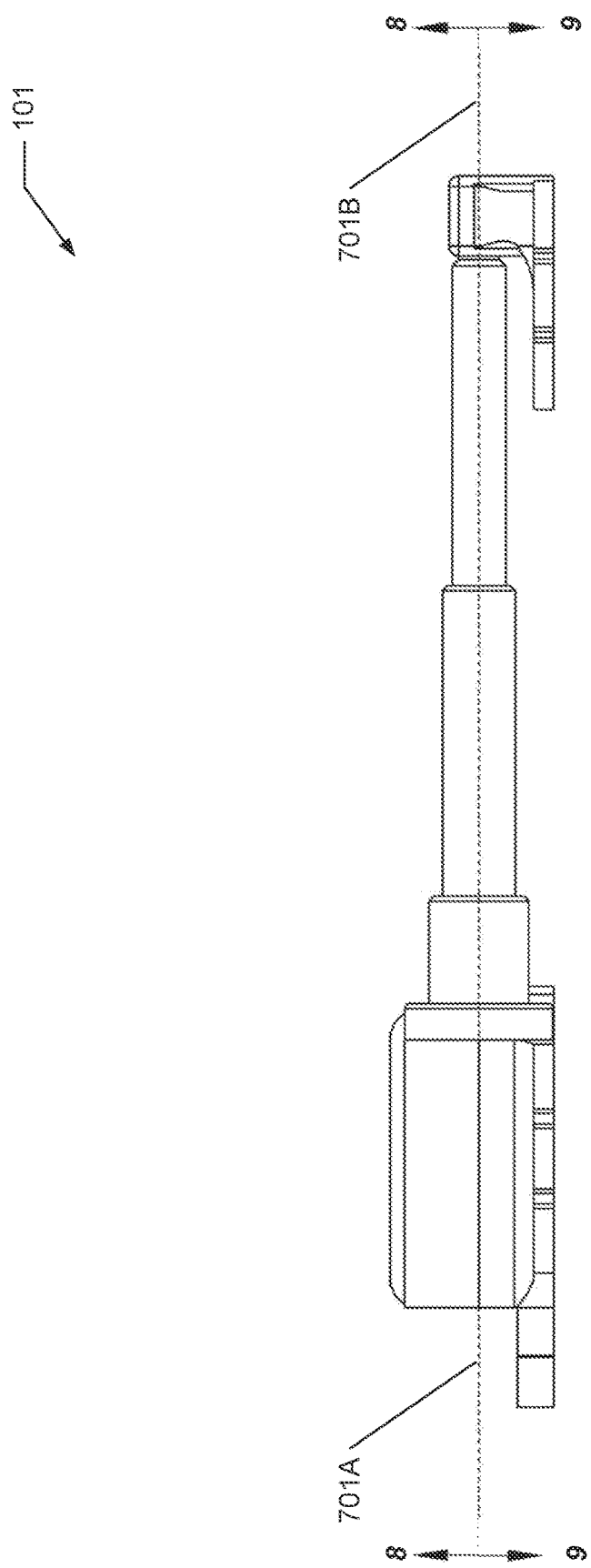
FIG. 7 shows a left side view of the exemplary distraction implant, according to one embodiment of the present disclosure.

FIG. 7 shows a left side view of an exemplary distraction implant 101. In various embodiments, section lines 701A, 701B denote a cross section 800 shown in FIG. 8 and a cross section 900 shown in FIG. 9.

Figure 8:
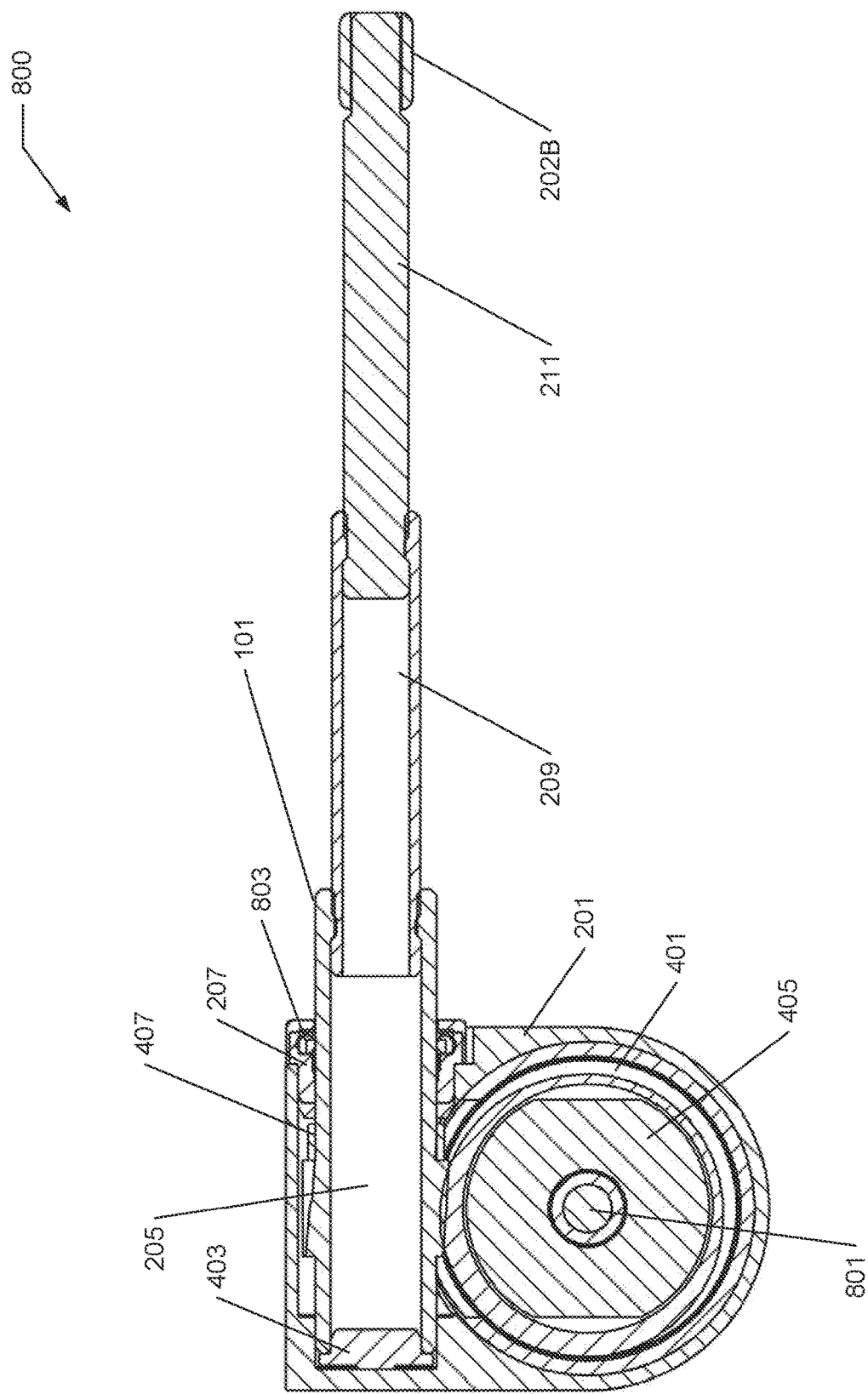
FIG. 8 shows a cross section of the exemplary distraction implant, according to one embodiment of the present disclosure.

FIG. 8 shows a cross section 800 of an exemplary distraction implant 101. As shown in the cross section 800, the housing 201 can include a central shaft about which the magnetic element 405 and the worm 401 rotate. In one or more embodiments, the magnetic element 405 is affixed to the worm 401 such that the components rotate in concert. In some embodiments, the worm 401 includes an internal void shaped to conform to a profile of the magnetic element 405, thereby ensuring the components rotate in concert. In one or more embodiments, the worm 401 meshes with the worm gear 205 such that rotation of the worm 401 causes rotation of the worm gear 205. In one or more embodiments, the central shaft 209 meshes with the worm gear 205 such that rotation of the worm gear 205 causes partial rotation and linear displacement of the central shaft 209. In at least one embodiment, the distal shaft 211 meshes with the central shaft 209 such that rotation of the central shaft 209 causes partial rotation and linear displacement of the distal shaft 211.

In one or more embodiments, the front bearing 207, rear bearing 403, and medial bearing 407 secure the position of the worm gear 205 within the housing 201. In various embodiments, the distraction implant 101 includes an O-ring 803 configured seal the housing 201 against escape or infiltration of fluid or air. The O-ring 803 can be comprised of a non-resorbable, flexible material such that the O-ring 803 is not degraded within the body.

Figure 9:
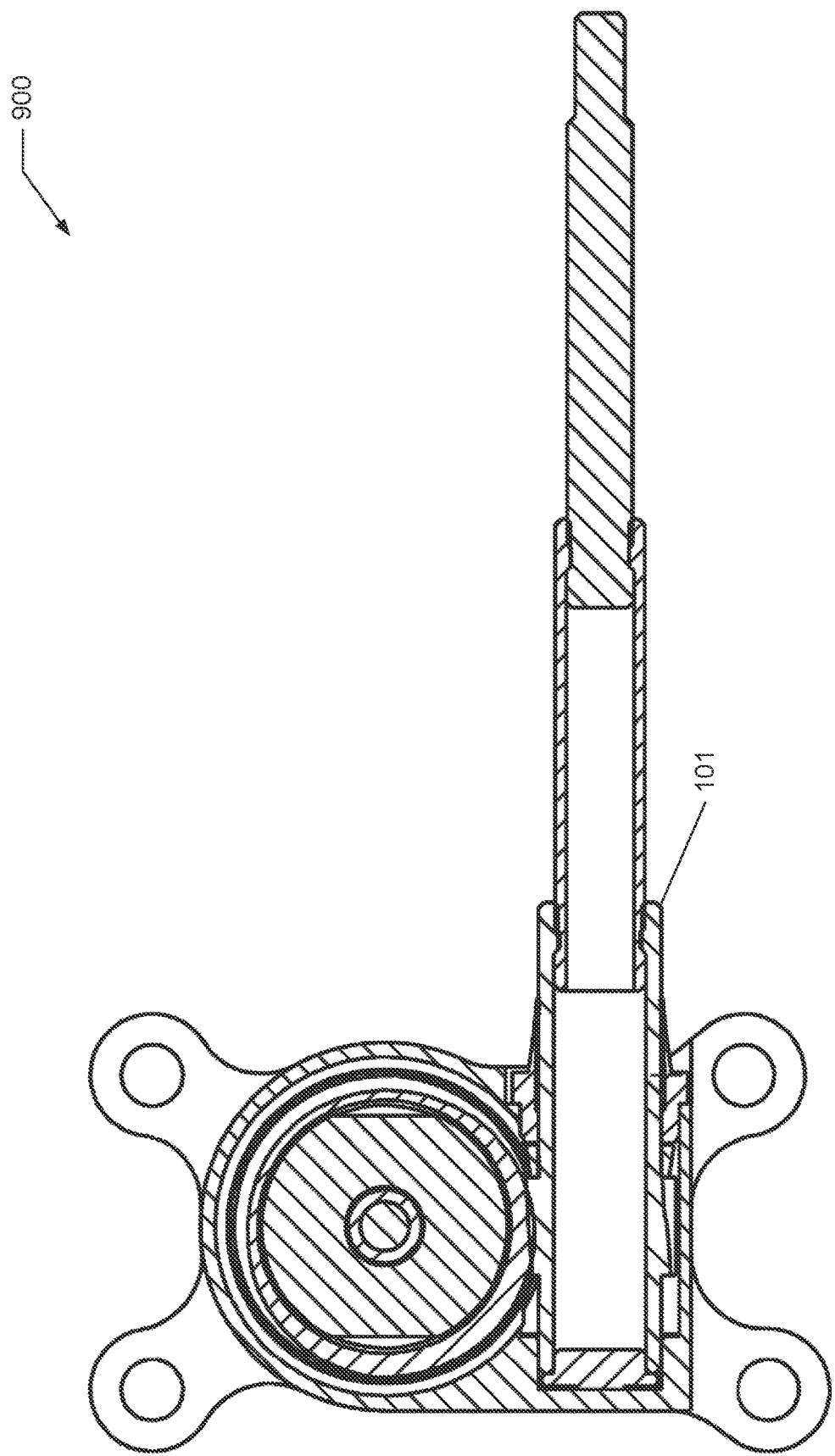
FIG. 9 shows a cross section of the exemplary distraction implant, according to one embodiment of the present disclosure.

FIG. 9 shows a cross section 900 of an exemplary distraction implant 101.

Figure 10:
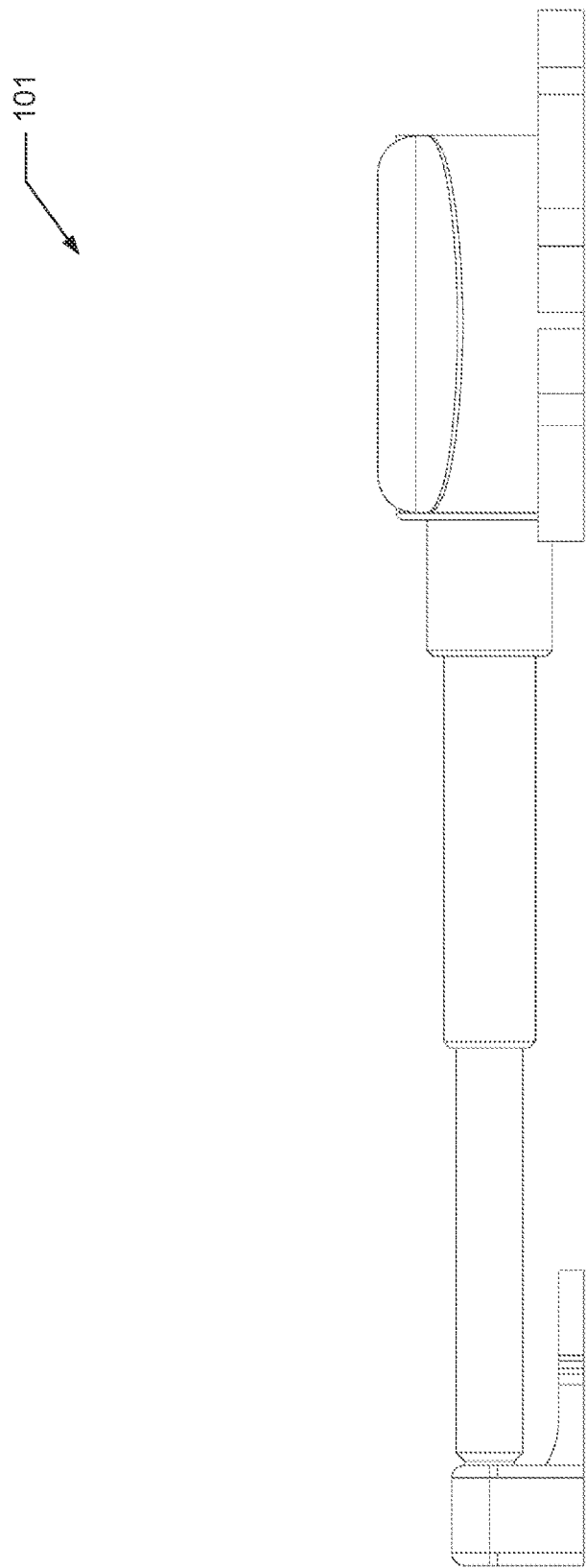
FIG. 10 shows a right side view of the exemplary distraction implant, according to one embodiment of the present disclosure.

FIG. 10 shows a right side view of an exemplary distraction implant 101.

Figure 11:
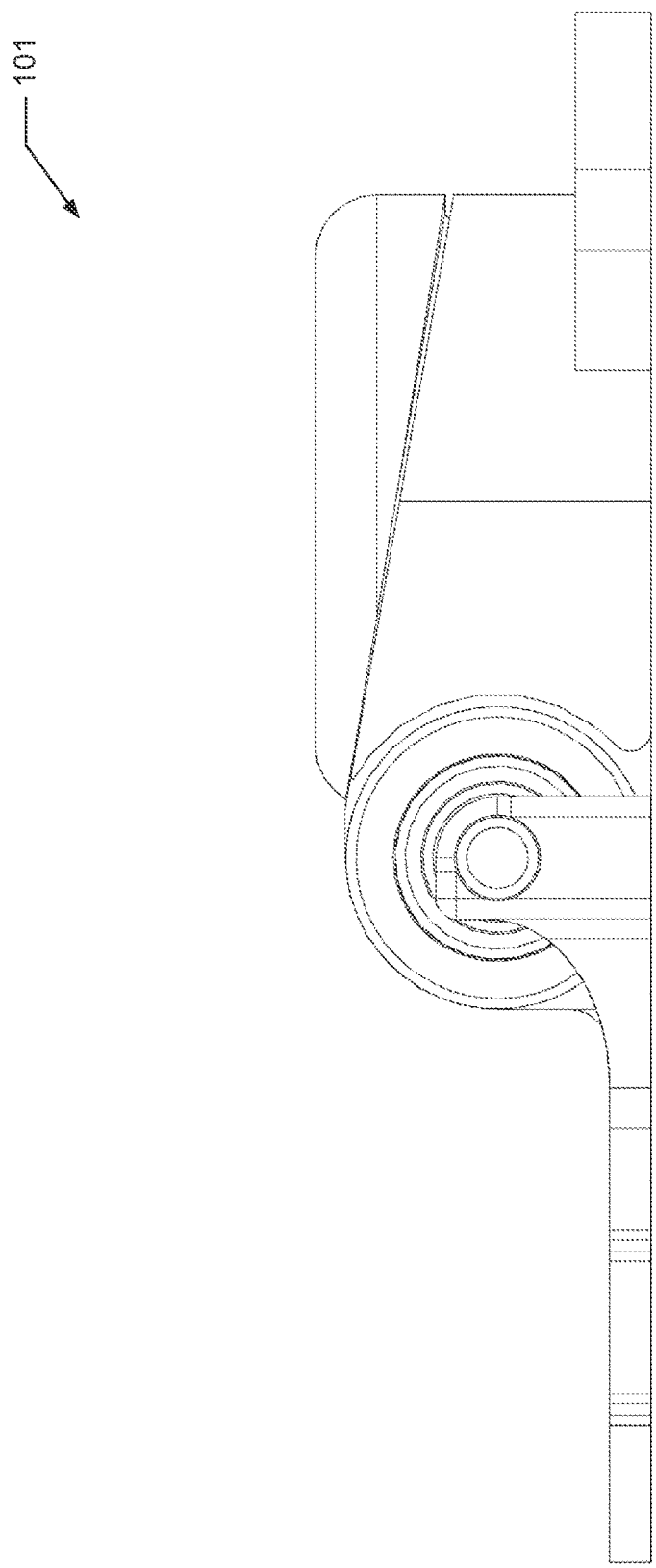
FIG. 11 shows a front view of the exemplary distraction implant, according to one embodiment of the present disclosure.

FIG. 11 shows a front view of an exemplary distraction implant 101.

Figure 12:
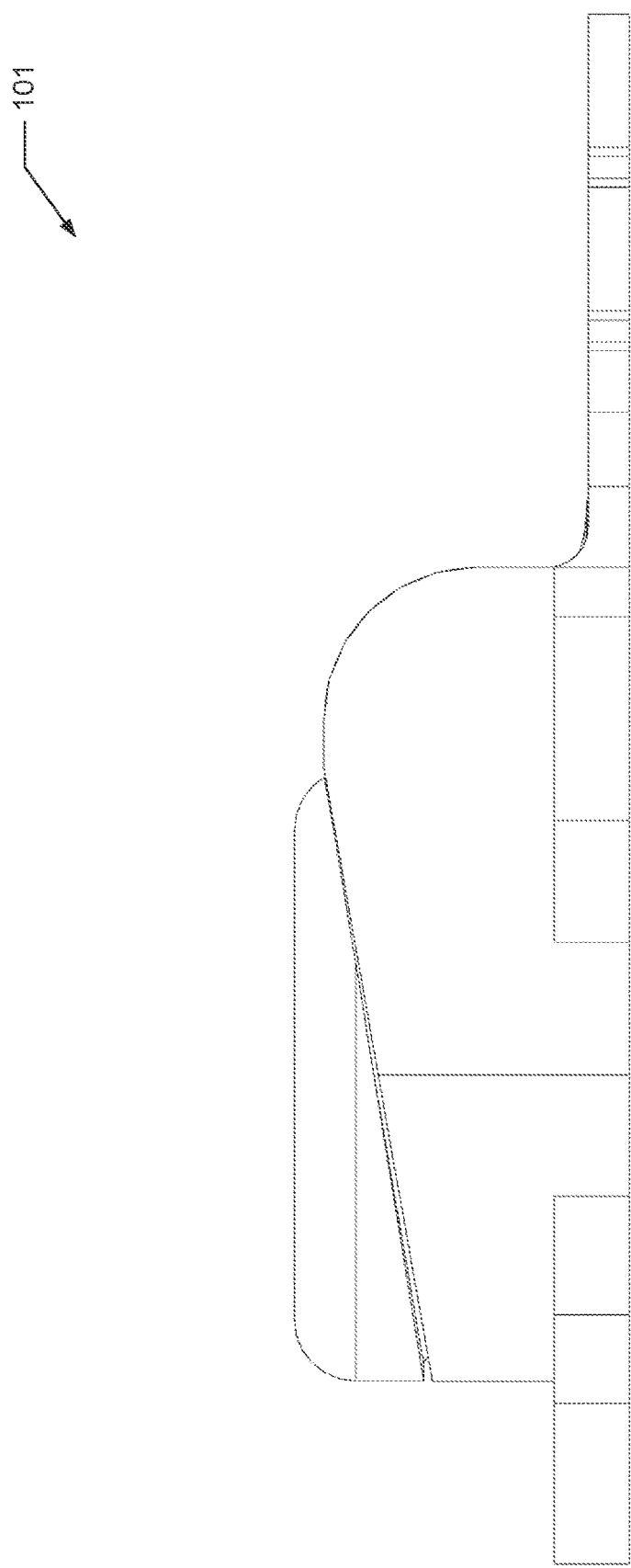
FIG. 12 shows a back view of the exemplary distraction implant, according to one embodiment of the present disclosure.

FIG. 12 shows a back view of an exemplary distraction implant 101.

Figure 13:
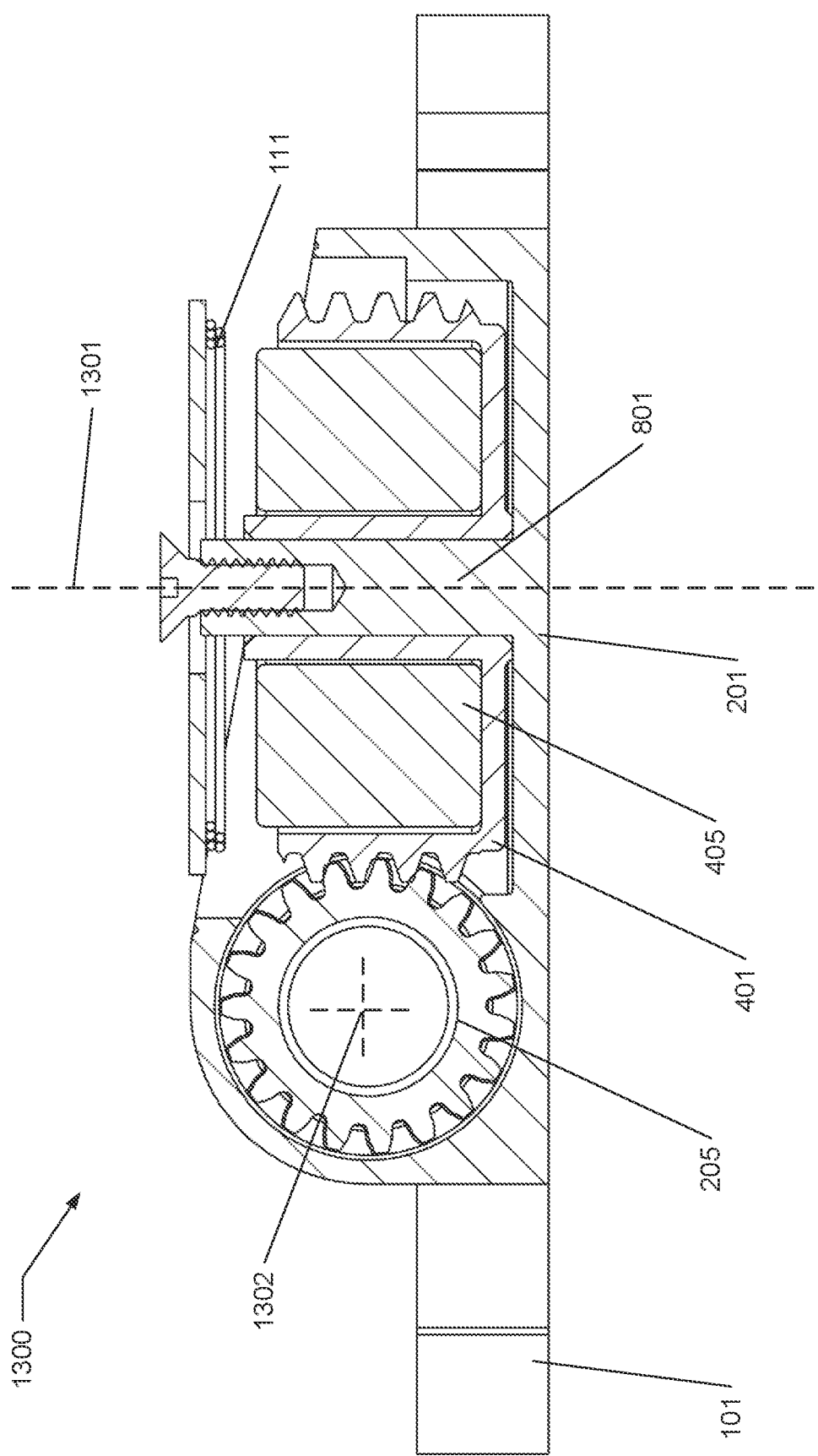
FIG. 13 shows a cross section of the exemplary distraction implant, according to one embodiment of the present disclosure.

FIG. 13 shows a cross section 1300 of an exemplary distraction implant 101. To permit better viewing of internal components of the distraction implant 101, the cross section 1300 shown in FIG. 13 omits the cap 203 (e.g., shown in FIG. 2). As shown in the cross section 1300, the magnetic element 405 is configured to rotate about a central shaft 801 of the housing 201. In various embodiments, the worm 401 is configured to rotate in concert with the magnetic element 405. In at least one embodiment, the worm 401 meshes with the worm gear 205 such that rotation of the worm 401 about a first axis causes rotation of the worm gear 205 about a second axis perpendicular to the first axis (e.g., or at another angle offset to first axis).

FIG. 14A shows a perspective view of an exemplary cap 203 of a distraction implant.

FIG. 14B shows a top view of an exemplary cap 203 of a distraction implant.

FIG. 14C shows a bottom view of an exemplary cap 203 of a distraction implant.

FIG. 14D shows a side view of an exemplary cap 203 of a distraction implant.

FIG. 14E shows a cross section of an exemplary cap 203 of a distraction implant. In various embodiments, the cap 203 includes a sloped shape configured to accommodate the magnetic element 405, worm 401, and worm gear 205 of the distraction implant (not shown, see FIG. 4). In at least one embodiment, the sloped shape of the cap 203 ensures conformal fit with and sealing of the housing 201 (not shown, see FIG. 2).

Figure 15A:
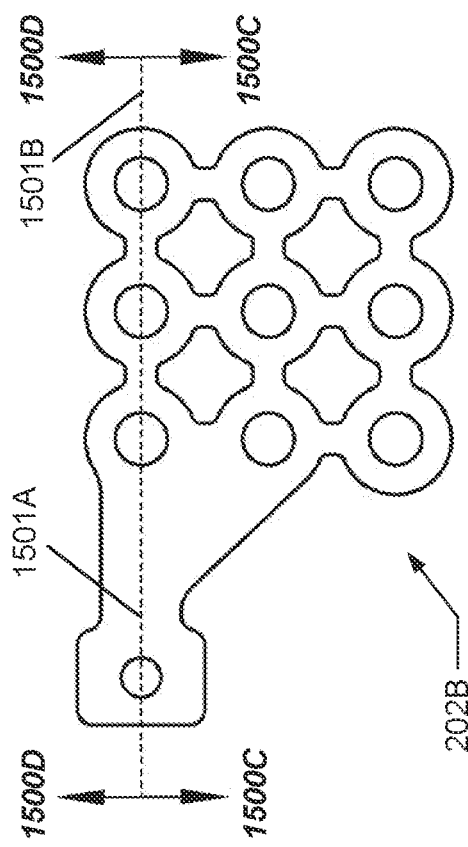
FIG. 15A shows a perspective view of an exemplary footplate of the distraction implant, according to one embodiment of the present disclosure.

FIG. 15A shows a perspective view of an exemplary footplate 202B of a distraction implant.

Figure 15B:
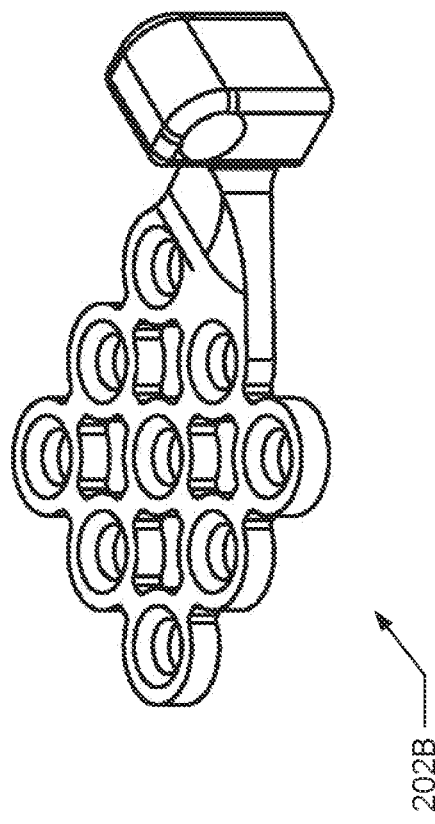
FIG. 15B shows a top view of the exemplary footplate of the distraction implant, according to one embodiment of the present disclosure.

FIG. 15B shows a bottom view of an exemplary footplate 202B of a distraction implant. In various embodiments, a section line 1501A, 1501B denotes a cross section 1500C of the footplate 202B shown in FIG. 15C and a cross section 1500D of the footplate 202B shown in FIG. 15D.

Figure 15D:
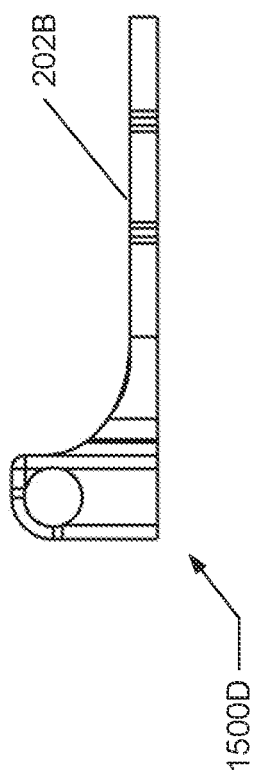
FIG. 15D shows a cross section of the exemplary footplate of the distraction implant, according to one embodiment of the present disclosure.
Figure 15C:
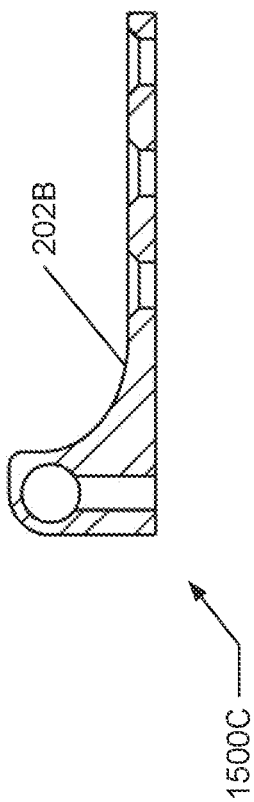
FIG. 15C shows a bottom view of the exemplary footplate of the distraction implant, according to one embodiment of the present disclosure.

FIG. 15C shows a cross section 1500C of an exemplary footplate 202B of a distraction implant.

FIG. 15D shows a cross section 1500D of an exemplary footplate 202B of a distraction implant.

Figure 16B:
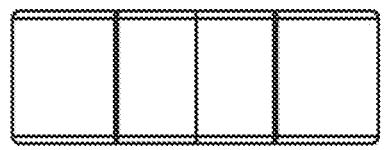
FIG. 16B shows a side view of the exemplary magnet of the distraction implant, according to one embodiment of the present disclosure.
Figure 16D:
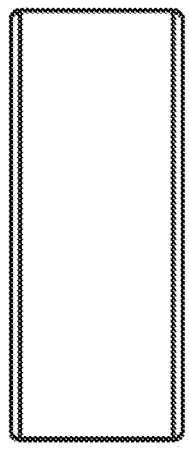
FIG. 16D shows a side view of the exemplary magnet of the distraction implant, according to one embodiment of the present disclosure.
Figure 16A:
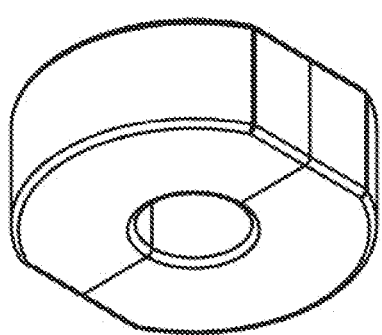
FIG. 16A shows a perspective view of an exemplary magnet of the distraction implant, according to one embodiment of the present disclosure.

FIG. 16A shows a perspective view of an exemplary magnetic element 405 of a distraction implant. The magnetic elements 405 shown in FIGS. 16A-D, 17A-D, and 18A-D demonstrate varying dimensions. In at least one embodiment, the greater the size of the magnetic element 405, the greater the magnitude of the distraction force that may be applied by the distraction implant 101 via rotational coupling of the magnetic element 405 with a driver magnet of an external device.

FIG. 16B shows a side view of an exemplary magnetic element 405 of a distraction implant.

Figure 16C:
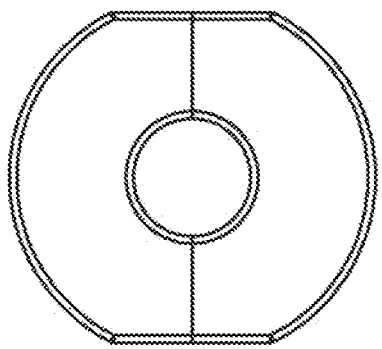
FIG. 16C shows a top view of the exemplary magnet of the distraction implant, according to one embodiment of the present disclosure.

FIG. 16C shows a top view of an exemplary magnetic element 405 of a distraction implant.

FIG. 16D shows a side view of an exemplary magnetic element 405 of a distraction implant.

Figure 17B:
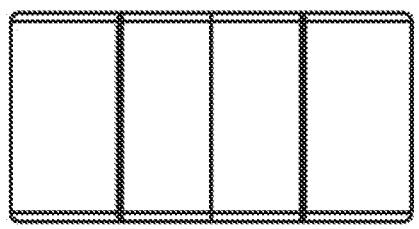
FIG. 17B shows a side view of the exemplary magnet of the distraction implant, according to one embodiment of the present disclosure.
Figure 17D:
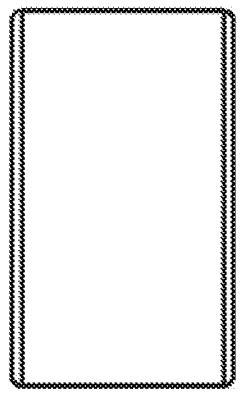
FIG. 17D shows a side view of the exemplary magnet of the distraction implant, according to one embodiment of the present disclosure.
Figure 17A:
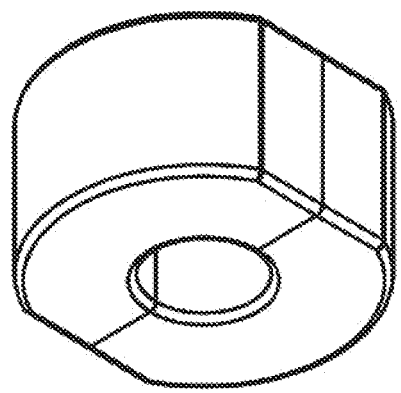
FIG. 17A shows a perspective view of an exemplary magnet of the distraction implant, according to one embodiment of the present disclosure.

FIG. 17A shows a perspective view of an exemplary magnetic element 405 of a distraction implant.

FIG. 17B shows a side view of an exemplary magnetic element 405 of a distraction implant.

Figure 17C:
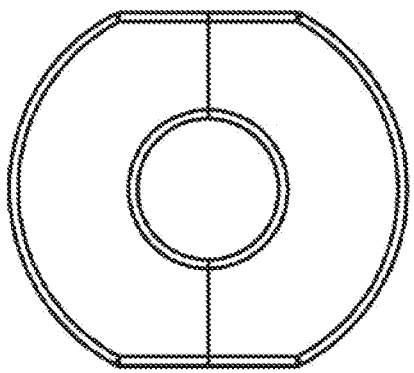
FIG. 17C shows a top view of the exemplary magnet of the distraction implant, according to one embodiment of the present disclosure.

FIG. 17C shows a top view of an exemplary magnetic element 405 of a distraction implant.

FIG. 17D shows a side view of an exemplary magnetic element 405 of a distraction implant.

Figure 18B:
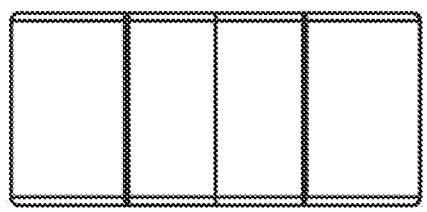
FIG. 18B shows a side view of the exemplary magnet of the distraction implant, according to one embodiment of the present disclosure.
Figure 18D:
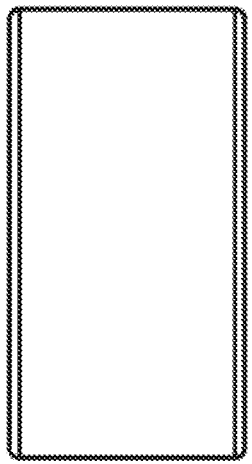
FIG. 18D shows a side view of the exemplary magnet of the distraction implant, according to one embodiment of the present disclosure.
Figure 18A:
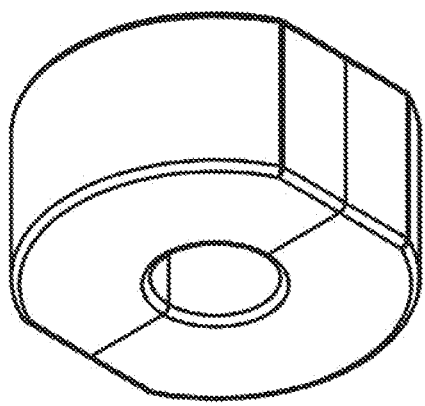
FIG. 18A shows a perspective view of an exemplary magnet of the distraction implant, according to one embodiment of the present disclosure.

FIG. 18A shows a perspective view of an exemplary magnetic element 405 of a distraction implant.

FIG. 18B shows a side view of an exemplary magnetic element 405 of a distraction implant.

Figure 18C:
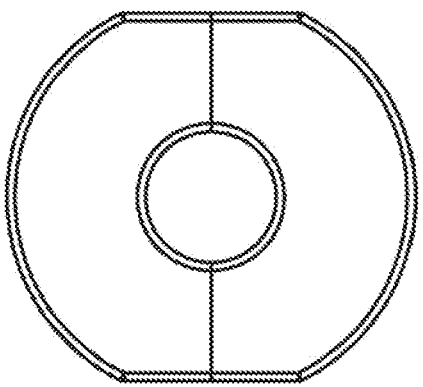
FIG. 18C shows a top view of the exemplary magnet of the distraction implant, according to one embodiment of the present disclosure.

FIG. 18C shows a top view of an exemplary magnetic element 405 of a distraction implant.

FIG. 18D shows a side view of an exemplary magnetic element 405 of a distraction implant.

Figure 19:
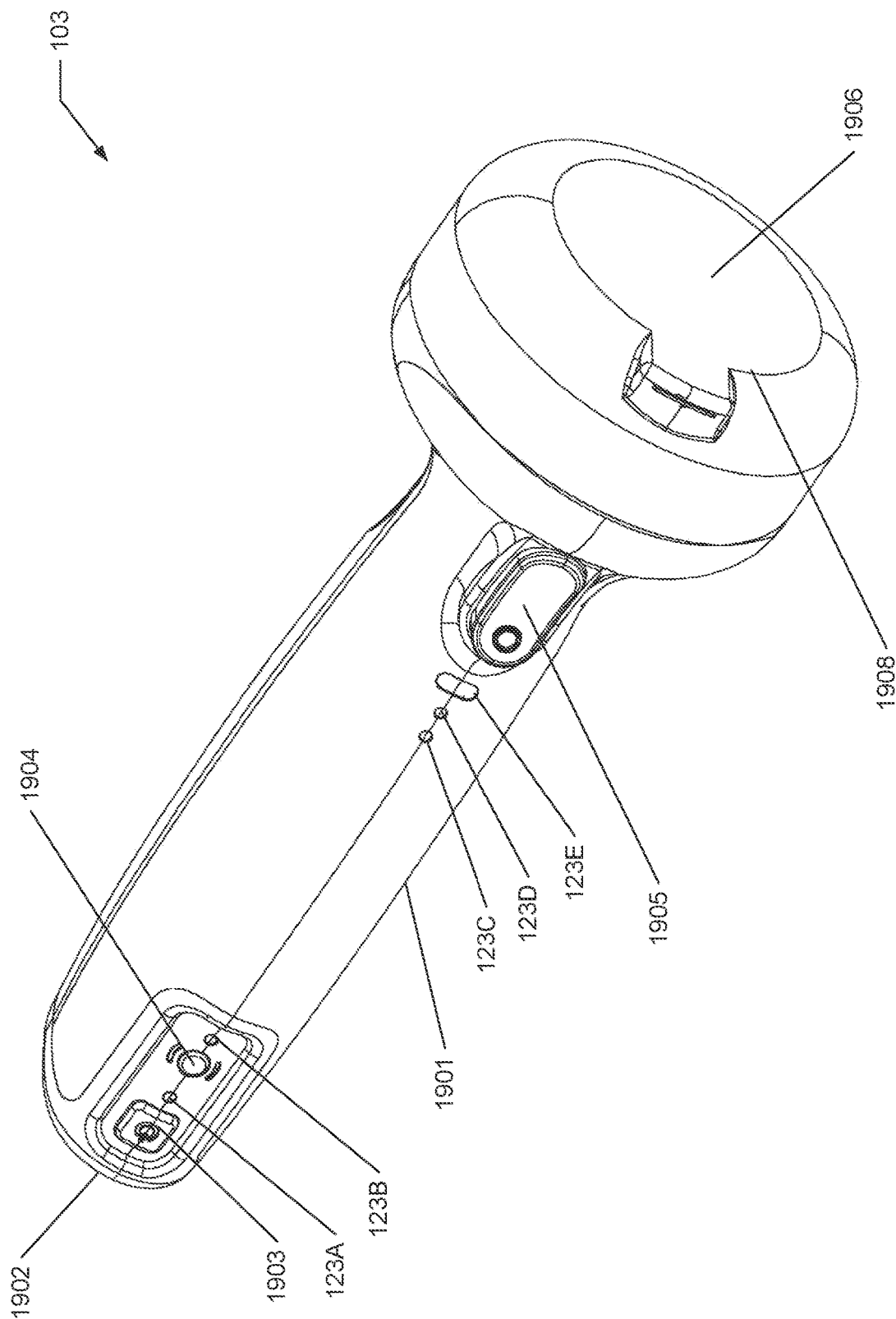
FIG. 19 shows a bottom perspective view of an exemplary external device, according to one embodiment of the present disclosure.

FIG. 19 shows a bottom perspective view of an exemplary external device 103. In various embodiments, the external device 103 includes a housing 1901. In some embodiments, the housing 1901 is comprised of one or more inert materials, such as an inert rubberized plastic. In at least one embodiment, the housing 1901 comprises an ergonomic shape for comfortable handling via a user's hand. In some embodiments, the housing 1901 includes a sub-surface layer of magnetic shielding, such as a ferromagnetic metal or alloy (e.g., a nickel-molybdenum-iron alloy). In one or more embodiments, at a first end 1902, the external device 103 includes an input (not shown) for receiving a USB connection for purposes of powering the external device 103, charging a battery of the external device 103, and/or communicating with the external device 103. In various embodiments, at a second end 1908 opposite the first end 1902, the external device 103 includes a substantially flat surface 1906 configured to improve and optimize magnetic coupling between a driver element of the external device 103 (not shown) and a magnetic element of a distraction implant.

In one or more embodiments, the external device 103 includes a power button 1903. In various embodiments, in response to selection of the power button 1903, the external device 103 enters a powered mode from a low power or sleep mode. In at least one embodiment, in the powered mode, the external device 103 activates a transmitter (not shown) and attempts to pair with a computing device (not shown). In one or more embodiments, the external device includes a pairing button 1904. In at least one embodiment, in response to selection of the pairing button 1904, the external device 103 enters a pairing mode in which the external device 103 attempts to pair with a new computing device (not shown).

In various embodiments, the external device 103 includes a distraction button 1905. In one or more embodiments, in response to selection of the distraction button 1905, the external device 103 attempts to initiate a distraction event (e.g., which may be conditional upon the external device 103 being in communication with a computing device and/or in proper alignment with a distraction implant). In at least one embodiment, the housing 1901 comprises a particular shape such that, upon a user gripping the external device 103, the position of the user's hand on the housing 1901 does not occlude or depress the selectable buttons 1903, 1904, 1905. In various embodiments, the selectable buttons 1903, 1904, 1905 correspond to input devices 112 shown in FIG. 1 and described herein.

In at least one embodiment, the external device 103 includes a plurality of effect sources 123A, 123B, 123C, 123D, 123E. In one or more embodiments, upon activation, the effect sensors 123A-E are configured to emit light of a predetermined color, frequency, and/or period, thereby visually indicating various statuses of the external device 103, a distraction implant, a user's computing device, or combinations thereof. In at least one embodiment, the effect source 123A is configured to indicate a power status of the external device 103, such as "on" status, charging status, low power status, and critical low power status. In one or more embodiments, the effect source 123B is configured to indicate a Bluetooth status of the external device 103, such as pairing status, paired status, and unconnected status. In various embodiments, the effect sources 123C, 123D are configured to indicate a distraction even status of the external device 103 and a distraction implant, such as "not ready" status, "ready to start distraction event" status, "distraction event in progress" status, "distraction event successfully completed" status, "distraction event paused status," and "distraction event error" status. In at least one embodiment, the effect sources 123C, 123D are configured to indicate a type of distraction event error, such as a misalignment-type error, a low risk-type error (e.g., insufficient distraction, loss of power, etc.), and a high risk-type error (e.g., excessive distraction, component stall, component failure, etc.). In one or more embodiments, the housing 1901 comprises a particular shape such that, upon a user gripping the external device 103, each of the effect sources 123A, 123B, 123C, 123D, 123E remain visible. In at least one embodiment, the effect sources 123A, 123B, 123C, 123D, 123E demonstrate sufficient intensity such that the effect sources 123A, 123B, 123C, 123D, 123E are visible through an instrument sterility cover. In some embodiments, in addition to or in place of emitting light, the effect sources 123A, 123B, 123C, 123D, 123E generate other effects including, but not limited to, audible effects and tactile effects.

Figure 20:
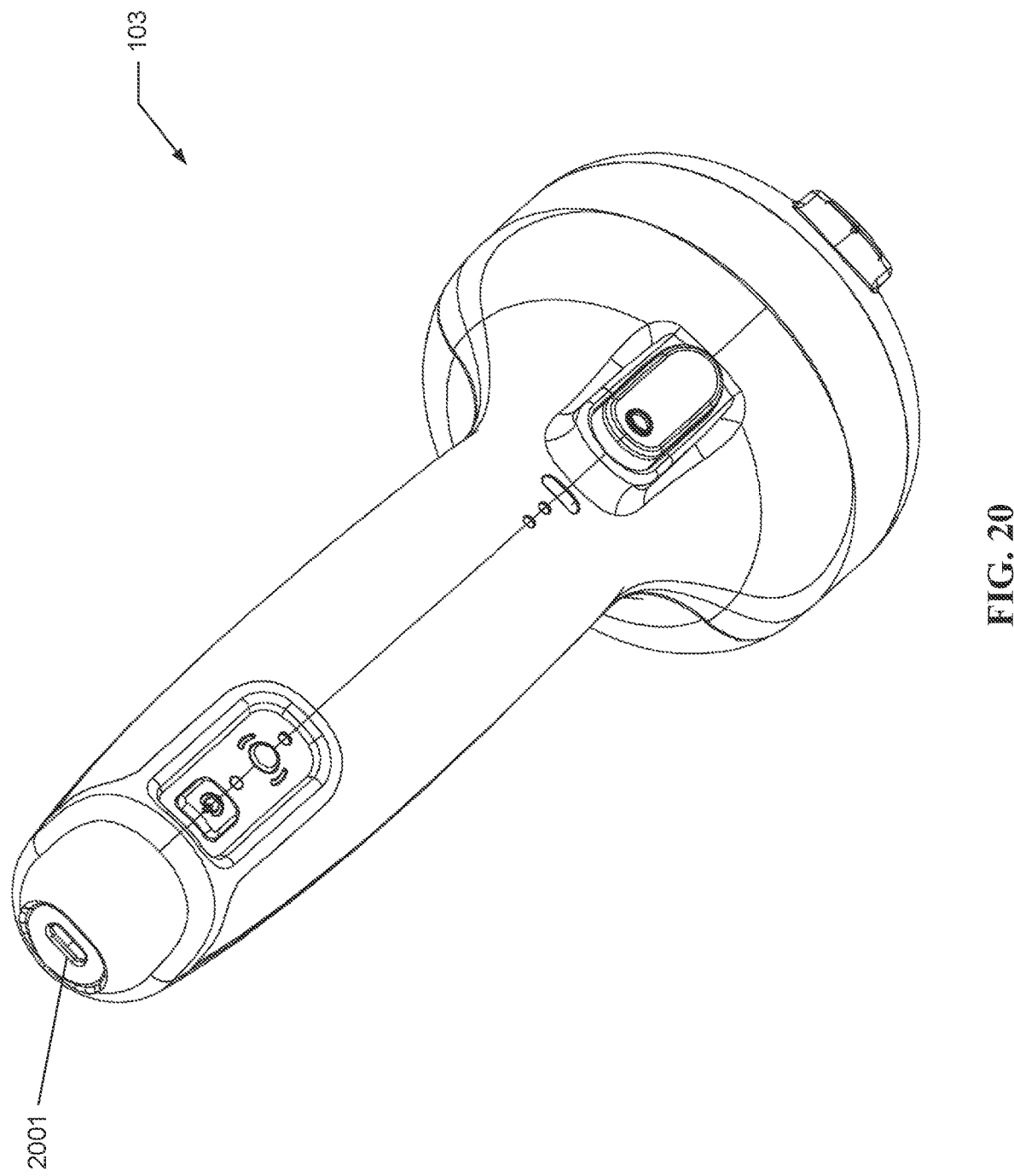
FIG. 20 shows a top perspective view of the exemplary external device, according to one embodiment of the present disclosure.

FIG. 20 shows a top perspective view of an exemplary external device 103. In various embodiments, the external device 103 includes an input 2001 (e.g., which may be an input for an input device 112 shown in FIG. 1 and described herein). In one or more embodiments, via the input 2001, the external device 103 can receive data communication, power, and/or charging means, such as, for example, a universal serial bus (USB) cable.

Figure 21:
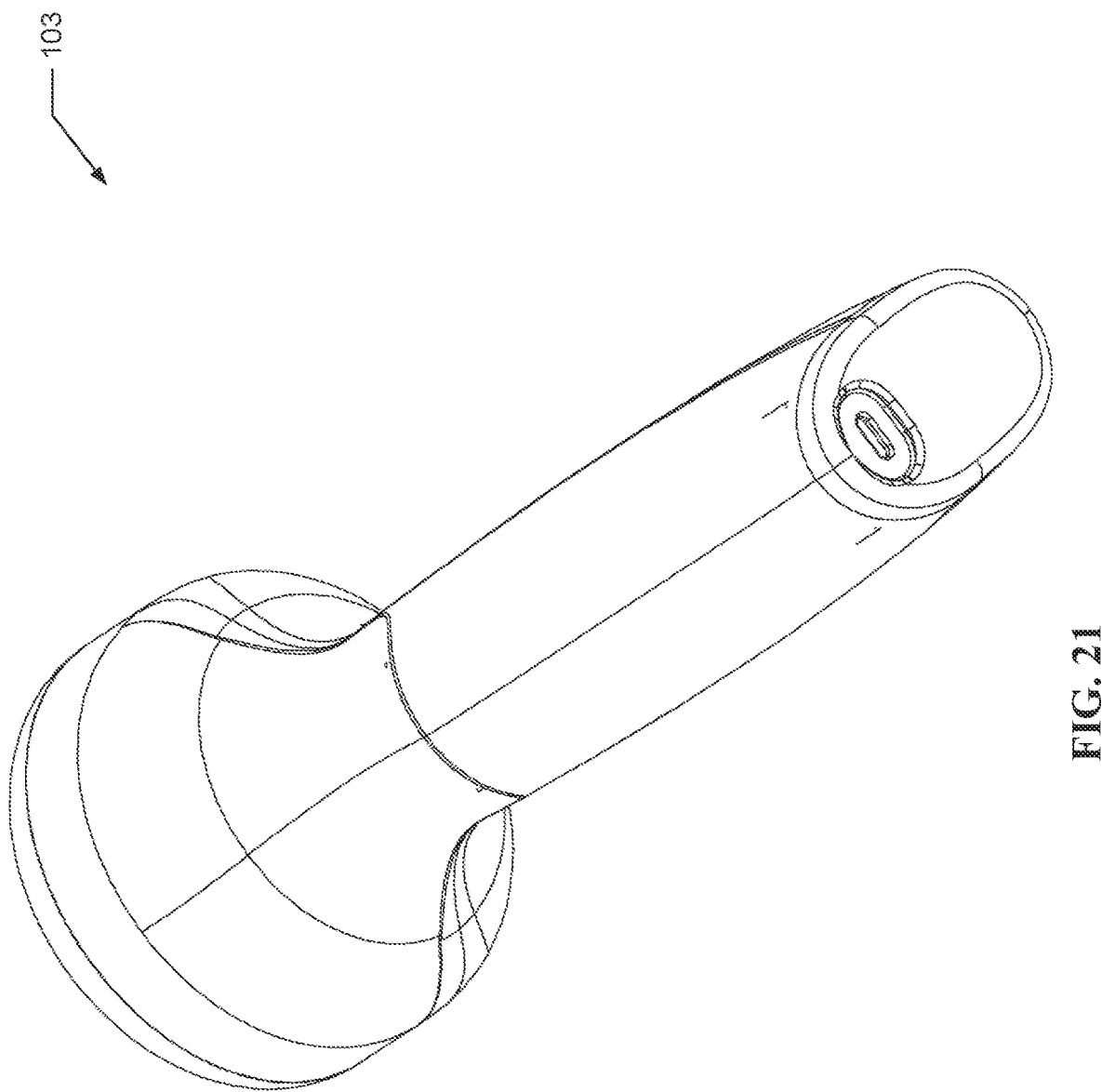
FIG. 21 shows a back perspective view of the exemplary external device, according to one embodiment of the present disclosure.

FIG. 21 shows a back perspective view of an exemplary external device 103.

Figure 22:
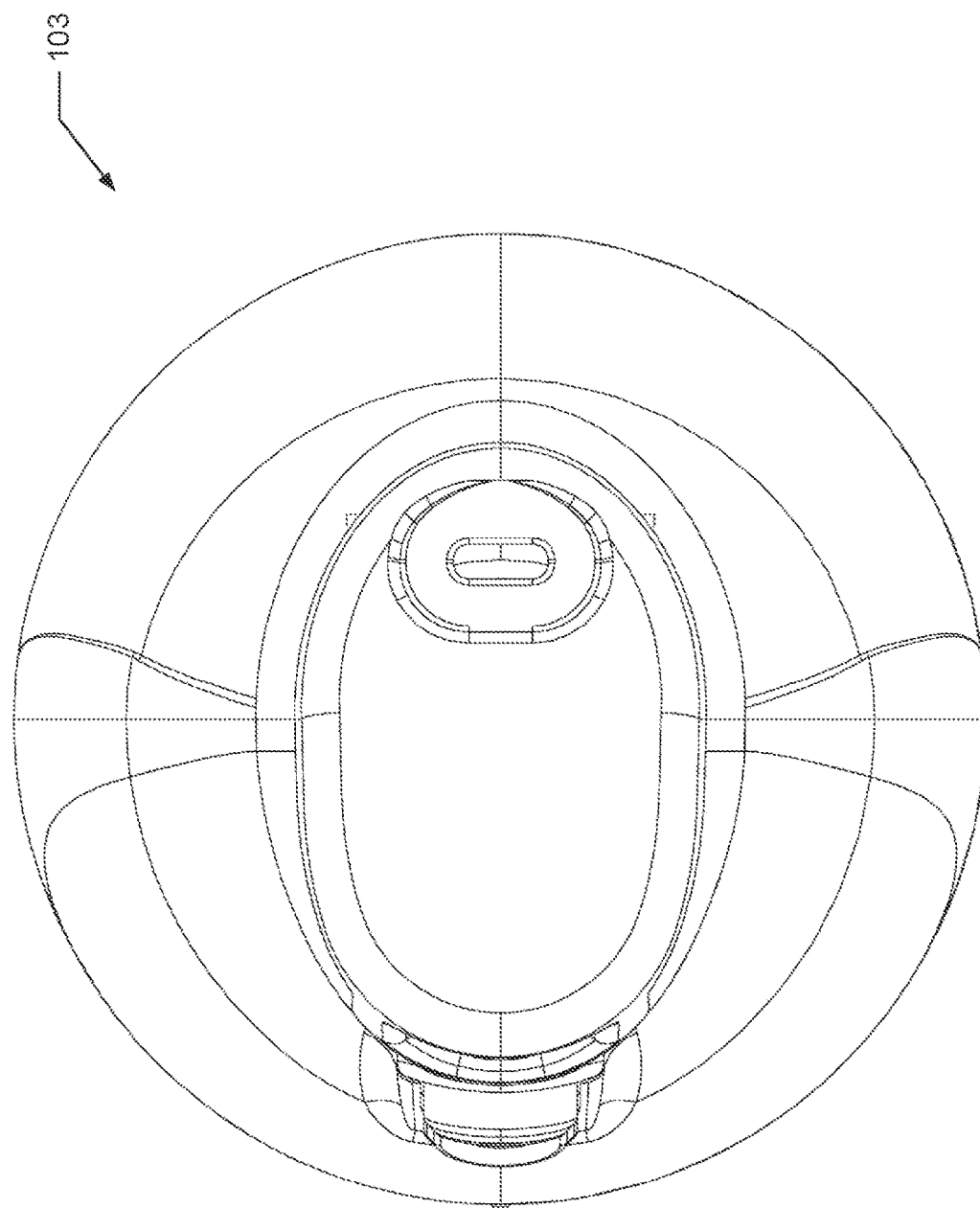
FIG. 22 shows a top view of the exemplary external device, according to one embodiment of the present disclosure.

FIG. 22 shows a top view of an exemplary external device 103.

Figure 23:
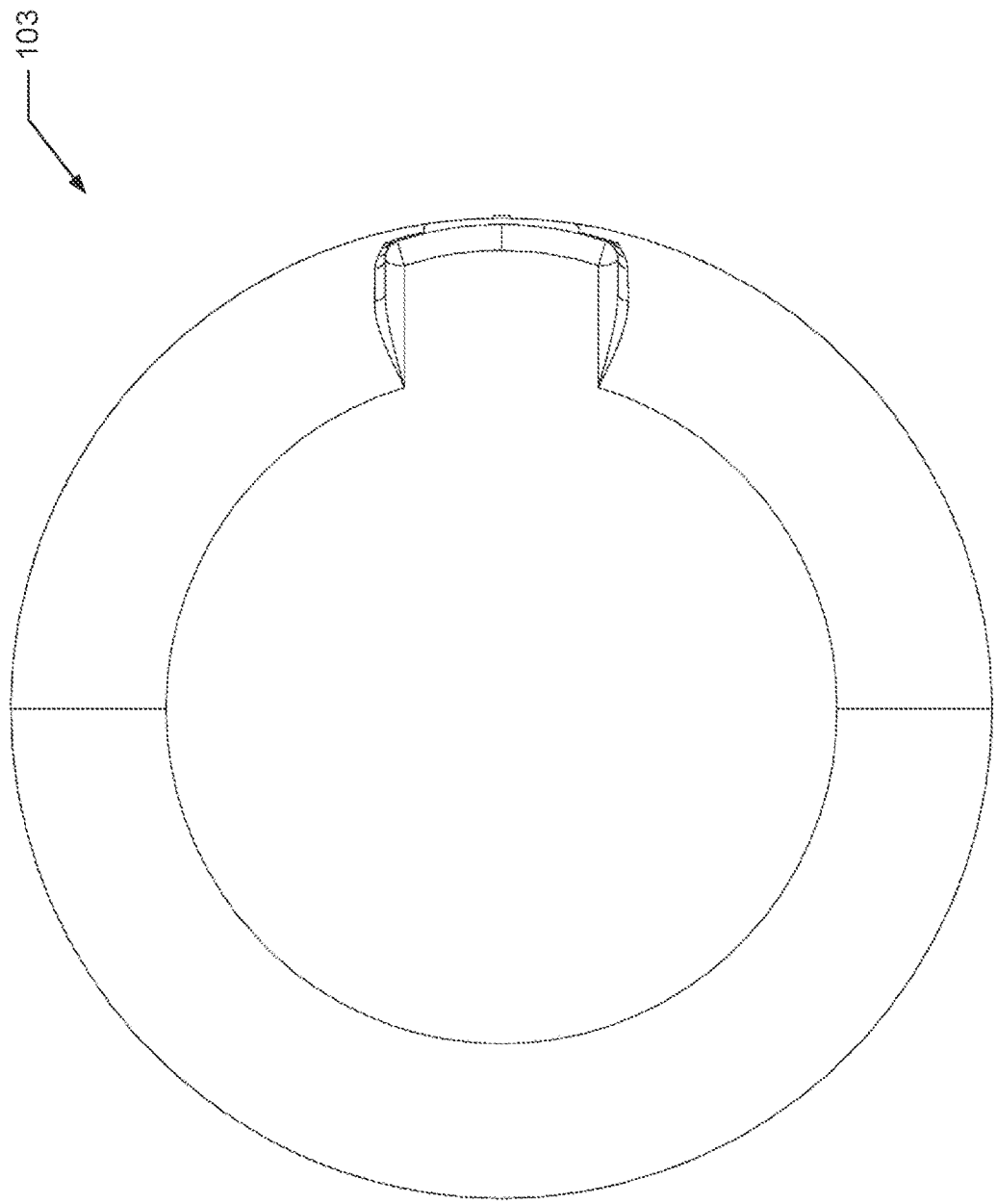
FIG. 23 shows a bottom view of the exemplary external device, according to one embodiment of the present disclosure.

FIG. 23 shows a bottom view of an exemplary external device 103.

Figure 24:
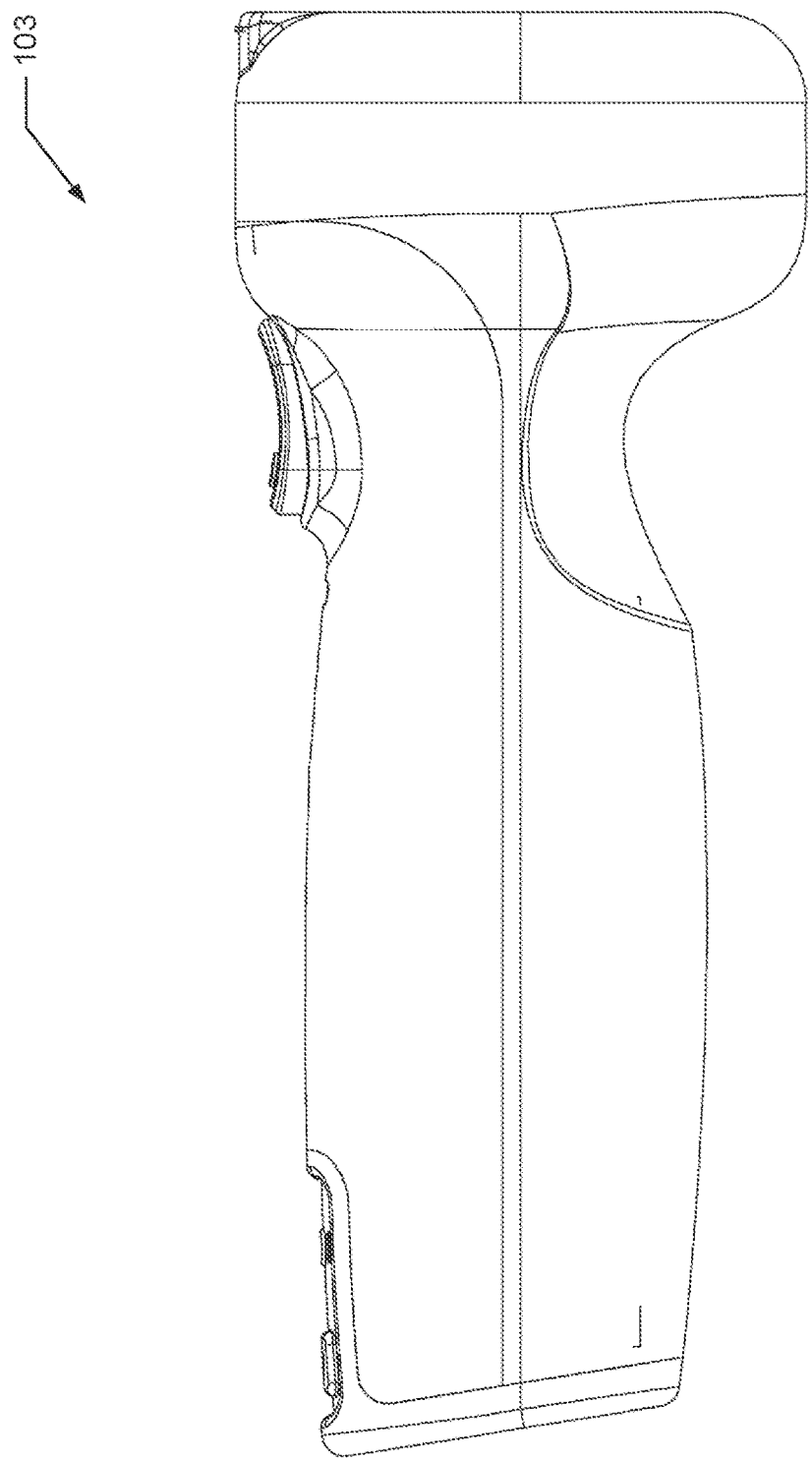
FIG. 24 shows a left side view of the exemplary external device, according to one embodiment of the present disclosure.

FIG. 24 shows a left side view of an exemplary external device 103.

Figure 25:
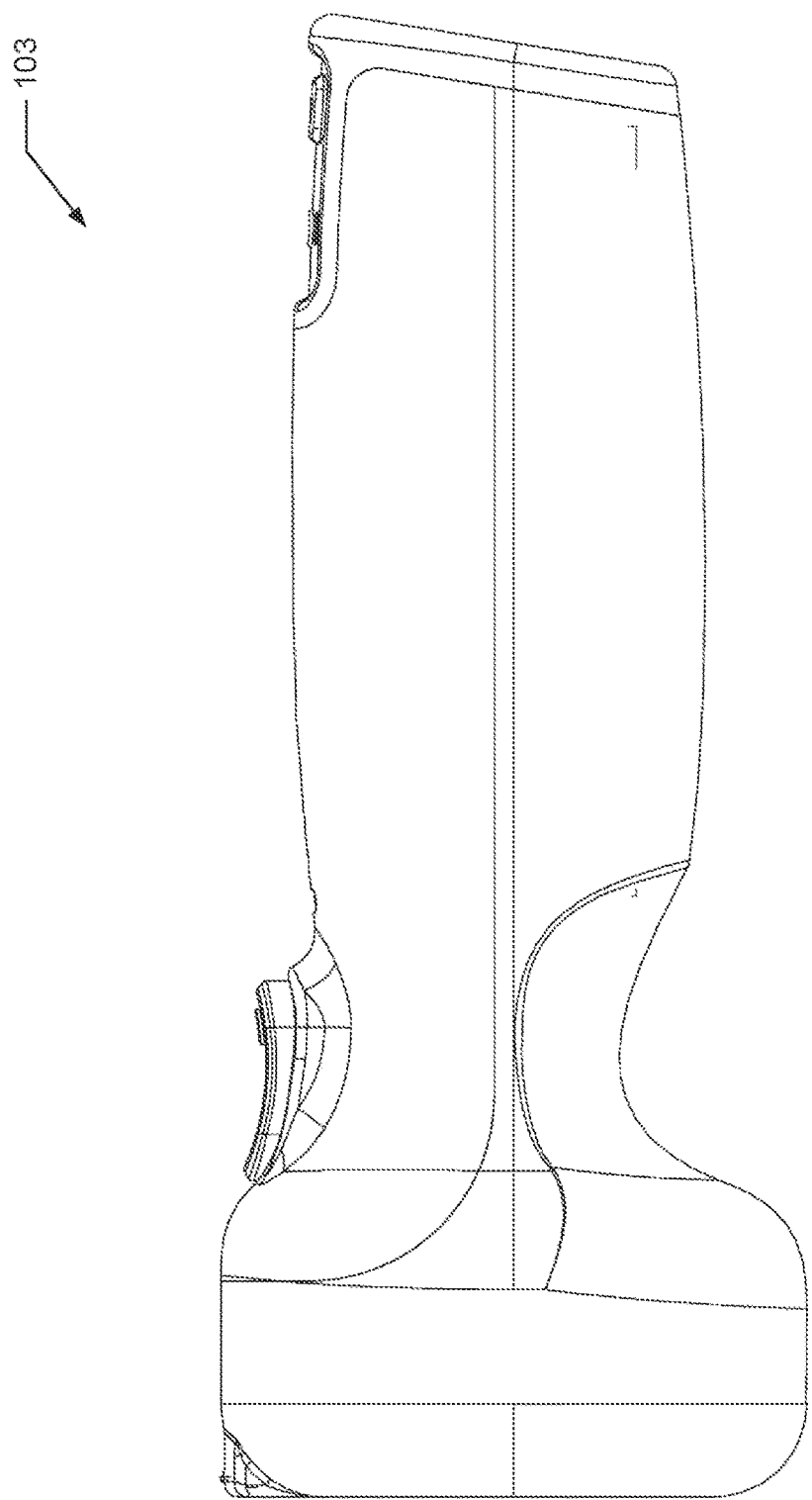
FIG. 25 shows a right side view of the exemplary external device, according to one embodiment of the present disclosure.

FIG. 25 shows a right side view of an exemplary external device 103.

Figure 26:
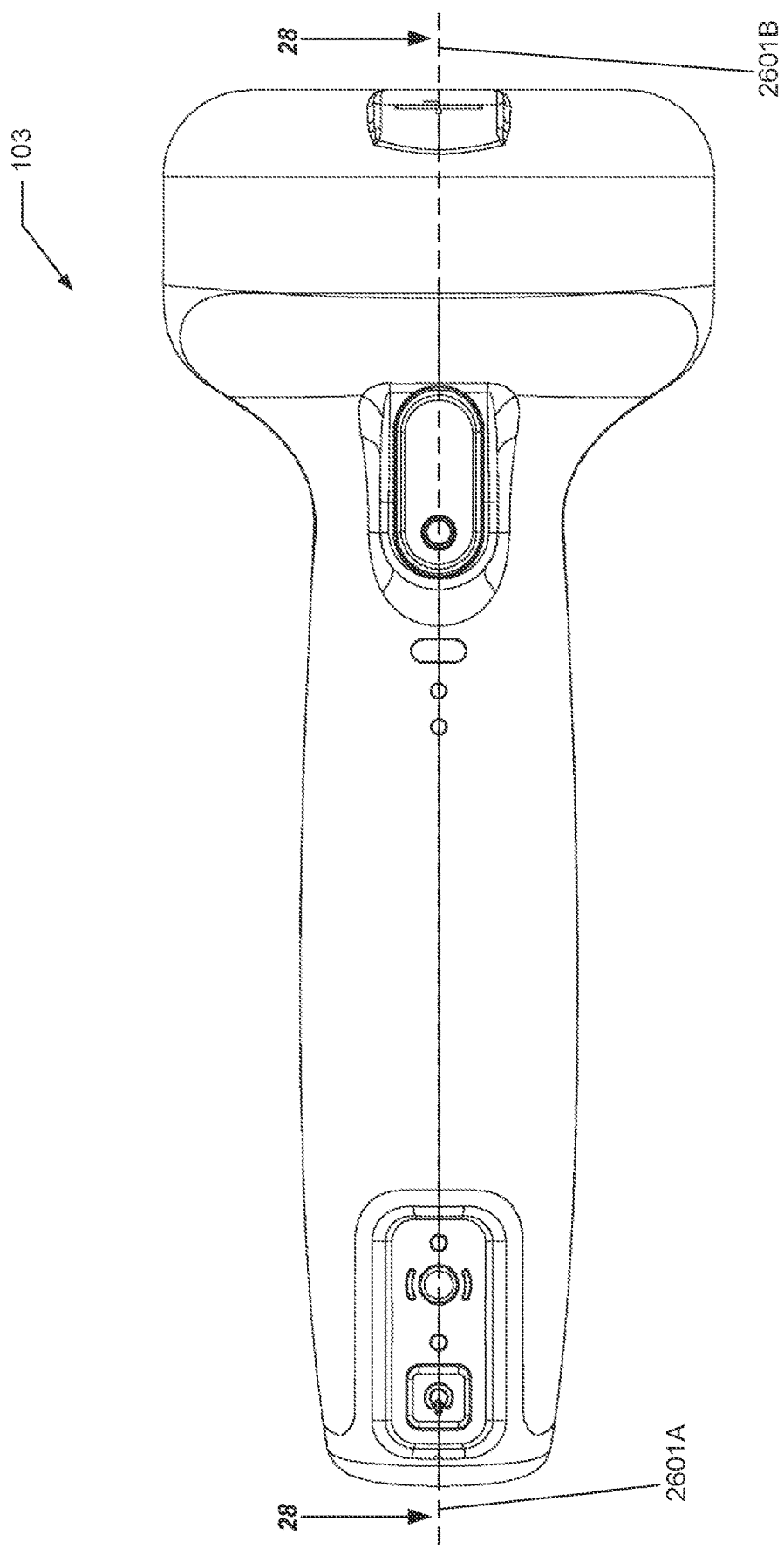
FIG. 26 shows a front view of the exemplary external device, according to one embodiment of the present disclosure.

FIG. 26 shows a front view of an exemplary external device 103. In various embodiments, section line 2601A, 2601B denotes a cross section 2800 shown in FIG. 28.

Figure 27:
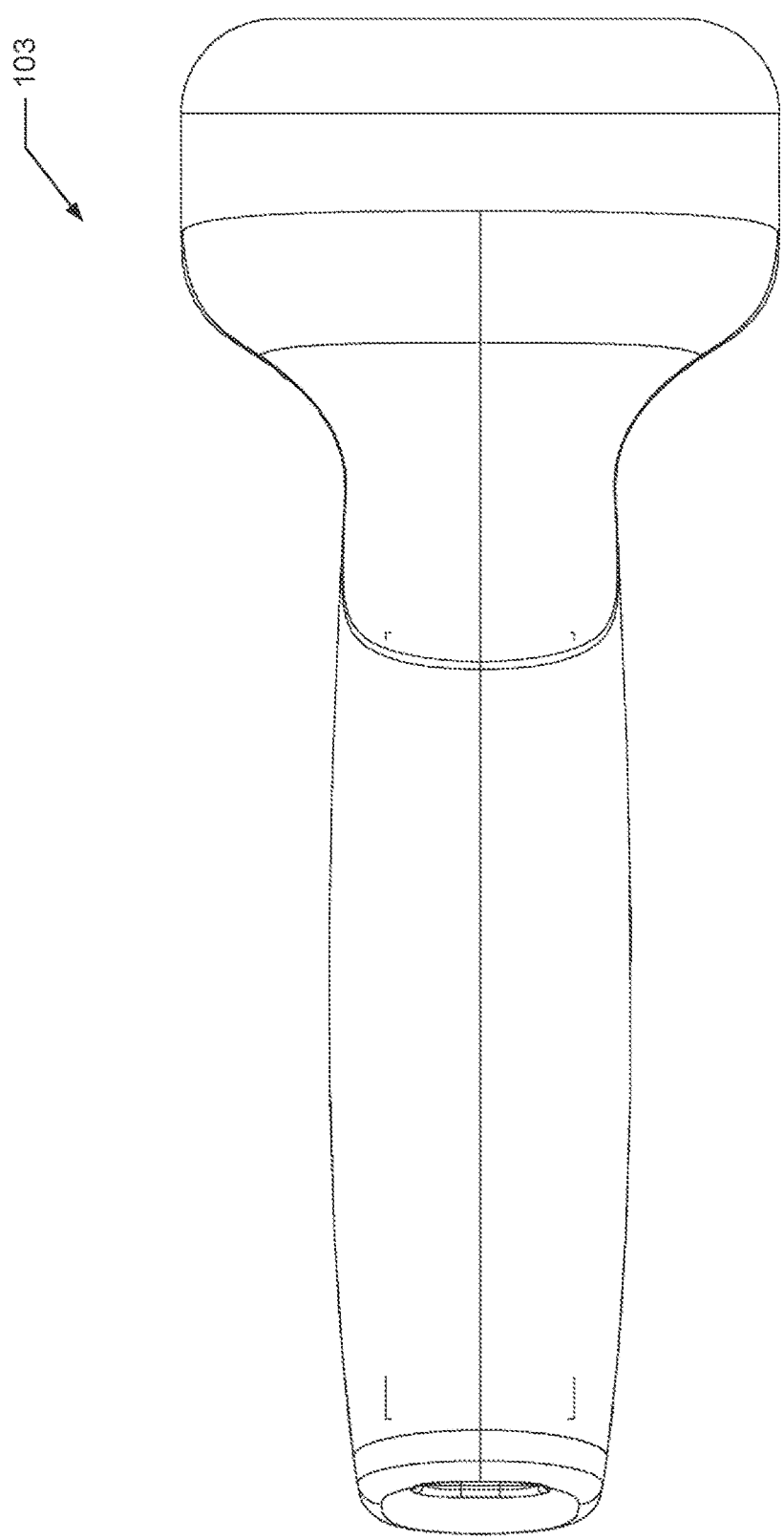
FIG. 27 shows a back view of the exemplary external device, according to one embodiment of the present disclosure.

FIG. 27 shows a back view of an exemplary external device 103.

Figure 28:
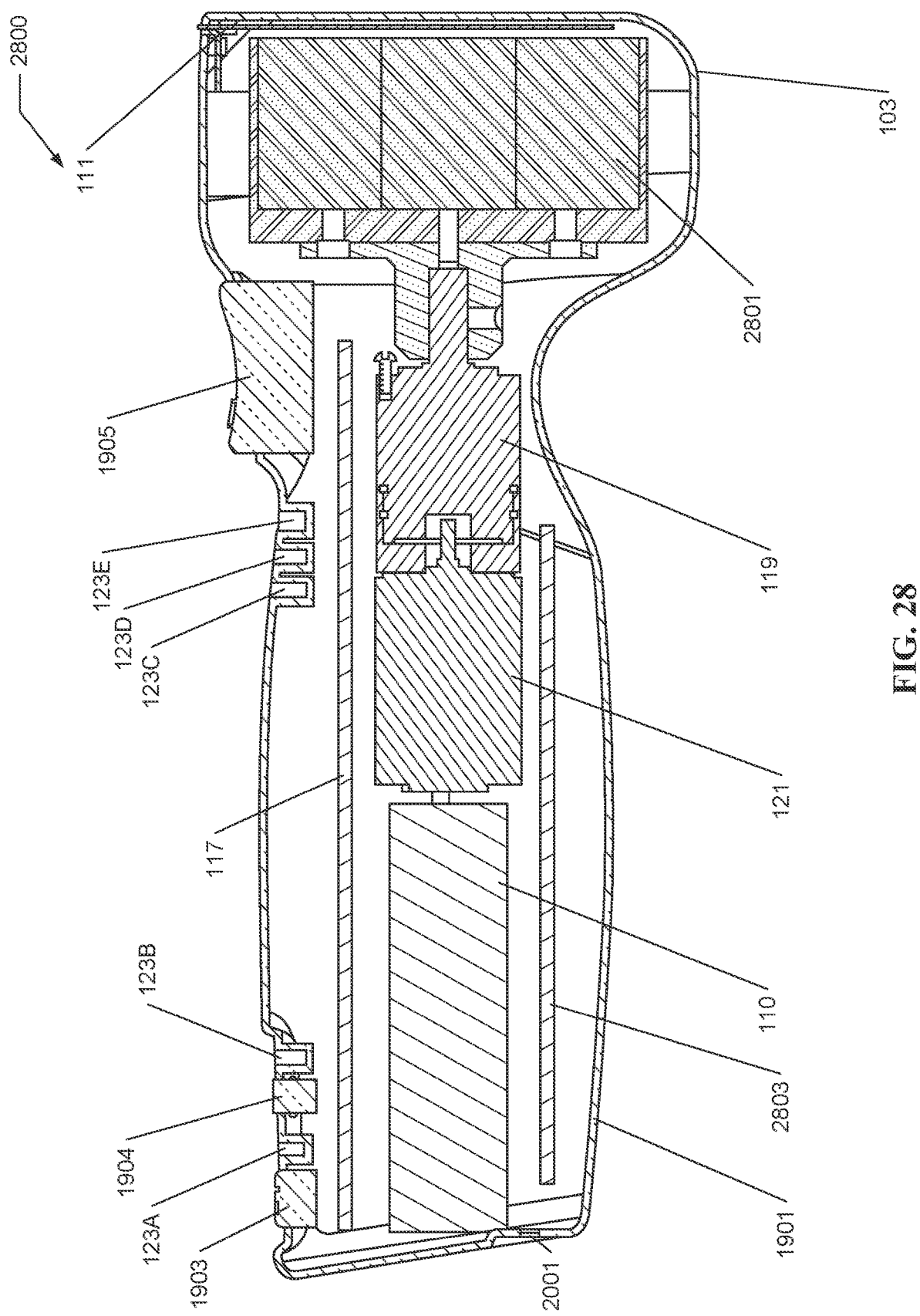
FIG. 28 shows a cross section of the exemplary external device, according to one embodiment of the present disclosure.

FIG. 28 shows a cross section 2800 of an exemplary external device 103. In one or more embodiments, the external device 103 includes, but is not limited to, a housing 1901, a NFC device 111, a driver magnet 2801, a motor 119, an encoder 121, a power supply 110, an input 2001, a printed circuit board 2803, a transmitter 117, effect sources 123A, 123B, 123C, 123D, 123E, and selectable buttons 1903, 1904, 1905.

In at least one embodiment, the NFC device 111 is configured to read and write to an NFC device of a distraction implant (e.g., NFC device of distraction implant 101 shown in FIG. 4 and described herein). In one or more embodiments, via the NFC device 111, the external device 103 detects and aligns with the distraction implant.

Figure 37:
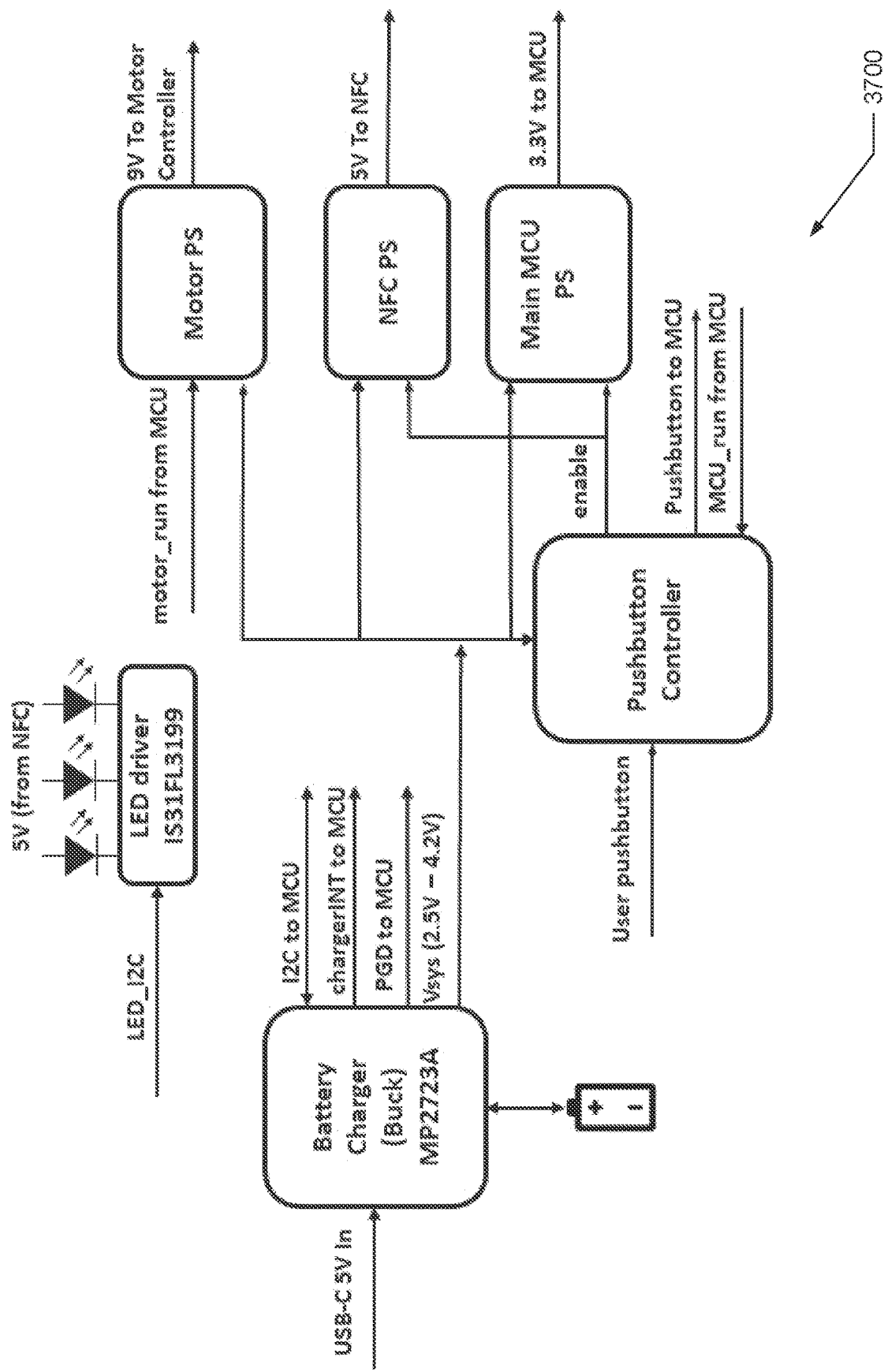
FIG. 37 shows an exemplary power supply architecture, according to one embodiment of the present disclosure.

In various embodiments, the motor 119 is attached to the driver magnet 2801 such that the driver magnet 2801 rotates via motion of the motor 119. In one or more embodiments, via rotation, the driver magnet 2801 is configured to apply a torque to a magnetic element of a distraction element, thereby causing a distraction event including extension or retraction of the distraction implant. In at least one embodiment, the encoder 121 is configured to measure a position and/or speed of the motor 119. In various embodiments, the power supply 110 powers the electronic components of the external device 103. In one example, the power supply 110 includes one or more rechargeable batteries. In at least one embodiment, the power supply 110 receives power (e.g., for powering the external device 103 or charging the power supply 110) via the input 2001. An exemplary firmware architecture for controlling the power supply 110 is shown in FIG. 37. In various embodiments, the power supply 110 is configured to operate in a plurality of modes including, but not limited to, deep sleep mode, battery charge mode, microcontroller run mode, and motor run mode. In one or more embodiments, in the deep sleep mode, the power supply 110 configures a battery charger element to a discharging state and configures the microcontroller 115 and motor 119 to a shutdown state. In at least one embodiment, in the battery charge mode, the power supply 110 configures the battery charger element to a charging state, configures the microcontroller 115 to a run state, and configures the motor 119 to a shutdown state. In one or more embodiments, in the microcontroller run state, the power supply 110 configures the battery charger element to a discharging state, the microcontroller 115 to a run state, and the motor 119 to a shutdown state. In one or more embodiments, in the motor run state, the power supply 110 configures the battery charger element to a discharging state, the microcontroller 115 to a run state, and the motor 119 to a run state. In one or more embodiments, the external device 103 can transition between the various states in response to selection of the selectable button 1903, such as short press selections (e.g., <1 second press), long press selections (e.g., 1 second press), and hold press selections (e.g., 3 second press).

Figure 38:
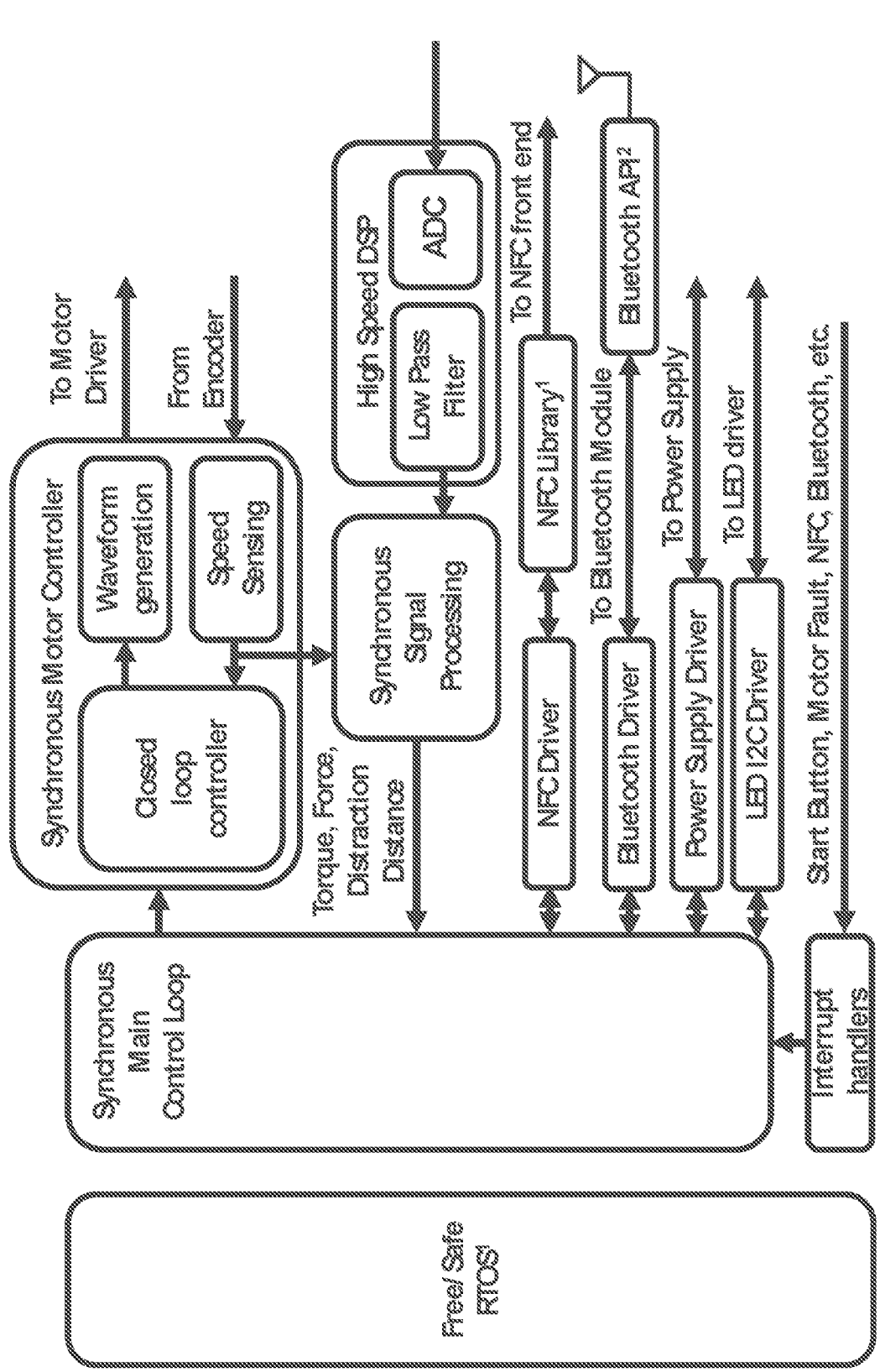
FIG. 38 shows an exemplary motor control architecture, according to one embodiment of the present disclosure.
Figure 39:
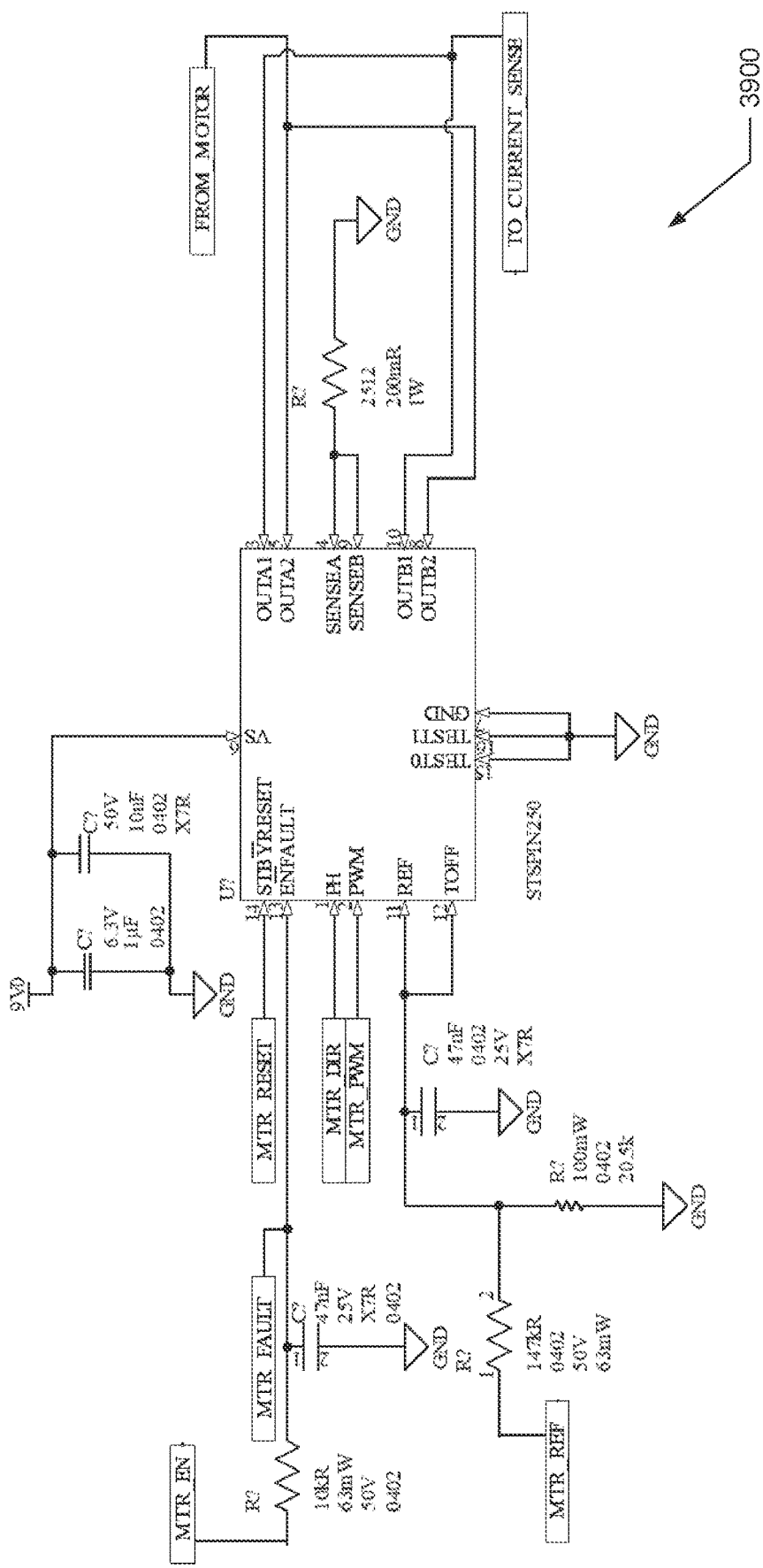
FIG. 39 shows an exemplary motor control circuit, according to one embodiment of the present disclosure.
Figure 40:
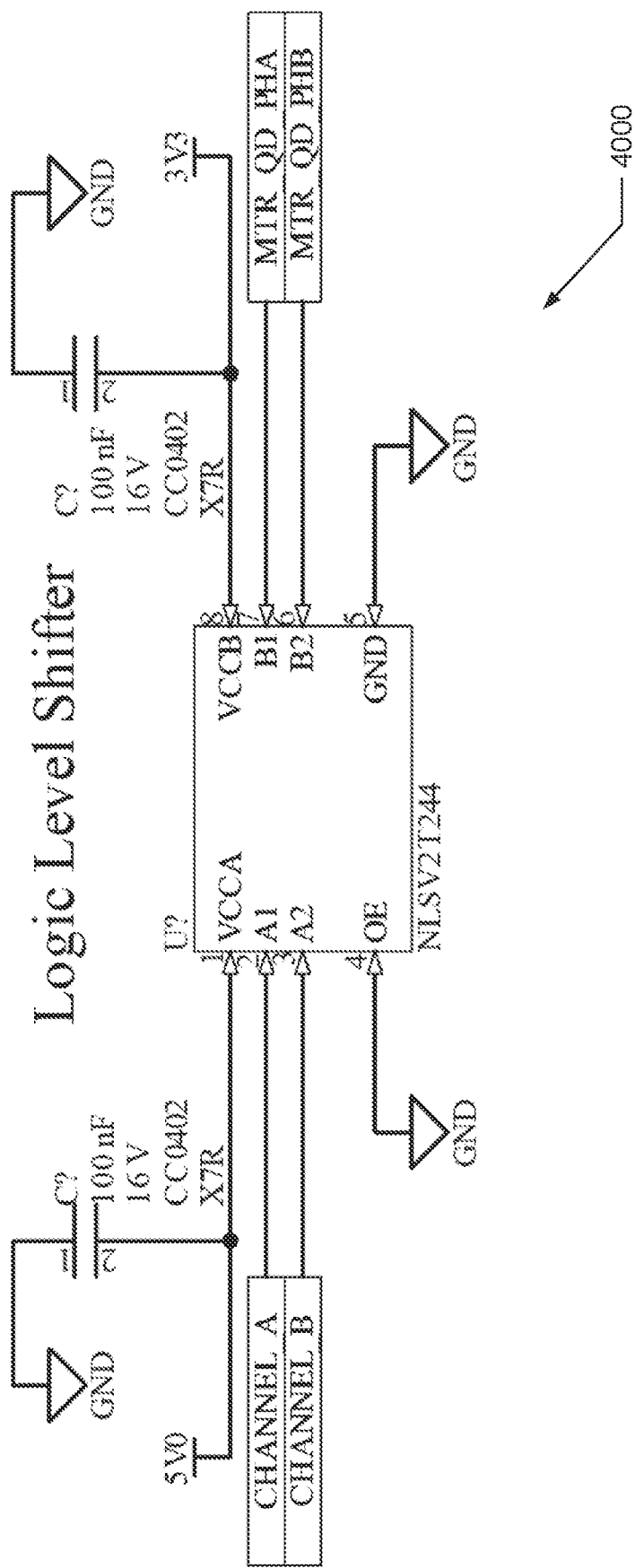
FIG. 40 shows an exemplary logic level shifter circuit, according to one embodiment of the present disclosure.

In one or more embodiments, the transmitter 117 is configured to transmit and receive data to and from a computing device (e.g., computing device 105 shown in FIG. 1 and described herein). In at least one embodiment, the transmitter 117 includes a Bluetooth antenna and control circuit. In various embodiments, the PCB 2803 includes, but is not limited to, a microcontroller 115 (e.g., as shown in FIG. 1 and described herein), memory 118 (FIG. 1), and/or sensors 113B (FIG. 1). In one or more embodiments, the PCB 2803 includes an electromagnetic (EM) interference filter to insulate and protect the PCB components against external EM signals and/or EM signals generate by the driver magnet 2801. In one or more embodiments, the PCB 2803 includes a motor controller circuit for controlling the motor 119. An exemplary firmware architecture for controlling the motor 119 is shown in FIG. 38. An exemplary circuit diagram of the motor controller circuit is shown in FIG. 39. In at least one embodiment, the PCB 2803 includes a logic level shifter for converting input signal voltages to a safe and/or operating level. An exemplary circuit diagram of the logic level shifter is shown in FIG. 40.

Exemplary Processes, Workflows, Interfaces, and Schemas

Figure 29:
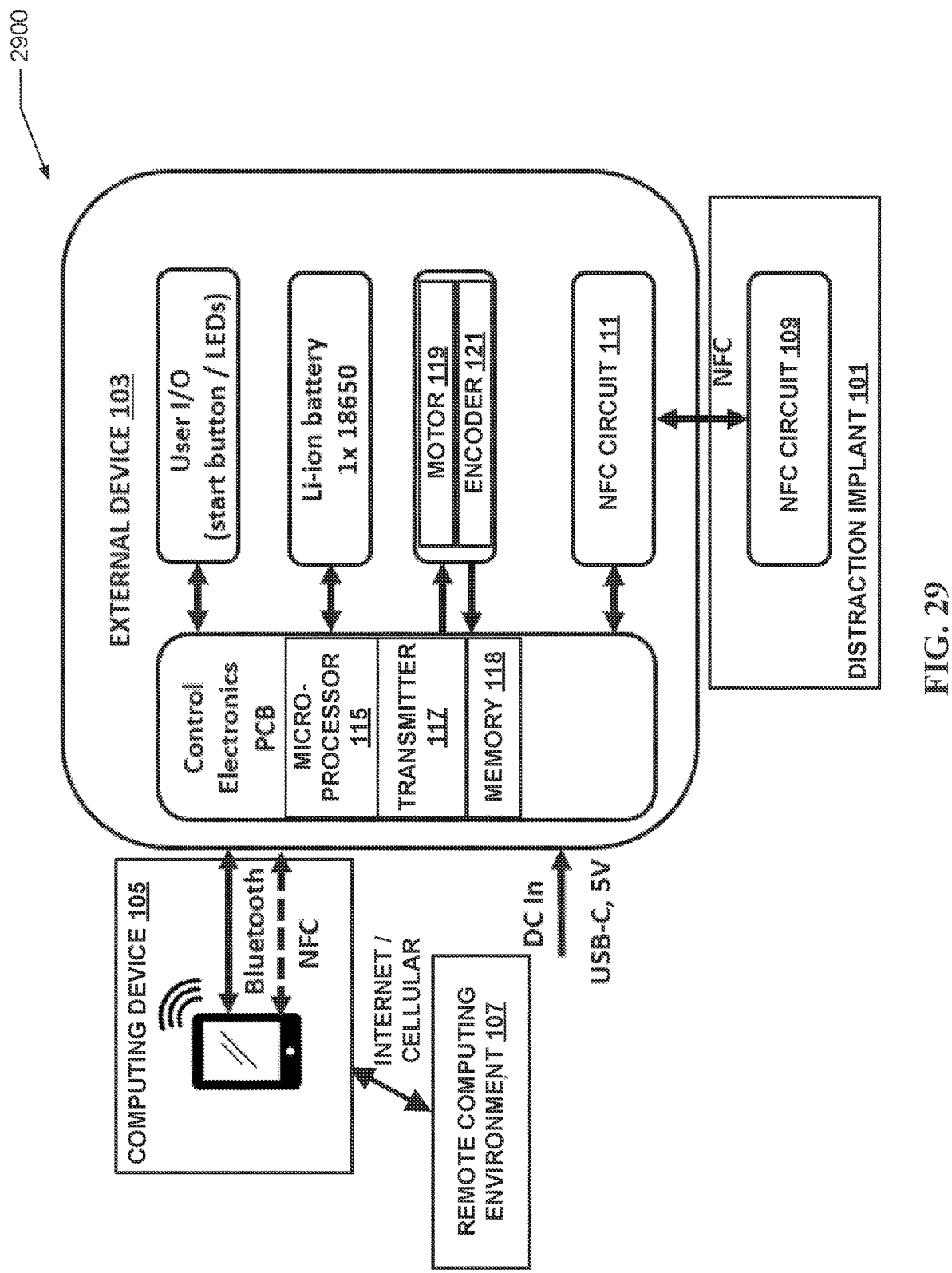
FIG. 29 shows an exemplary communication schema, according to one embodiment of the present disclosure.

FIG. 29 shows an exemplary communication schema 2900. In various embodiments, the external device 103 communicates with the distraction implant 101 via near field communication (NFC). In at least one embodiment, the external device 103 receives power from an external wired power supply, an internal power supply (e.g., battery), or a combination thereof. In one or more embodiments, the external device 103 communicates with the computing device 105 via Bluetooth communication and/or NFC communication. In various embodiments, the computing device 105 communicates with a remote computing environment 107 via the Internet and/or a cellular network. In some embodiments, the computing device 105 communicates with the remote computing environment 107 via a virtual private network (VPN). In at least one embodiment, an application programming interface (API) facilitates communication between the computing device 105 and the remote computing environment 107.

Figure 30:
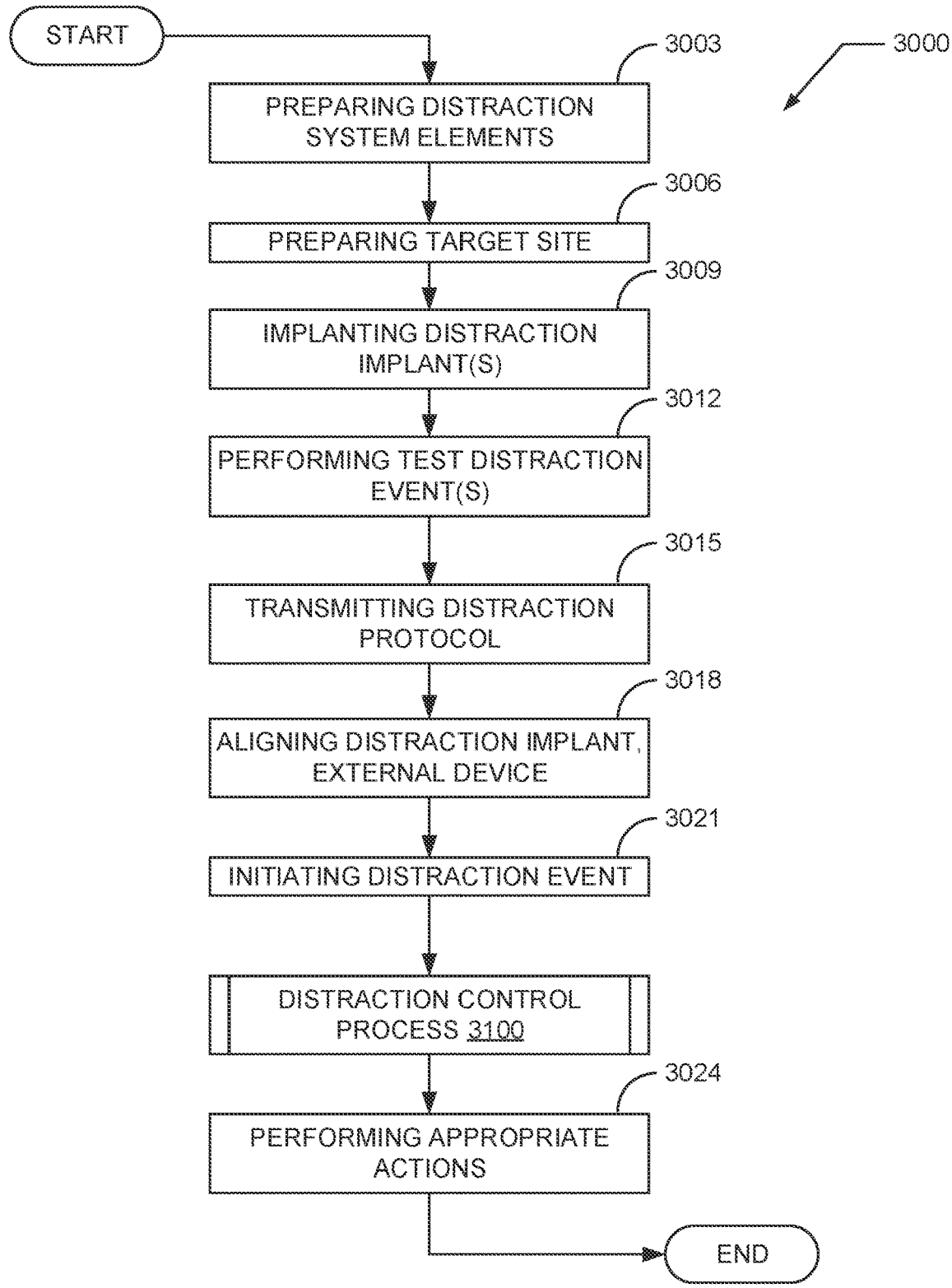
FIG. 30 shows an exemplary distraction process, according to one embodiment of the present disclosure.

FIG. 30 shows an exemplary distraction process 3000. As will be understood by one having ordinary skill in the art, the steps and processes shown in FIG. 30 (and those of all other flowcharts and sequence diagrams shown and described herein) may operate concurrently and continuously, are generally asynchronous and independent, and are not necessarily performed in the order shown. In various embodiments, the distraction system 100 performs the process 3000 to initiate and carry out one or more distraction events.

At step 3003, the process 3000 includes preparing one or more elements of a distraction system, such as the distraction system 100 shown in FIG. 1 and described herein. In various embodiments, the elements of the distraction system 100 prepared at step 3003 include, but are not limited to, but not limited to, one or more distraction implants 101, an external device 103, a computing device 105, and a remote computing environment 107.

In one or more embodiments, preparing the computing device 105 includes creating a new "physician-type" user account 134 at the remote computing environment 107, or associating the computing device 105 with an existing physician-type user account 134. In various embodiments, the physician-type user account 134 is a user account 134 associated with an escalated level of privilege such that the corresponding user can generate and implement distraction protocols at the computing device 105, external device 103, and distraction implant 101. In some embodiments, where a physician-type user account 134 already exists, the computing device 105 can initiate a login and authentication operation with the remote computing environment 107 to associate the physician-type user account 134 with the computing device 105. In various embodiments, the computing device 105 receives login credentials via one or more input devices. In at least one embodiment, the remote computing environment 107 receives the login credentials and a computing device identifier 136 from the computing device 105. In one or more embodiments, the remote computing environment 107 identifies the physician-type user account 134 based on the login credentials, which may include a user account identifier 136. In at least one embodiment, in response to authenticating the login credentials, the remote computing environment 107 associates the user account identifier 136 with the computing device identifier 136 (e.g., such as by updating the physician-type user account 134 to include the computing device identifier 136).

In one or more embodiments, preparing the computing device 105 includes creating a new "patient-type" user account 134 at the remote computing environment 107, or associating the computing device 105 with an existing patient-type user account 134. In one or more embodiments, the patient-type user account 134 is a user account 134 associated with a low level of privilege such that the corresponding user can implement, but not modify, distraction protocols. In at least one embodiment, where a patient-type user account 134 already exists, the computing device 105 and remote computing environment 107 can initiate a login and authentication operation to associate the patient-type user account 134 with the computing device 105 (e.g., which may be performed similar to the physician-type user account login and authentication, using a user account identifier 136 corresponding to the patient-type user account 134).

In various embodiments, preparing the computing device 105 includes associating the physician-type user account 134 with the patient-type user account 134, or vice versa.

In one or more embodiments, preparing the external device 103 includes pairing the external device 103 and the computing device 105 such that the devices can communicate via Bluetooth or other suitable means. In various embodiments, preparing the distraction implant 101 includes the external device 103 reading a distraction implant identifier 136 from the NFC device 109 of the distraction implant 101. In some embodiments, the computing device 105 receives the distraction implant identifier 136 via user inputs (e.g., such as by the surgeon inputting a distraction implant identifier 136 printed on implant packaging). In one or more embodiments, the computing device 105 and/or the remote environment 107 associates the distraction implant identifier 136 with the identifier 136 associated with the patient-type user account 134.

In one or more embodiments, preparing the distraction system 100 includes generating a distraction plan including one or more distraction protocols. In at least one embodiment, each distraction protocol includes one or more distraction parameters that define a distraction event. In various embodiments, distraction parameters can include, but are not limited to, an extension or retraction distance for each distraction event, a direction of rotation for the motor 119 for each distraction event, a time interval corresponding to the predetermined scheduling of each distraction event, and a target final distraction distance. In at least one embodiment, the computing device 105 receives one or more inputs that define the distraction parameters. In one or more embodiments, the computing device 105 restricts generation of the distraction plan and modification of distraction protocols to physician-type user accounts 134 (e.g., and potentially to physician-type user accounts 134 confirmed to be associated with a particular patient-type user account 134). In some embodiments, the computing device 105 receives the distraction plan from the remote computing environment 107 in response to transmitting one or more identifiers 136 to the remote computing environment 107, such as, for example, a distraction implant identifier 136, a physician-type user account identifier 136, and/or a patient-type user account identifier 136. In one or more embodiments, the distraction service 129 of the remote computing environment 107 generates and/or retrieves the distraction plan and transmits the distraction plan to the computing device 105. In some embodiments, the distraction service 129 processes patient anatomy data (e.g., medical images, models of patient anatomy, etc.) and or distraction implant data (e.g., models of distraction implants, implant simulations, etc.) to generate the distraction plan.

In at least one embodiment, preparing the distraction system 100 includes assigning a target site to the distraction implant 101, or vice versa. In one or more embodiments, the computing device 105 enters an implant assignment mode (e.g., in response to user input, such as selection of the assignment mode or entry of a distraction implant identifier 136). In various embodiments, in the implant assignment mode, the computing device 105 attempts to communicate with the external device 103 (e.g., which may occur when the external device 103 is within an appropriate proximity of the computing device 105 suitable for Bluetooth or other wireless communication). In one or more embodiments, the computing device 105 renders, on a display thereof, a prompt to align the external device 103 over the distraction implant 101.

In various embodiments, the NFC device 111 of the external device 103 reads a first distraction implant identifier 136 and a NFC identifier 136 from the NFC device 109 of the distraction implant 101. In at least one embodiment, the computing device 105 receives the NFC identifier 136 from the external device 103. In one or more embodiments, the computing device 105 transmit the NFC identifier 136 to the remote computing environment 107. In at least one embodiment, the distraction service 129 verifies that the NFC identifier 136 is legitimate and available (e.g., the NFC identifier 136 is included in a store table of valid NFC identifiers 136 associated with distraction implants). In various embodiments, in response to verifying the NFC identifier 136, the remote computing environment 107 transmits a second distraction implant identifier 136 to the computing device 105. In at least one embodiment, the computing device 105 verifies that the second distraction implant identifier 136 matches the first distraction implant identifier 136. In one or more embodiments, in response to matching the first and second distraction implant identifiers 136, the computing device 105 renders a user interface including one or more target site options for implanting the distraction implant 101. The options can be presented as a listing, as regions of simulated and rendered anatomy, or a combination thereof. In various embodiments, the computing device 105 receives an input for selecting a particular target site option. In various embodiments, the computing device 105 stores the particular target site option and the implant device identifier 136 in association with the patient-type user account 134 and/or the physician-type user account 134 (e.g., potentially in a stored distraction plan). In at least one embodiment, during implantation processes, the computing device 105 can render a user interface that includes the particular target site option, thereby providing a visual indication and confirmation of the appropriate target site (e.g., potentially avoiding incorrect implantation of the distraction implant 101).

At step 3006, the process 3000 includes preparing the target site to receive the distraction implant 101. The target site can be any two or more bones or bone fragments of the patient. Non-limiting examples of the target site include the mandible, maxilla bone, zygomatic bone, lacrimal bone, nasal bone, squamous bone, sphenoid bone, femur, tibia, fibula, humerus, phalange, and metatarsal. In one or more embodiments, a surgeon performs an osteotomy to expose the target site of a patient. In some embodiments, the computing device 105 renders a user interface based on a distraction plan and/or distraction protocol(s) thereof. In at least one embodiment, the user interface identifies the position of the target site on a simulation of patient anatomy.

At step 3009, the process 3000 includes implanting the distraction implant 101. In various embodiments, the surgeon inserts the distraction implant 101 to the target site. In one or more embodiments, the surgeon secures the distraction implant to the target site by inserting one or more fasteners through voids of each endplate of the distraction implant 101 and through one more voids of the housing of the distraction implant 101. The fasteners can include, for example, bio-inert or resorbable bone screws. In one or more embodiments, following securing the distraction implant 101 to the target site, the surgeon closes the target site via suitable techniques. In some embodiments, the surgeon prepares a plurality of target sites and attaches a distraction implant 101 to each of the plurality of target sites.

In at least one embodiment, following installation of the distraction implant 101, the remote computing environment 107 receives, from the computing device 105, an implantation date and initial distraction distance (e.g., an expansion distance of the distraction implant 101 at time of implantation). In one or more embodiments, the remote computing environment 107 stores the implantation date and the initial distraction distance at the data store 131. In one or more embodiments, the remote computing environment 107, or computing device 105, generates of modifies a distraction plan or distraction protocol 128 to include distraction data 132 including, but not limited to, total distraction distance, distraction distance per day, and quantity of distraction events per day. In various embodiments, the distraction service 129 determines one or more distraction parameters including, but not limited to, protocol start date, final implant position (e.g., final distraction distance), estimated days to distraction treatment completion, and distraction distance per distraction event.

In at least one embodiment, the distraction service 129 determines a latency period between implantation of the distraction implant 101 and initiation of a first distraction event, or between completion of a first distraction event and initiation of a subsequent distraction event. In one or more embodiments, the distraction service 129 prevents the external device 103 from initiating a distraction event until the latency period has elapsed. For example the distraction service 129 prevents the external device 103 from initiating a subsequent distraction event for a predetermined period of 2 hours, 4 hours, or any suitable interval following completion or initiation of a preceding distraction event. In one or more embodiments, the distraction service 129 transmits, to the computing device 105, a distraction protocol 128 for each distraction event. In at least one embodiment, the distraction service 129 transmits each distraction protocol 128 at a predetermined frequency, such as, for example, daily, twice daily, or at a particular quantity of hours prior to a scheduled initiation of a distraction event (e.g., 3 hours, 8 hours, 12 hours, or any suitable value). In one or more embodiments, a distraction plan includes performing 1-3, or any suitable quantity, of distraction events per day (e.g., as defined by the distraction plan created by the surgeon and/or distraction service 129). In at least one embodiment, the distraction service 129 can determine that a scheduled distraction event was missed and can update a user account 134 or distraction plan to include a record of the missed distraction event. In one or more embodiments, the distraction service 129 continues to transmit distraction protocols 128 to the computing device 1053 until the distraction implant 101 is expanded to the predetermined total distraction distance (e.g., or other prescribed distraction distance).

At step 3012, the process 3000 includes performing one or more test distraction events. In at least one embodiment, the surgeon performs an intraoperative test distraction of the distraction implant 101 prior to closing the target site. In various embodiments, on the computing device 105 receives, from the physician-type user account 134, a selection of the current patient from a patient selection interface. In one or more embodiments, the computing device 105 receives an input including a desired expansion or contraction distance. In one or more embodiments, the computing device 105 transmits an instruction to the external device 103. The instruction can include the desired expansion or contraction distance and an identifier 136 associated with the distraction implant 101.

In various embodiments, the external device 103 configures the NFC device 111 to monitor for a read signal from a NFC device 109 that includes the distraction implant identifier 136. In one or more embodiments, the surgeon orients the computing device 105 into a proper alignment with the implanted distraction implant 101. In various embodiments, the NFC device 111 reads the NFC device 109 of the distraction implant 101 and, thereby, receives distraction data 132. In at least one embodiment, the distraction data 132 includes the distraction implant identifier 136, a current distraction distance (e.g., current distance between the footplates of the distraction implant 101 or current displacement of the distraction control rod), an expansion direction, and a maximum distraction distance. In various embodiments, the external device 103 transmits the distraction data 132 to the computing device 105.

In one or more embodiments, the computing device 105 determines that the current distraction distance, adjusted by the desired expansion or contraction distance, does not exceed a predetermined maximum extension threshold (e.g., 30 mm, or another suitable value) or minimum contraction threshold (e.g., 0 mm, or another suitable value). In at least one embodiment, the computing device determines that the current distraction distance, adjusted by the desired expansion or contraction distance, does not exceed a predetermined distraction distance associated with the distraction protocol to be performed by the distraction implant 101. In various embodiments, in response to determining the desired expansion or contraction distance does not violate the predetermined maximum extension threshold, the predetermined minimum contraction threshold, or the predetermined distraction distance associated with the distraction protocol, the computing device 105 transmits the distraction protocol to the external device 103. In one or more embodiments, the distraction protocol includes one or more distraction parameters including, but not limited to, motor rotation direction (e.g., a first direction for extension or a second, opposing direction for contraction), the predetermined distraction distance, and one or more distraction limits (e.g., minimum contraction distance, maximum extension distance, etc.). In at least one embodiment, in response to receiving the distraction protocol, the external device transmits a confirmation signal to the computing device 105.

In various embodiments, following receipt of the distraction protocol, the external device 103 confirms that the distraction implant 101 and external device 103 are in proper alignment (e.g., via reading the NFC device 109 of the distraction implant 101). In at least one embodiment, in response to determining an improper alignment of the external device 103 and the distraction implant 101, the external device 103 transmits an misalignment signal to the computing device 105. In one or more embodiments, in response to the misalignment signal, the computing device 105 renders an instruction to properly align the distraction implant 101 and the external device 103. In at least one embodiment, if the external device 103 reads an implant device identifier 136 that does not match the previously received implant device identifier 136, the external device 103 transmits an error signal to the computing device 105. In one or more embodiments, in response to the error signal, the computing device 105 renders an indication that the distraction implant 101 is unrecognized.

In one or more embodiments, in response to confirming the proper alignment and/or reading an expected implant device identifier 136, the external device 103 transmits a readiness signal to the computing device 105 and/or activates one or more effect sources 123 to indicate distraction readiness. In one or more embodiments, in response to the readiness signal, the computing device 105 renders, on a display thereof, an indication of distraction readiness (e.g., "Ready to Distract"). In various embodiments, in response to the readiness signal, the computing device 105 transmits a command to the external device 103 to transition from a disarmed state to an armed state. In at least one embodiment, in the disarmed state, the external device 103 ignores inputs to a button or other input device for initiating distraction. In various embodiments, in the armed state, the external device 103 is configured to initiate a prescribed distraction event in response to receiving an input at a distraction input device. In one or more embodiments, the distraction implant 101 receives a selection of a selectable button 1905 for initiating the distraction event according to the distraction protocol. In various embodiments, following receipt of the selection, the process 3000 includes performing a distraction control process 3100 (e.g., shown in FIG. 31 and described herein) to carry out the distraction test.

In one or more embodiments, the external device 103 determines that the test distraction event was successfully or unsuccessfully completed (e.g., via the distraction control process 3100). In various embodiments, the external device 103 transmits and indication of the outcome of the distraction event to the computing device 105. In at least one embodiment, the computing device 105 renders, on a display thereof, an indication of the successful or unsuccessful completion of the test distraction event. In various embodiments, the computing device 105 transmits the result of the test distraction event to the remote computing environment 107 for storage at the data store 131 (e.g., in association with the patient-type user account 134 and/or the physician-type user account 134). In at least one embodiment, in response to an unsuccessful test distraction event, the computing device 105 generates an alert. The alert can include one or more error conditions associated with the unsuccessful test distraction event, such as an indication that the distraction protocol exceeded one or more distraction thresholds of the distraction implant 101 or an indication of malfunction of distraction implant components. In various embodiments, in response to a failure to complete the test distraction event, the process 3000 terminates, which may include the surgeon removing the distraction implant 101 from the patient and closing the target site.

In one or more embodiments, the process 3000 includes repeating step 3012 for each distraction implant 101 implanted into the patient.

At step 3015, the process 3000 includes the computing device 105 transmitting the distraction protocol to the external device 103. In at least one embodiment, the computing device 105 receives the distraction protocol (e.g., or a distraction plan including the distraction protocol) from the remote computing environment 107. In at least one embodiment, the distraction protocol includes parameters of one or more distraction events. In some embodiments, the computing device 105 analyses the distraction protocol and verifies that the distraction parameters do not violate one or more predetermined thresholds of the distraction implant 101, such as maximum extension, minimum contraction distance, and maximum distraction rate. In one or more embodiments, the computing device 105 retrieves the predetermined threshold(s) from memory 118, from the remote computing environment 107, or from another external system. In at least one embodiment, in response to determining the distraction protocol violates one or more thresholds, the computing device 105 renders, on a display thereof, an alert (e.g., followed by the potential suspension or termination of the process 3000).

In some embodiments, the computing device 105 receives a distraction protocol from the remote computing environment 107 or receives an indication that a distraction event is scheduled to be performed. In at least one embodiments, in response to receiving the distraction protocol or the scheduling of a distraction event, the computing device 105 generates and renders an alert. In one or more embodiments, the computing device 105 receives an input to access the distraction protocol and/or perform the scheduled distraction event. In various embodiments, in response to the input, the computing device 105 requests and receives the distraction protocol and transmit the distraction protocol to the external device 103.

In some embodiments, the computing device 105 receives a request to initiate execute a distraction protocol. The request can include, for example, an input for initiating the application 125. In various embodiments, the computing device 105 launches the application 125. In some embodiments, the computing device 105 enforces a login process by prompting the user to submit login credentials to access the distraction protocol. In one or more embodiments, in response to receiving and verifying the login credentials (e.g., email, password, user account identifier 136, etc.), the application 125 renders one or more distraction protocol options (e.g., each distraction protocol corresponding to a different distraction implant 101 and associated with a corresponding distraction implant identifier 136). In at least one embodiment, the application 125 receives a selection of a distraction protocol. In one or more embodiments, the application 125 renders a NFC identifier 136 corresponding to the distraction implant 101 associated with the selected distraction protocol. In some embodiments, the application 125 processes the selected distraction protocol to determine a target site into which the distraction implant 101 was implanted. In at least one embodiment, the application 125 renders a user interface including the location of the target site (e.g., in prose and/or visually indicated on simulated anatomy). In various embodiments, the application 125 user interface includes an instruction to align the external device 103 over the distraction implant 101 implanted at the target site.

At step 3018, the process 3000 includes aligning the external device 103 to the distraction implant 101 such that the NFC device 111 can detect and read the NFC device 109 of the distraction implant 101. In various embodiments, step 3018 can include operations and actions similar to step 3012. In some embodiments, the process 3000 includes multiple instances of step 3018, such as first repetition of step 3018 for identifying and validating the distraction implant 101 and a second repetition of step 3018 for initiating a distraction event. In some embodiments, in response to the external device 103 reading a different NFC identifier 136 in a subsequent repetition of external device-distraction implant alignment, the computing device 105 renders an alert that the external device 103 is oriented over the wrong distraction implant 101 and an instruction to align the external device 103 over a different, correct distraction implant 101 (e.g., which may be indicated on the computing device 105 via a rendered user interface).

In at least one embodiment, the NFC device 111 reads, via the NFC device 109, a NFC identifier 136 and current distraction data 132 including, but not limited to, a current distraction distance, an expansion direction (e.g., which may indicate a motor rotation direction required to extend or contract the distraction implant 101), and a maximum distraction distance of the distraction implant 101. In some embodiments, in response to a failure to receive the NFC identifier 136 and current distraction data 132, the computing device 105 renders an alert indicating a communications error (e.g., in which case the process 3000 may be suspended or terminated). In at least one embodiment, the external device 103 transmits the NFC identifier 136 and current distraction data 132 to the computing device 105. In one or more embodiments, the computing device 105 compares the distraction protocol to the current distraction data 132 to determine whether the distraction protocol violates any thresholds. In various embodiments, in response to determining that the distraction protocol violates one or more thresholds, the computing device 105 renders an alert indicating that the distraction protocol cannot be executed. In at least one embodiment, in response to determining that the protocol distraction distance would result in the implant distraction distance failing to meet a distraction threshold, the computing device 105 adjusts the protocol distraction distance to a value equal to the distraction threshold value minus the current implant distraction distance (e.g., to ensure maximum safe distraction is achieved via the distraction event).

In one or more embodiments, in response to determining that the distraction protocol does not violate any thresholds, the computing device 105 transmits the distraction protocol to the external device 103 and renders an instruction to align the external device 103 over the distraction implant 101. In various embodiments, the external device 103 communicates with the computing device 105 to confirm receipt of the distraction protocol. In one or more embodiments, the external device 103 communicates with the computing device 105 to confirm that the external device 103 is in proper alignment with the distraction implant 101 and/or that the same NFC identifier 136 is being read from the NFC device 109 thereof.

At step 3021, the process 3000 includes initiating the distraction event. In one or more embodiments, in response to verifying the external device 103 and the distraction implant 101 are in proper alignment, the computing device 105 renders an indication that the distraction event can be initiated. In various embodiments, the computing device 105 transmits a readiness signal to the external device 103. In at least one embodiment, in response to the readiness signal, the external device 103 activates an effect source 123 associated with indicating distraction readiness and/or enables a selectable button 1905 associated with initiating distraction events. In various embodiments, the external device 103 receives a selection of the selectable button 1905 and, in response, initiates the distraction event according to the distraction protocol.

In various embodiments, the process 3000 includes performing one or more distraction control processes 3100 (e.g., shown in FIG. 31 and described herein) to control the distraction event.

At step 3024, the process 3000 includes performing one or more appropriate actions. Non-limiting examples of appropriate actions include indicating the successful or unsuccessful completion of the distraction event, storing distraction data 132 associated with the distraction event, evaluating progression of the distraction treatment, modifying the distraction plan, removing the distraction implant 101, prompting the user to charge the external device 103, and potentially other actions. In at least one embodiment, the external device 103 determines that the distraction event was completed as specified by the distraction protocol and, in response, activates one or more effect sources 123 to indicate the successful distraction event. In one or more embodiments, the external device 103 transmits an indication of the successful distraction event to the computing device 105. In various embodiments, in response to the indication, the computing device 105 renders a confirmation of distraction event completion. In at least one embodiment, the computing device 105 determines the next scheduled distraction event of the distraction plan. In one or more embodiments, the computing device 105 initiates a countdown or configures an alarm based on the next scheduled distraction plan. In at least one embodiment, in response to receiving an indication of an unsuccessful distraction plan, the computing device 105 automatically transmits an alert to a second computing device associated with a physician and/or other care providers.

In various embodiments, the external device 103 generates updated distraction data 132 based on the distraction event. The updated distraction data 132 can include, but is not limited to, the distraction implant identifier 136, the current distraction distance of the distraction implant 101, and a timestamp corresponding to the performance of the distraction event. In one or more embodiments, the external device 103 transmits the updated distraction data 132 to the computing device 105 for storage thereon and/or for transmission to the remote computing environment 107. In various embodiments, the remote computing environment 107 stores the updated distraction data 132 in association with one or more user accounts 134. In one or more embodiments, the computing device 105 determines that communication with the remote computing environment 107 is unavailable (e.g., due to lack of a network connection, down servers, etc.). In various embodiments, in response to the determination, the computing device 105 queues the updated distraction data 132 for transmission once communication capability with the remote computing environment 107 is restored. In at least one embodiment, the NFC device 111 writes the updated distraction data 132 to the NFC device 109 (e.g., which may be stored in the memory 118 of the distraction implant 101. In some embodiments, the computing device 105 requests and receives a subsequent scheduled distraction protocol from the remote computing environment 107.

In some embodiments, the surgeon evaluates progression of the distraction treatment via medical imaging, such as X-rays, magnetic resonance imaging, or other suitable techniques. In various embodiments, the surgeon, or the distraction service 129, modifies the distraction plan based on the progression of the distraction. In some embodiments, the surgeon, or distraction service 129, determines that a manual distraction event is required (e.g., to correct or progress the distraction plan). In at least one embodiment, the surgeon, or distraction service 129, determines a distraction protocol for the manual distraction event and transmits the distraction protocol to the computing device 105. In some embodiments, the surgeon, or distraction service 129, determines that a sufficient level of distraction osteogenesis has occurred or that the distraction plan has failed. In at least one embodiment, in response to the determination of distraction osteogenesis or failure, the distraction implant 101 is removed from the patient. In at least one embodiment, in response to determining that the distraction implant 101 has expanded to a predetermined total distraction distance, the distraction service 129 prevents the external device 103 from initiating further distraction events for the distraction implant 101.

In various embodiments, the distraction implant 101 is removed from the patient. In one or more embodiments, removing the distraction implant 101 includes exposing the target site into which the distraction implant 101 was installed. In some embodiments, exposing the target site includes performing medical imaging to identify and/or verify the location of the distraction implant 101 at the target site. In various embodiments, a surgeon removes one or more fasteners that secure the endplates and/or housing of the distraction implant 101 that secure the distraction implant from the target site. In one or more embodiments, following fastener removal, the surgeon extracts the distraction implant 101 from the target site. In various embodiments, following conclusion of a distraction plan associated with the distraction implant 101, the remote computing environment 107 archives all patient data associated with the distraction plan. In some embodiments, the remote computing environment 107 generates a second, anonymized archive of the patient data by redacting personal identifiable information (PII) from the patient data and storing the second, anonymized patient data at the data store 131. In various embodiments, the remote computing environment 107 evaluates the anonymized patient data (e.g., and potentially additional sets of anonymized patient data) to assess the performance of one or more distraction protocols and, in some embodiments, generate recommendations or automatic adjustments of distraction protocols for the purpose of improving distraction outcomes or reducing interrupted distractions, missed distractions, or failed distractions.

Figure 31:
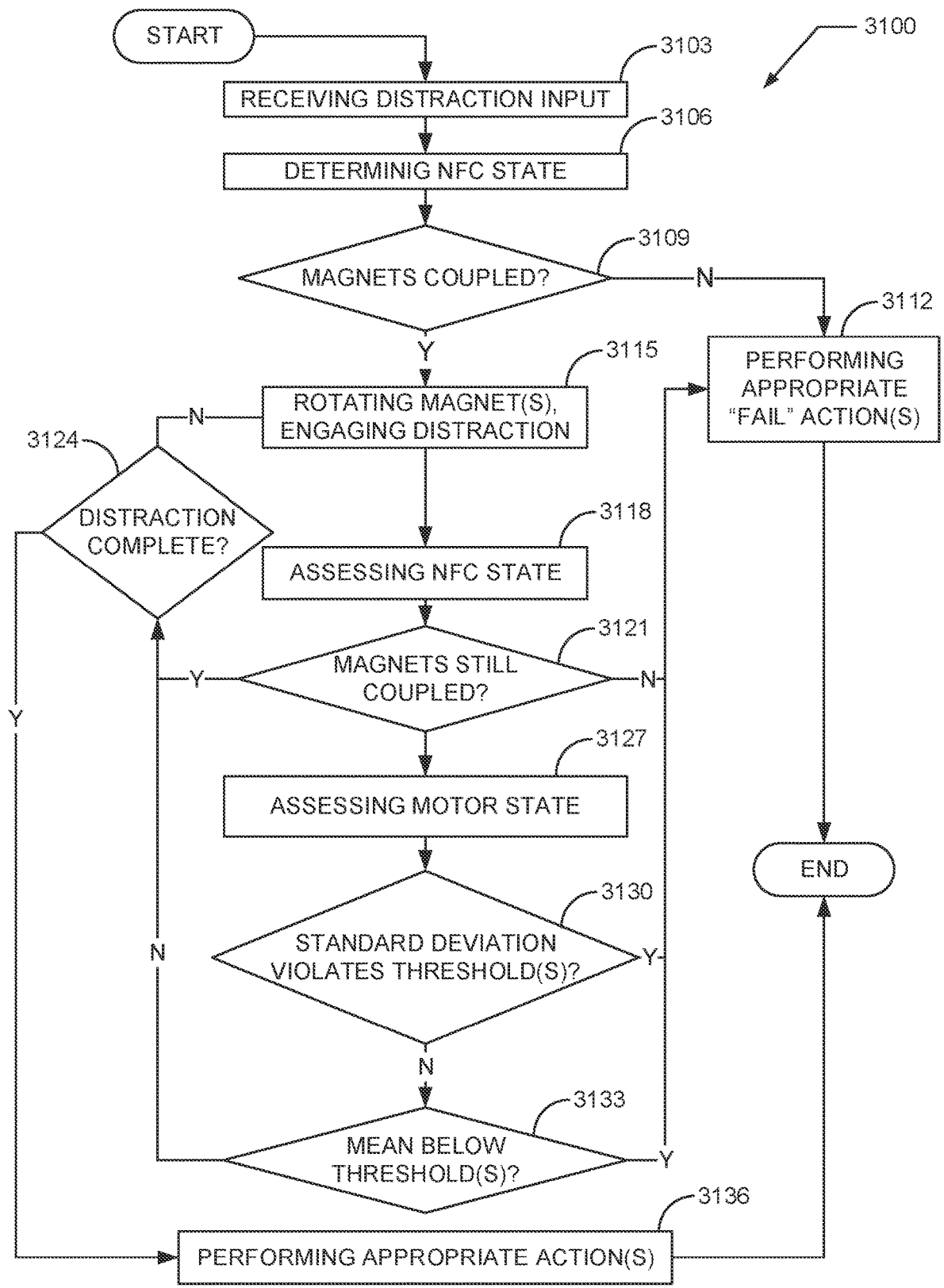
FIG. 31 shows an exemplary distraction control process, according to one embodiment of the present disclosure.

FIG. 31 shows an exemplary distraction control process 3100. In one or more embodiments, the external device 103, computing device 105, and distraction implant 101 perform the distraction control process 3100 to perform a distraction event according to one or more parameters of a distraction protocol.

At step 3103, the process 3100 includes receiving an input to initiate distraction. In some embodiments, step 3103 is performed similar to or encompasses step 3021 of the process 3000 shown in FIG. 1 and described herein.

At step 3106, the process 3100 includes determining a state of NFC interaction between the external device 103 and distraction implant 101, thereby approximating a state of alignment between the driver magnet 2801 of the external device 103 and the magnetic element 405 of the distraction implant 101. In at least one embodiment, due to accuracy benchmarks for performing magnetic distraction (e.g., the magnetic element of the distraction implant 101 cannot be rotated without being coupled to the driver magnet 2801 of the external device 103), the distraction system 100 uses NFC techniques to perform an initial check that the distraction implant 101 is present and the external device 103 is in proper alignment with the distraction implant 101.

In one or more embodiments, the microcontroller 115 of the external device 103 configures the NFC device 111 to a continuous read state (e.g., or a frequency-modulated active state at any suitable frequency, such as 10 Hz, 50 Hz, etc.). In various embodiments, the NFC device 111 continuously attempts to read the NFC device 109 of the distraction implant 101. In one or more embodiments, reading the NFC device 109 includes reading a NFC identifier 136 and determining that the NFC identifier 136 matches a stored NFC identifier 136 associated with the distraction implant 101. In at least one embodiment, during manufacturing and/or assembly of the distraction system 100, the NFC device 111 and NFC device 109 are tuned such that the NFC device 111 is configured to be capable of reading the NFC device 109 only once the NFC device 111 and NFC device 109 are within a predetermined proximity (e.g., less than 10 mm, less than 12 mm, less than 14 mm, less than 16 mm, less than 18 mm, less than 20 mm, less than 22 mm, less than 24 mm, less than 26 mm, less than 28 mm, less than 30 mm, or another suitable value). In various embodiments, the microcontroller 115 generates metadata corresponding to each successful reading of the NFC device 109 during the distraction event. The metadata can include, for example, a timestamp corresponding to the successful read and the NFC identifier 136 obtained via each read. In one or more embodiments, the external device 103 transmits the metadata to the computing device 105, which may store the metadata as a portion of distraction data 132 corresponding to the distraction event.

In various embodiments, the microcontroller 115 activates one or more effect sources 123 in response to each successful read of the NFC device 109, thereby providing a visual indication of proper external device-distraction implant alignment.

At step 3109, the process 3100 includes determining whether the driver magnet 2801 is appropriately coupled to the magnetic element 405 based on the NFC state. In various embodiments, the microcontroller 115 determines whether the NFC identifier 136 read from the NFC device 109 matches a stored NFC identifier 136 associated with the distraction protocol. In response to matching the NFC identifiers 136, the microcontroller 115 can determine that the external device 103 is in proper alignment with the distraction implant 101 and, thereby, determine that the driver magnet 2801 is appropriately coupled to the magnetic element 405. In response to failing to match the NFC identifiers 136, the microcontroller 115 can determine that the external device 103 is not in proper alignment with the distraction implant 101 and, thereby, determine that the driver magnet 2801 is not appropriately coupled to the magnetic element 405.

In one or more embodiments, in response to a failure of the NFC device 111 to read the NFC device 109, the microcontroller can determine that the external device 103 is not in proper alignment with the distraction implant 101 and, thereby, determine that the driver magnet 2801 is not appropriately coupled to the magnetic element 405. In at least one embodiment, in response to determining that the driver magnet 2801 and magnetic element 405 are not appropriately coupled, the process 3100 proceeds to step 3112. In various embodiments, in response to determining that the driver magnet 2801 and magnetic element 405 are appropriately coupled, the process 3100 proceeds to step 3115.

In one or more embodiments, during each reading of the NFC device 109, the NFC device 111 writes updated distraction data 132 to the NFC device 109 (e.g., for storage in memory thereof). In one or more embodiments, the updated distraction data 132 includes, but is not limited to, the current distraction distance of the distraction implant 101.

At step 3112, the process 3100 includes performing one or more appropriate "fail" actions. In at least one embodiment, in response to a mismatch between the stored NFC identifier 136 and the NFC identifier 136 read by the NFC device 109, the external device 103 suspends the distraction event, including halting rotation of the motor 119. In one or more embodiments, in response to a mismatch between the stored NFC identifier 136 and the NFC identifier 136 read by the NFC device 109, the external device 103 transmits an implant mismatch signal to the computing device 105. In various embodiments, in response to the implant mismatch signal, the computing device 105 renders, on a display thereof, an implant mismatch alert and an instruction to align the external device 103 over the correct distraction implant 101 (e.g., the implanted location of which may be rendered on the display). In one or more embodiments, in response to reading a NFC identifier 136 from the NFC device 109 that matches the stored NFC identifier 136, the external device 103 resumes the distraction event.

In one or more embodiments, in response to determining decoupling between the driver magnet 2801 and the magnetic element 405, the external device 103 performs one or more actions. In at least one embodiment, the external device 103 stops rotation of the motor 119. In various embodiments, the external device 103 attempts to write a current distraction distance to the NFC device 109. In one or more embodiments, the external device 103 transmits an error signal to the computing device 105. In at least one embodiment, in response to the error signal, the computing device 105 renders, on a display thereof, an indication of distraction interruption. In one or more embodiments, the computing device 105 recalculates a remaining distraction distance associated with the interrupted distraction event. In various embodiments, the computing device 105 determines one or more updated distraction parameters based on the remaining distraction distance, such as, for example, updated distraction distance, updated motor rotation direction, and/or updated motor rotation speed. In at least one embodiment, the external device 103 receives the updated distraction parameters from the computing device 105 and, upon determining recoupling of the driver magnet 2801 and magnetic element 405, resumes the distraction event according to the updated distraction parameters. In one or more embodiments, the microcontroller 115 activates one or more effect sources 123 to indicate the distraction interruption (e.g., and, in some embodiments, the cause thereof, such as decoupling, implant mismatch, loss of power, stalled component(s), etc.).

In various embodiments, in response to determining that the standard deviation of the motor current violates one or more predetermined thresholds, the external device 103, or computing device 105, determines that the external device 103 is out of alignment with the distraction implant 101 and/or that the distraction mechanism of the distraction implant 101 is in a stalled state.

In one or more embodiments, in response to determining that the mean motor current value is less than a predetermined threshold, the microcontroller 115 determines that the external device 103 and distraction implant 101 are out of alignment. In various embodiments, in response to determining that a torque value is less than a predetermined threshold, the microcontroller 115 can increase a rotation speed of the motor 119. In some embodiments, in response to determining that a torque value is less than a predetermined threshold, the computing device 105 can render an instruction to reduce a distance between the external device 103 and the target site corresponding to the distraction implant 101. In at least one embodiment, in response to determining that a torque value exceeds a predetermined threshold, the microcontroller can determine that the distraction implant 101 is in a stalled state.

In one or more embodiments, in response to the determination of misalignment and/or stall, the distraction system 100 performs one or more above described operations to suspend the distraction event, alert a user to the error condition, and initiate one or more corrective actions (e.g., realigning the external device 103, terminating the distraction event, transmitting an alert to consult a surgeon or technician, etc.).

At step 3115, the process 3100 includes rotating the driver magnet 2801 via the motor 119, thereby applying a torque to the magnetic element 405 and engaging distraction. In at least one embodiment, upon the external device 103 determining that the distraction implant 101 is present and in proper alignment (e.g., via NFC identifier reading), the external device 103 can activate the motor 119 and, thereby initiate rotation of the driver magnet 2801, which causes corresponding rotation of the coupled magnetic element 405. In one or more embodiments, while the driver magnet 2801 and magnetic element 405 are rotating, the external device 103 continues to monitor external device-implant device alignment (e.g., via NFC reading). In various embodiments, in response to the NFC device 111 failing to read the NFC device 109, the external device 103 halts rotation of the motor 119 and records an error condition including a loss of coupling to the distraction implant 101.

In at least one embodiment, engaging distraction includes the magnetic element 405 rotating a worm 401. In various embodiments, the rotating worm 401 rotates a worm gear 205. In one or more embodiments, the rotating worm gear 205 rotates and linearly displaces a distraction control rod (e.g., central shaft 209 and/or distal shaft 211). In at least one embodiment, the distraction control rod linearly displaces a footplate 202B, thereby providing distraction of the respective bony portions to which the footplate 202B and footplate 202A are secured.

In various embodiments, the microcontroller 115 activates the motor 119 to a predetermined rotation rate defined by the distraction protocol (e.g., or computed from a distraction distance defined thereby). In at least one embodiment, the microcontroller 115 activates the encoder 121 to count a number of revolutions of the motor 119. In at least one embodiment, as the motor 119 rotates, the microcontroller 115 generates updated distraction data 132. The updated distraction data 132 can include, for example, a current distraction distance, the number of rotations of the motor 119, and/or a metric that quantifies the progress of the distraction event, such as a percentage of specified distraction performed. In one or more embodiments, the external device 103 transmits the updated distraction data 132 to the computing device 105. In at least one embodiment, the computing device 105 generates and renders, on a display thereof, a user interface including the progress of the distraction event. In some embodiments, the computing device 105 locally stores the updated distraction data 132. In at least one embodiment, the computing device 105 transmits the updated distraction data 132 to the remote computing environment 107 for storage. In various embodiments, following each rotation of the motor 119 (e.g., or a predetermined degree of partial rotation, such as 90 degrees, 45 degrees, etc.), the NFC device 111 writes the updated distraction data 132 to the NFC device 109 of the distraction implant 101.

At step 3118, the process 3100 includes assessing the state of NFC interaction between the external device 103 and distraction implant 101, thereby approximating the state of alignment between the driver magnet 2801 and the magnetic element 405. In various embodiments, step 3118 is performed similar to step 3106.

At step 3121, the process 3100 includes determining whether the driver magnet 2801 is still appropriately coupled to the magnetic element 405 based on the NFC state and potentially other factors, such as the motor state. In various embodiments, step 3121 is performed similar to step 3109. In at least one embodiment, in response to determining that the driver magnet 2801 and magnetic element 405 are not appropriately coupled, the process 3100 proceeds to step 3112. In various embodiments, in response to determining that the driver magnet 2801 and magnetic element 405 are appropriately coupled, the process 3100 proceeds to step 3115.

In some embodiments, step 3121 is performed subsequent to one or more of steps 3127, 3130, 3133, and the output(s) of steps 3127, 3130, and/or 3133 can be inputs to step 3121.

At step 3124, the process 3100 includes determining whether the distraction event is complete. In at least one embodiment, the external device 103, or computing device 105, compares a current distraction distance to a predetermined distraction distance specified by the distraction protocol with which the distraction event is associated. In various embodiments, the predetermined distraction distance is 0.5 mm, 0.75 mm, 1.0 mm, 1.5 mm, or another suitable value. In one or more embodiments, in addition to or instead of comparing the distraction distances, the external device 103 compares a current count of motor rotations to a predetermined count of motor rotations associated with achieving the prescribed distraction distance of the distraction protocol. In some embodiments, the predetermined distraction distance and/or predetermined count of motor rotations are distraction thresholds stored at the external device 103 or computing device 105. In various embodiments, in response to the current distraction distance equaling the predetermined distraction distance and/or the current count of motor rotations equaling the predetermined count of motor rotations, the external device 103 determines that the distraction event is complete. In one or more embodiments, in response to the current distraction distance being less than the predetermined distraction distance and/or the current count of motor rotations being less than the predetermined count of motor rotations, the external device 103 determines that the distraction event is incomplete.

In one or more embodiments, in response to determining that the distraction event is incomplete, the process 3100 proceeds to step 3115. In various embodiments, in response to determining that the distraction event is complete, the process 3100 proceeds to step 3136.

At step 3127, the process 3100 includes assessing a state of the motor 119. In one or more embodiments, the microcontroller 115 measures a magnitude of current being drawn by the motor 119. In one or more embodiments, the microcontroller 115 includes, or is in communication with, a high precision current sensing instrumentation amplifier configured to measure current drawn by the motor 119. In at least one embodiment, the current sensing instrumentation amplifier includes a gain of 10×, 25×, 50×, 100×, or another suitable value. In one or more embodiments, the current sensing instrumentation amplifier includes a high power supply rejection ratio (PSRR) and high common mode rejection ratio (CMRR). In at least one embodiment, the current sensing instrumentation amplifier includes one or more anti-aliasing filters. In various embodiments, the current sensing instrumentation amplifier includes one or more electromagnetic (EM) interference filters. In one or more embodiments, the current sensing instrumentation amplifier is configured to perform bi-directional sensing between the motor 119 and the power supply 110.

In at least one embodiment, the current sensing instrumentation amplifier includes a differential mode filter and a common mode filter. In one or more embodiments, the current sensing instrumentation amplifier is configured to perform digital down sampling. In one or more embodiments, the current sensing instrumentation amplifier is configured to sample the current at a frequency of 20 kHz, or another suitable value. In some embodiments, the current sensing instrumentation amplifier is configured to measure a plurality of sample current values and average the plurality of sample current values to generate a mean current value (e.g., which may reduce the current sampling rate based on the number of samples, such as, for example, reducing the sample frequency to 2500 Hz in a scenario where 8 current samples are averaged). In one or more embodiments, the microcontroller 115 checks the mean current value against a predetermined threshold 120. In one or more embodiments, in response to the mean current value being less than the predetermined distraction value, the microcontroller 115 halts rotation of the motor 1119. In at least one embodiment, a low mean current value is indicative of a loss of magnetic coupling between the external device 103 and the distraction implant 101 and/or a stalled implant condition.

In various embodiments, the microcontroller 115 receives one or more current measurements from the current sensing instrumentation amplifier. In at least one embodiment, the microcontroller 115 generates a mean current value based on two or more current measurements over a predetermined time period (e.g., 0.1 seconds, 0.5 seconds, 1 second, or any suitable interval). In various embodiments, the microcontroller 115 generates a standard deviation metric (e.g., or standard deviation-indicative metric, such as a sum of differences) based on the one or more current measurements and a plurality of historical current measurements (e.g., which may include predefined values of current). In at least one embodiment, the microcontroller 115 checks the standard deviation metric against a predetermined threshold 120. In one or more embodiments, in response to the standard deviation metric exceeding the predetermined threshold 120, the microcontroller 115 halts rotation of the motor 119. In various embodiments, a high standard deviation metric can indicate one or more error conditions. In at least one embodiment, a high standard deviation metric is indicative of excessive lateral offset between the driver magnet 2801 and magnetic element 405 (e.g., misalignment). In one or more embodiments, a high standard deviation metric is indicative of a stalled distraction implant 101 (e.g., torque generated by the magnet coupling is not sufficient to expand or contract the distraction implant 101).

In various embodiments, the microcontroller 115, or application 125, determines a value of torque based on the mean current value. In one or more embodiments, the microcontroller 115 generates the value of torque via one or more algorithms, equations, and/or models, such as a calibration curve of motor current and torque. In at least one embodiment, in addition to or in place of mean current value and current standard deviation, the microcontroller 115 assesse motor stated based on the torque value. In one or more embodiments, the microcontroller 115 compares the torque value to a predetermined torque threshold. In at least one embodiment, in response to the torque value exceeding the predetermined threshold, the microcontroller 115 determines that the distraction implant 101 is over-torqued and, in response, the process 3100 proceeds to step 3112 (e.g., which may include, for example, terminating the distraction event, initiating a reversal of the distraction event, or transmitting an alert to the computing device 105, the remote computing environment 107). In various embodiments, the microcontroller 115 performs a frequency analysis on a plurality of time series torque values to generate a standard deviation metric. In one or more embodiments, the microcontroller 115 determines whether the standard deviation metric exceeds a predetermined threshold. In at least one embodiment, in response to the standard deviation metric exceeding the predetermined threshold, the microcontroller 115 determines that the distraction implant 101 is in a stalled state (e.g., which may result in the process 3100 proceeding to step 3112). In various embodiments, the microcontroller 115 performs one or more pattern recognition processes on the torque value, or a plurality of time series torque values, to determine whether the output torque pattern corresponds to a torque pattern associated with misalignment between the external device 103 and the distraction implant 101.

In one or more embodiments, the microcontroller 115 determines an updated distraction distance based on one or more of the motor current value(s), the computed torque value(s), the count of motor rotations, and/or outputs of one or more sensors 113A, such as an encoder configured to measure a distance between the footplates 202A, 202B of the distraction implant 101 (e.g., or an extension or contraction length of the distraction rod).

At step 3130, the process 3100 includes determining whether the standard deviation metric violates one or more predetermined thresholds. In various embodiments, the microcontroller 115, or the application 125, compares the standard deviation metric to the predetermined threshold. In one or more embodiments, in response to the standard deviation metric exceeding a maximum threshold (e.g., and/or falling below a minimum threshold), the process 3100 proceeds to step 3112. In at least one embodiment, in response to the standard deviation metric being less than the maximum threshold (e.g., and/or being above a minimum threshold), the process 3100 proceeds to step 3133.

At step 3133, the process 3100 includes determining whether the mean current value is less than one or more predetermined thresholds. In various embodiments, the microcontroller 115, or the application 125, compares the mean current value to the predetermined threshold. In one or more embodiments, in response to the mean current value being less than the predetermined threshold, the process 3100 proceeds to step 3112. In some embodiments, the microcontroller 115 determines whether the mean current value exceeds a first, minimum threshold and a second, maximum threshold. In various embodiments, meeting or exceeding the second, maximum threshold can be indicative of a stalled distraction mechanism or other distraction implant or target site condition (e.g., improper alignment of bone portions, blockage of distraction implant and/or bone portion movement, etc.). In at least one embodiment, in response to the mean current value being greater than the minimum threshold (e.g., and/or being less than a maximum threshold), the process 3100 proceeds to step 3124.

At step 3136, the process 3100 includes performing one or more appropriate actions in response to completion of the prescribed distraction event. In at least one embodiment, the microcontroller 115 activates one or more effect sources 123 to indicate successful completion of the distraction event. In one or more embodiments, the microcontroller 115 generates a final distraction distance of the distraction implant 101. In various embodiments, the microcontroller 115 transmits the final distraction distance to the computing device 105. In one or more embodiments, the computing device 105 transmits distraction data 132 corresponding to the completed distraction event (e.g., and including the final distraction distance) to the remote computing environment 107 for storage at the data store 131. In at least one embodiment, the NFC device 111 writes the final distraction distance to the NFC device 109 of the distraction implant 101.

In one or more embodiments, the external device 103 transmits an indication of distraction event completion to the computing device 105. In various embodiments, in response to receiving an indication of distraction event completion from the external device 103, the computing device 105 renders, on a display thereof, a confirmation of the distraction event completion. In some embodiments, in response to the indication of distraction event completion, the remote computing environment 107 updates the distraction plan to include data indicating compliance with the corresponding distraction protocol. In one or more embodiments, the remote computing environment 107 processes the distraction plan to identify a subsequently scheduled distraction protocol. In various embodiments, the remote computing environment 107 transmits, to the computing device 105, an alert denoting the subsequently scheduled distraction event.

Figure 32:
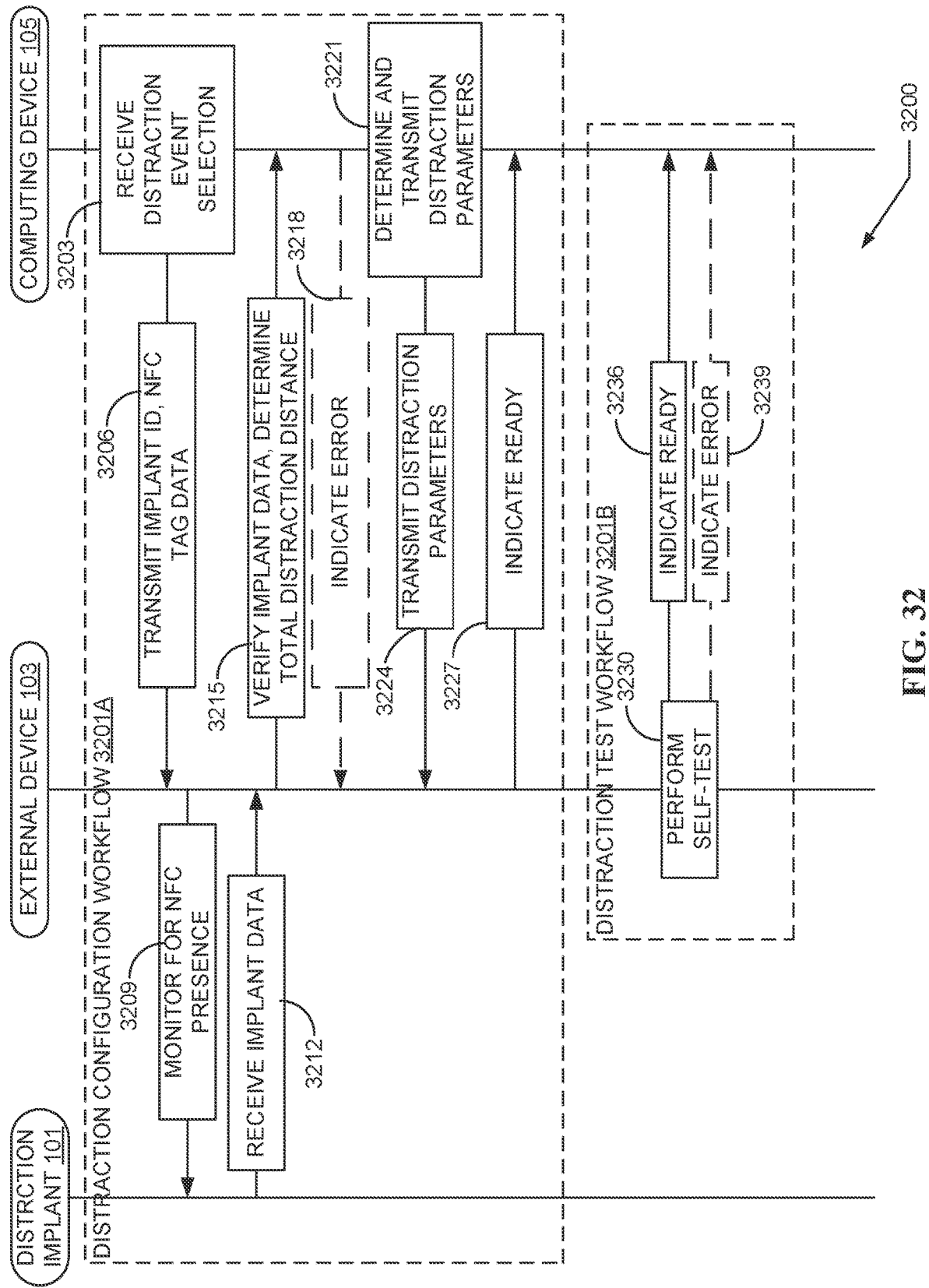
FIG. 32 shows a diagram of exemplary distraction workflows, according to one embodiment of the present disclosure.

FIG. 32 shows a diagram 3200 of exemplary distraction workflows. In various embodiments, the diagram 3200 includes a distraction configuration workflow 3201A and a test distraction workflow 3201B. In some embodiments, the distraction system 100 performs the workflow 3201A subsequent to the workflow 3210A.

At block 3203 of the workflow 3200A, the computing device 105 can receive a user input selecting a distraction event.

At block 3206 of the workflow 3200A, the computing device 105 can transmit, to the external device 103, an implant identifier 136 and NFC tag data associated with the selected distraction event. In one or more embodiments, via the implant identifier 136 and NFC tag data, the computing device 105 instructs the external device 103 as to which distraction implant 101 it should detect.

At block 3209 of the workflow 3200A, the NFC device 111 of the external device 103 can continuously monitor for an NFC device 111 that includes the implant identifier and/or NFC tag data.

At block 3212 of the workflow 3200A, the external device 103 can receive implant data via the NFC devices 109, 111. In at least one embodiment, the implant data includes a second implant identifier and/or second NFC tag data. In various embodiments, the external device 103 verifies that the second implant identifier matches the implant identifier of block 3206 and/or that the second NFC tag data matches the NFC tag data of block 3206.

At block 3215 of the workflow 3200A, the computing device 105 can receive the implant data from the external device 103, verifies the implant data as being associated with the implant identifier, and determines a distraction limit based on the implant data. In one or more embodiments, the implant data further includes, but is not limited to, a current distraction distance, a total distraction distance, and potentially other implant information, such as a as rotation direction for initiating expansion of the distraction implant 101. In at least one embodiment, the total distraction distance is a maximum expansion distance that the distraction implant 101 can achieve (e.g., which may differ from a therapeutic, prescribed distraction distance). In various embodiments, the current distraction distance is the current distance to which the distraction implant 101 is expanded. According to one embodiment, the computing device 105 considers the current distraction distance to be the a record of the extent to which the distraction implant 101 is currently expanded (e.g., thereby acting as a safety buffer in the event that distraction records are lost or unavailable due to misplacement, data corruption, or lack of network connectivity).

At block 3218 of the workflow 3200A, the computing device 105 can transmit an error condition to the external device 103. In at least one embodiment, the computing device 105 transmits the error condition in response to determining that a prescribed distraction distance exceeds the total distraction distance of the distraction implant 101.

At block 3221 of the workflow 3200A, the computing device 105 determines one or more distraction parameters (e.g., based on a distraction protocol 128 associated with the distraction implant 101). In at least one embodiment, the distraction parameters can include, but are not limited to, the prescribed distraction distance, a motor rotation direction, and/or a motor rotation speed. In one or embodiments, the computing device 105 can adjust the prescribed distraction distance based on the total distraction distance of the distraction implant 101. For example, the computing device 105 can set the prescribed distraction distance to a value equal to or less than the total distraction distance.

At block 3224 of the workflow 3200A, the computing device 105 can transmit the one or more distraction parameters to the external device 103.

At block 3227 of the workflow 3200A, in response to receiving the one or more distraction parameters, the external device 103 can transmit an indication of distraction readiness to the computing device 105.

At block 3233 of the workflow 3200B, the external device 103 can perform a self-test to identify any error conditions at the external device 103, the distraction implant 101, or therebetween. In some embodiments, the external device 103 performs the self-test in response to transitioning to a powered mode from a low power or sleep mode (e.g., the transition occurring in response to receiving a user input, such as a button press).

In one or more embodiments, the self-test includes determining whether the distraction implant 101 and external device 103 are in proper alignment (e.g., based on NFC communications therebetween and/or a magnitude of current drawn by the motor 119 of the external device 103 during a calibration rotation). In at least one embodiment, the self-test includes the external device 103 initiating one or more calibration rotations of the motor 119 to measure the baseline current drawn thereby and adjust any current thresholds accordingly (e.g., increasing the threshold(s) in response to an increased baseline current or reducing the threshold(s) in response to decreased baseline current).

At block 3236 of the workflow 3200B, in response to the external device 103 determining that no error conditions are present, the external device 103 can transmit an indication of distraction readiness to the computing device 105.

At block 3239 of the workflow 3200B, in response to the external device 103 determining one or more error conditions are present (e.g., misalignment, implant stalling, motor malfunction, etc.), the external device 103 can transmit an indication of distraction error to the computing device 105.

Figure 33:
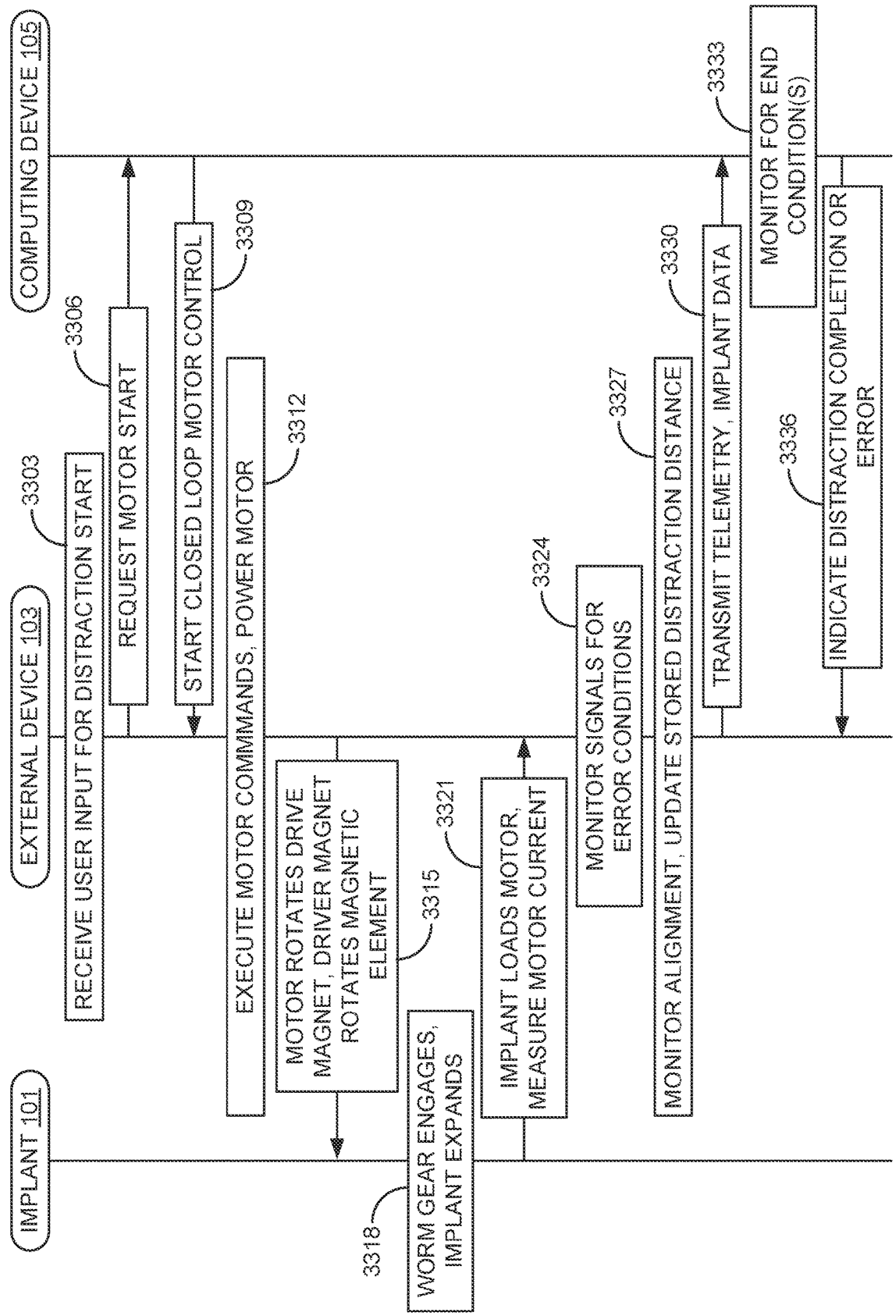
FIG. 33 shows a diagram of an exemplary distraction workflow, according to one embodiment of the present disclosure.

FIG. 33 shows a diagram of an exemplary distraction event workflow 3300.

At block 3303, the external device 103 can receive a user input for initiating a distraction event. In various embodiments, once the distraction system 100 is ready to start a distraction event and the external device 103 detects an NFC device 109 associated with a distraction implant 101 corresponding to the distraction event, the user presses a start button on the external device 103 to begin the distraction event. In at least one embodiment, following receipt of the user input, the distraction system 100 executes the distraction event unless an error condition is detected. In some embodiments, during the distraction event, the external device 103 and computing device 105 disable one or more input devices such that the user is prevented from stopping the distraction event via providing user inputs.

At block 3306, the computing device 105 can receive, from the external device 103, a request to initiate rotation of the motor 119.

At block 3309, in response to the request, the computing device 105 can transmit, to the external device 103, a command to initiate closed loop motor control of the motor 119.

At block 3312, the external device 103 can execute one or more motor commands to power the motor 119.

At block 3315, the motor 119 can rotate a driver magnet 2801, and the rotating driver magnet 2801 can rotate the magnetic element 405 of the distraction implant 101. In one or more embodiments, the external device 103 rotates the motor 119 at a fixed rotation rate (e.g., 90 revolutions per minute (RPM), 60 RPM, 180 RPM, or another suitable rotation rate).

At block 3318, the worm gear 205 of the distraction implant can rotate in response to rotation of a worm 401

(e.g., the rotation of the worm 401 rotating via the rotation of the magnetic element 405), thereby causing expansion of the distraction implant 101.

At block 3321, the distraction implant 101 can apply a load to the motor 119 and the external device 103 can measure a magnitude of current drawn by the motor 119.

At block 3324, the external device 103 can monitor various signals for error conditions. In various embodiments, the external device 103 can monitor the motor current and/or NFC communication signals between the external device 103 and the distraction implant 101 to determine if one or more error conditions are present. The error conditions can include, but are not limited to, misalignment of the external device 103 and the distraction implant 101 or stalling of the distraction implant 101.

In one or more embodiments, the microcontroller 115 of the external device 103 reads the encoder 121. In one or more embodiments, based on readings of the encoder 121, the external device 103 uses the encoder readings for speed feedback. In at least one embodiment, the external device 103 uses the encoder readings into a proportional-integral-derivative (PID) controller to maintain a constant rotation speed of the motor 119. In one or more embodiments, the external device 103 tunes the gain of the PID controller based on the encoder readings to modulate a standard deviation of current values being read from the motor 119. The value of the standard deviation (or a value that is similar to the standard deviation calculation) can be representative of an error condition and, thus, the tuning of the PID controller can effect changes to the standard deviation that advantageously reduce error condition occurrence. For example, when the PID loop is tuned very aggressively, the baseline (e.g., no error condition) standard deviation of the motor current increases and, thereby, the value of motor current increases, potentially increasing occurrences of error conditions, such as implant stall. As another example, if the PID controller is tuned very loosely (e.g., very slow adjustments) the standard deviation of the motor current is reduced toward a baseline value and, thereby occurrences of error conditions may be advantageously reduced.

In some embodiments, in response to detecting an error condition (e.g., external device-distraction implant misalignment, implant stalling, etc.), the external device 103 can halt rotation of the motor 119, thereby suspending expansion of the distraction implant 101.

At block 3327, the external device 103 can continue monitoring the alignment of the external device 103 and distraction implant 101 and write an updated distraction distance to the distraction implant 101 via NFC communication.

At block 3330, the external device 103 can transmit implant data and telemetry of the external device 103 and distraction implant 101 to the computing device 105 to allow for storage of data regarding the distraction event and to allow the computing device 106 to signal to the external device 103 to suspend the distraction event (e.g., once the prescribed distraction distance for the distraction event is reached).

At block 3333, the computing device 105 can monitor for one or more end conditions, such as expansion of the distraction implant 101 to the prescribed distraction distance.

At block 3336, the computing device 105 can transmit, to the external device 103, an indication of distraction completion or an indication of one or more error conditions. In various embodiments, in the event of an error or successful distraction event completion, the external device 103 and/or computing device 105 provide corresponding indications of the error conditions or distraction completion to the user. In at least one embodiment, in the event of an error condition, the computing device 105 can prompt the user to realign the external device 103 over the distraction implant 101 to resume the distraction event. In various embodiments, in the event of an error condition, the computing device 105 can prompt the user to contact their physician (e.g., or the computing device 105 can automatically transmit an alert to a computing device of the physician).

Figure 34:
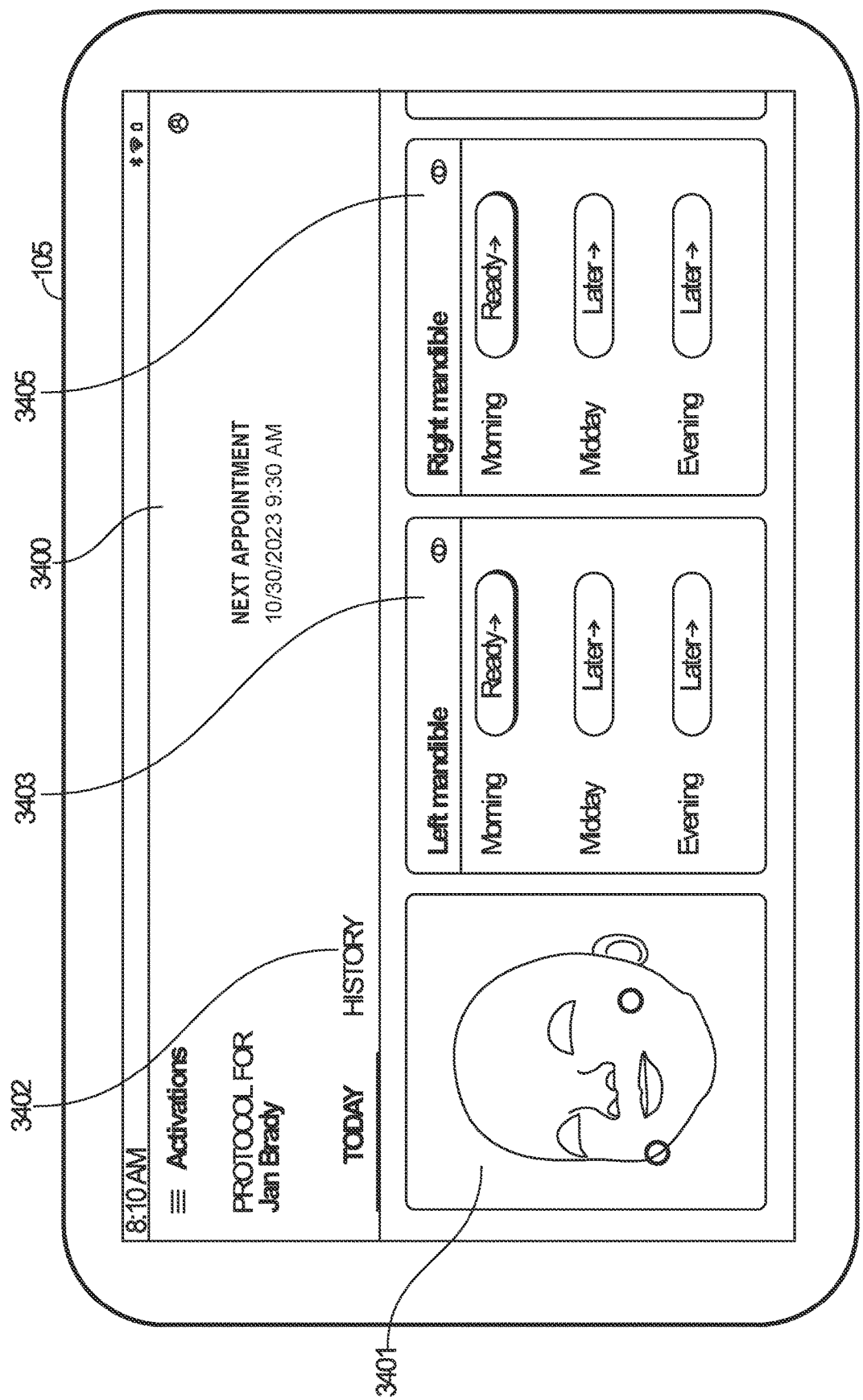
FIG. 34 shows an exemplary computing device and user interface, according to one embodiment of the present disclosure.

FIG. 34 shows an exemplary computing device 105 and user interface 3400. In one or more embodiments, the user interface 3400 displays distraction data corresponding to one or more distraction implants. In at least one embodiment, the user interface 3400 includes a mapping 3401 that indicates where on a patient one or more distraction implants are located, thereby providing an indication of where an external device may be aligned to initiate distraction events at the corresponding distraction implant. In at least one embodiment, the user interface 3400 includes tabs 3402 for accessing current distraction data or historical distraction data. In one or more embodiments, the user interface 3400 includes an implant status summary 3403, 3405 for each distraction implant currently implanted in a patient. In various embodiments, the implant status summaries 3403, 3405 can indicate scheduled distraction events and whether a scheduled distraction event can be performed. In one or more embodiments, the computing device 105 (FIG. 1) and/or remote computing environment 107 (FIG. 1) can update the user interface 3400 (e.g., and potentially other user interfaces) during or following each distraction event. In various embodiments, the computing device 105 can update the user interface 3400 to indicate a missed distraction event or one or more modifications to a distraction protocol (e.g., as performed in response to input from a physician-type user account and/or distraction-related determinations of the distraction service of the remote computing environment).

Figure 35:
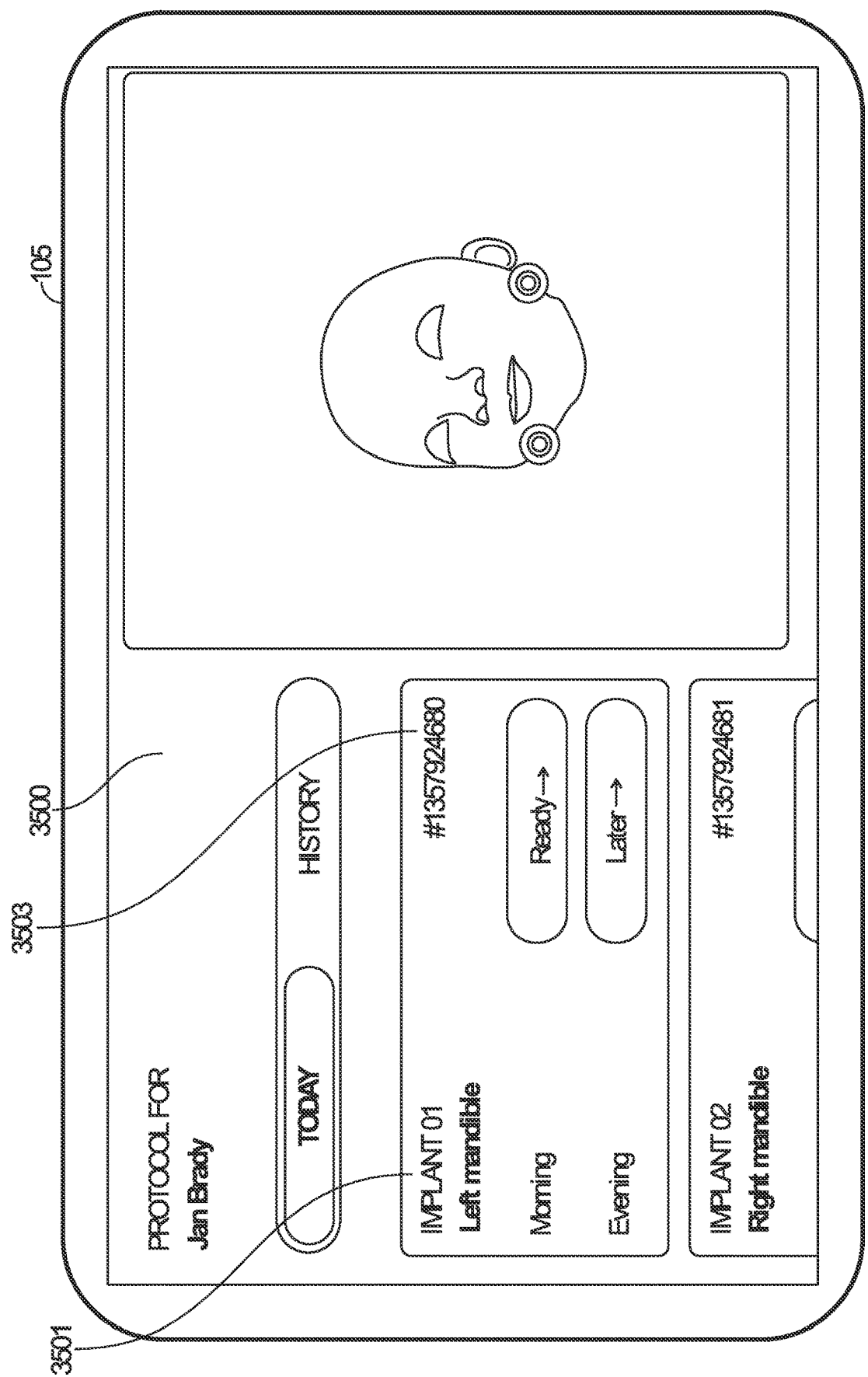
FIG. 35 shows an exemplary computing device and user interface, according to one embodiment of the present disclosure.

FIG. 35 shows an exemplary computing device 105 and user interface 3500. In one or more embodiments, the user interface 3500 can include an implant nickname 3501 and an implant identifier 3503 associated with a particular distraction implant. In some embodiments, the implant nickname 3501 identifies a target site into which the corresponding distraction implant is installed.

FIG. 36 shows an exemplary control loop 3600.

FIG. 37 shows an exemplary power supply architecture 3700.

FIG. 38 shows an exemplary motor control architecture 3800.

FIG. 39 shows an exemplary motor control circuit 3900.

FIG. 40 shows an exemplary logic level shifter circuit 4000.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A distraction system, comprising:
a distraction implant comprising a magnetic element, a distraction mechanism configured to expand the distraction implant in response to rotation of the magnetic element, and a first near-field communication (NFC) device configured to store an implant identifier; and
an external device comprising:
a motor configured to rotate a driver magnet while in a powered state;
the driver magnet configured to rotate the magnetic element;
a second NFC device; and
a computing device embedded in or in operative communication with the external device, wherein the computing device includes a processor programmed to execute the following instructions:
determine an alignment between the distraction implant and the external device based on a first reading of the implant identifier from the first NFC device via the second NFC device;
measure an electrical current drawn by the motor during rotation of the driver magnet; and
maintain the motor in the powered state in response to:
determining a continued alignment between the distraction implant and the external device based on a second reading of the implant identifier from the first NFC device via the second NFC device;
a mean value of the electrical current being greater than or equal to a mean value threshold; and
a standard deviation value of the electrical current being less than or equal to a standard deviation threshold.

2. The distraction system of claim 1, wherein the processor is further programmed to execute the following instructions: transition the motor to a depowered state in response to: determining a misalignment between the distraction implant and the external device based on a third reading of the implant identifier from the first NFC device via the second NFC device, the mean value of the electrical current being less than the mean value threshold, or the standard deviation value of the electrical current exceeding the standard deviation threshold.

3. The distraction system of claim 1, wherein the computing device is a first computing device and the distraction system further comprises a second computing device including a processor programmed to execute the following instructions: transmit a command to the first computing device, wherein the processor of the first computing device is further programmed to execute the following instructions: transition the motor to the powered state in response to the command.

4. The distraction system of claim 3, wherein the processor of the second computing device is further programmed to execute the following instructions: transmit the command in response to determining that a predetermined latency period has elapsed.

5. The distraction system of claim 4, wherein the processor of the second computing device is further programmed to execute the following instructions:
receive at least one credential via an input device;
authenticate a user account based on the at least one credential;
retrieve a reference value based on the user account;
receive the implant identifier from the first computing device; and
transmit the command in response to the implant identifier matching the reference value.

6. The distraction system of claim 1, wherein:
the external device further comprises an encoder configured to measure rotation of the motor in the powered state; and
the processor of the computing device is further programmed to execute the following instructions:
determine a rotation count via the encoder; and
transition the motor from the powered state to a depowered state in response to the rotation count meeting a third predetermined threshold.

7. The distraction system of claim 1, wherein the processor of the computing device is further configured to execute the following instructions:
determine a communication failure of a third reading of the implant identifier; and
transition the motor from the powered state to a depowered state in response to the failure.

8. The distraction system of claim 1, wherein the processor of the computing device is further configured to execute the following instructions:
determine that a subsequent mean value of the electrical current is less than the mean value threshold; and in response to determining that the subsequent mean value of the electrical current is less than the mean value threshold, transition the motor from the powered state to a depowered state.

9. The distraction system of claim 1, wherein the processor of the computing device is further configured to execute the following instructions:
   determine that a subsequent mean value of the electrical current is greater than or equal to a third predetermined threshold; and
   in response to determining that the subsequent mean value of the electrical current is greater than or equal to the third predetermined threshold, transition the motor from the powered state to a depowered state.

10. The distraction system of claim 1, wherein the processor of the computing device is further configured to execute the following instructions:
    determine that a subsequent standard deviation value of the electrical current is greater than the standard deviation threshold; and
    in response to determining that the subsequent standard deviation value of the electrical current is greater than the standard deviation threshold, transition the motor from the powered state to a depowered state.

11. The distraction system of claim 1, wherein the processor of the computing device is further configured to execute the following instructions:
    determine that a value of the first reading of the implant identifier fails to match a reference value; and
    in response to determining that the value of the first reading of the implant identifier fails to match the reference value, prevent the motor from transitioning to the powered state.

12. The distraction system of claim 11, further comprising a second computing device comprising a process programmed to execute the following instructions: transmit the reference value to the computing device of the external device.

13. The distraction system of claim 12, further wherein the second computing device comprises a display, and the processor of the second computing device is further programmed to execute the following instructions:
    obtain a target site of the distraction implant based at least in part on the reference value;
    generate a graphical user interface (GUI) comprising an anatomical simulation, wherein the anatomical simulation comprises an indication of the target site; and
    render the GUI on the display.

14. The distraction system of claim 13, wherein the processor of the computing device is further configured to execute the following instructions:
    determine that a value of the second reading of the implant identifier fails to match the reference value; and
    in response to determining that the value of the second reading of the implant identifier fails to match the reference value, transition the motor from the powered state to a depowered state.

15. The distraction system of claim 1, wherein the processor of the computing device is further configured to execute the following instructions:
    determine a current distraction distance via the first reading of the implant identifier;
    detect each rotation of the motor via the encoder in the powered state;
    determine an updated value of the current distraction distance based on each detection of the rotation of the motor and an initial distraction distance; and
    in response to detecting each rotation of the motor, write, via the second NFC device, the updated value of the current distraction distance to the first NFC device.

\* \* \* \* \*